United States Patent
Yoda et al.

(10) Patent No.: US 10,891,109 B2
(45) Date of Patent: Jan. 12, 2021

(54) ARITHMETIC PROCESSOR, ARITHMETIC PROCESSING APPARATUS INCLUDING ARITHMETIC PROCESSOR, INFORMATION PROCESSING APPARATUS INCLUDING ARITHMETIC PROCESSING APPARATUS, AND CONTROL METHOD FOR ARITHMETIC PROCESSING APPARATUS

(71) Applicant: FUJITSU LIMITED, Kawasaki (JP)

(72) Inventors: Katsuhiro Yoda, Kodaira (JP); Makiko Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 232 days.

(21) Appl. No.: 16/158,380

(22) Filed: Oct. 12, 2018

(65) Prior Publication Data

US 2019/0114142 A1    Apr. 18, 2019

(30) Foreign Application Priority Data

Oct. 17, 2017    (JP) ................... 2017-200898

(51) Int. Cl.
  *G06F 7/57*    (2006.01)
  *G06N 3/08*    (2006.01)
  (Continued)

(52) U.S. Cl.
  CPC ............. *G06F 7/57* (2013.01); *G06F 7/499* (2013.01); *G06F 9/30014* (2013.01);
  (Continued)

(58) Field of Classification Search
  CPC ........ G06F 7/57; G06F 7/499; G06F 11/3452; G06F 9/30014; G06F 17/18; G06N 3/08; G06N 3/084; G06N 3/063
  (Continued)

(56) References Cited

U.S. PATENT DOCUMENTS

| | | |
|---|---|---|
| 7,401,107 B2 | 7/2008 | Lutz et al. |
| 2016/0126975 A1* | 5/2016 | Lutz ............... H03M 7/24 |
| | | 708/204 |

FOREIGN PATENT DOCUMENTS

| | | |
|---|---|---|
| JP | 2009-271598 | 11/2009 |
| JP | 2012-203566 | 10/2012 |

OTHER PUBLICATIONS

European Office Action dated Apr. 15, 2020 for corresponding European Patent Application No. 18200350.9, 6 pages.
(Continued)

*Primary Examiner* — Tan V Mai
(74) *Attorney, Agent, or Firm* — Fujitsu Patent Center

(57) ABSTRACT

An arithmetic processor includes a plurality of arithmetic circuits that individually execute an arithmetic operation for fixed point data; and at least one of first and second statistical information is acquired regarding a plurality of fixed point data that are results of arithmetic operation executed by the plurality of arithmetic circuits. The first statistical information is obtained by accumulating a bit pattern, which is obtained by setting a flag bit to each of bit positions corresponding to a range from a least-significant-bit position to a highest-order bit position for each of the digits corresponding to the bit positions, and the second statistical information is obtained by accumulating a bit pattern, which is obtained by setting a flag bit to each of bit positions corresponding to a range from the position of the sign bit to a lowest-order-bit position for each of the digits corresponding to the bit positions.

9 Claims, 61 Drawing Sheets

(51) Int. Cl.
  *G06N 3/063*   (2006.01)
  *G06F 17/18*   (2006.01)
  *G06F 7/499*   (2006.01)
  *G06F 11/34*   (2006.01)
  *G06F 9/30*    (2018.01)

(52) U.S. Cl.
  CPC .......... *G06F 11/3452* (2013.01); *G06F 17/18* (2013.01); *G06N 3/063* (2013.01); *G06N 3/08* (2013.01); *G06N 3/084* (2013.01)

(58) Field of Classification Search
  USPC ........................................ 708/204, 490, 495
  See application file for complete search history.

(56) References Cited

OTHER PUBLICATIONS

European Office Action dated Sep. 30, 2019 for corresponding European Patent Application No. 18200350.9, 6 pages.
Extended European Search Report dated Feb. 27, 2019, for corresponding European Patent Application No. 18200350.9, 8 pages.
Williamson, Darrell, "Dynamically Scaled Fixed Point Arithmetic", May 9-10, 1991, pp. 315-318, XP055558632, IEEE Pacific Rim Conference on Communications, Computers and Signal Processing, Retrieved from the Internet:URL:https://ieeexplore.ieee.org/ielx2/518/4206/00160742.pdf?tp=&arnumber=160742&isnumber=4206.
Matthieu Courbariaux et al., "Training Deep Neural Networks With Low Precision Multiplications", Accepted as a workshop contribution at ICLR 2015, International Conference on Learning Representations (ICLR), Sep. 23, 2015 (10 pages).

* cited by examiner

FIG. 7

| Format | Prop. | Up. | PI MNIST | MNIST | CIFAR-10 | SVHN |
|---|---|---|---|---|---|---|
| Goodfellow et al.(2013a) | 32 | 32 | 0.94% | 0.45% | 11.68% | 2.47% |
| Single precision floating point | 32 | 32 | 1.05% | 0.51% | 14.05% | 2.71% |
| Half precision floating point | 16 | 16 | 1.10% | 0.51% | 14.14% | 3.02% |
| Fixed point | 20 | 20 | 1.39% | 0.57% | 15.98% | 2.97% |
| Dynamic fixed point | 10 | 12 | 1.28% | 0.59% | 14.82% | 4.95% |

RELATED ART

FLG = 0: STATISTICAL INFORMATION IS NOT ACQUIRED
FLG = 1: STATISTICAL INFORMATION IS ACQUIRED (IDX IS REGISTER INDEX.
NOTE THAT, WHERE IDX = 000, STATISTICAL
INFORMATION IS NOT ACQUIRED)

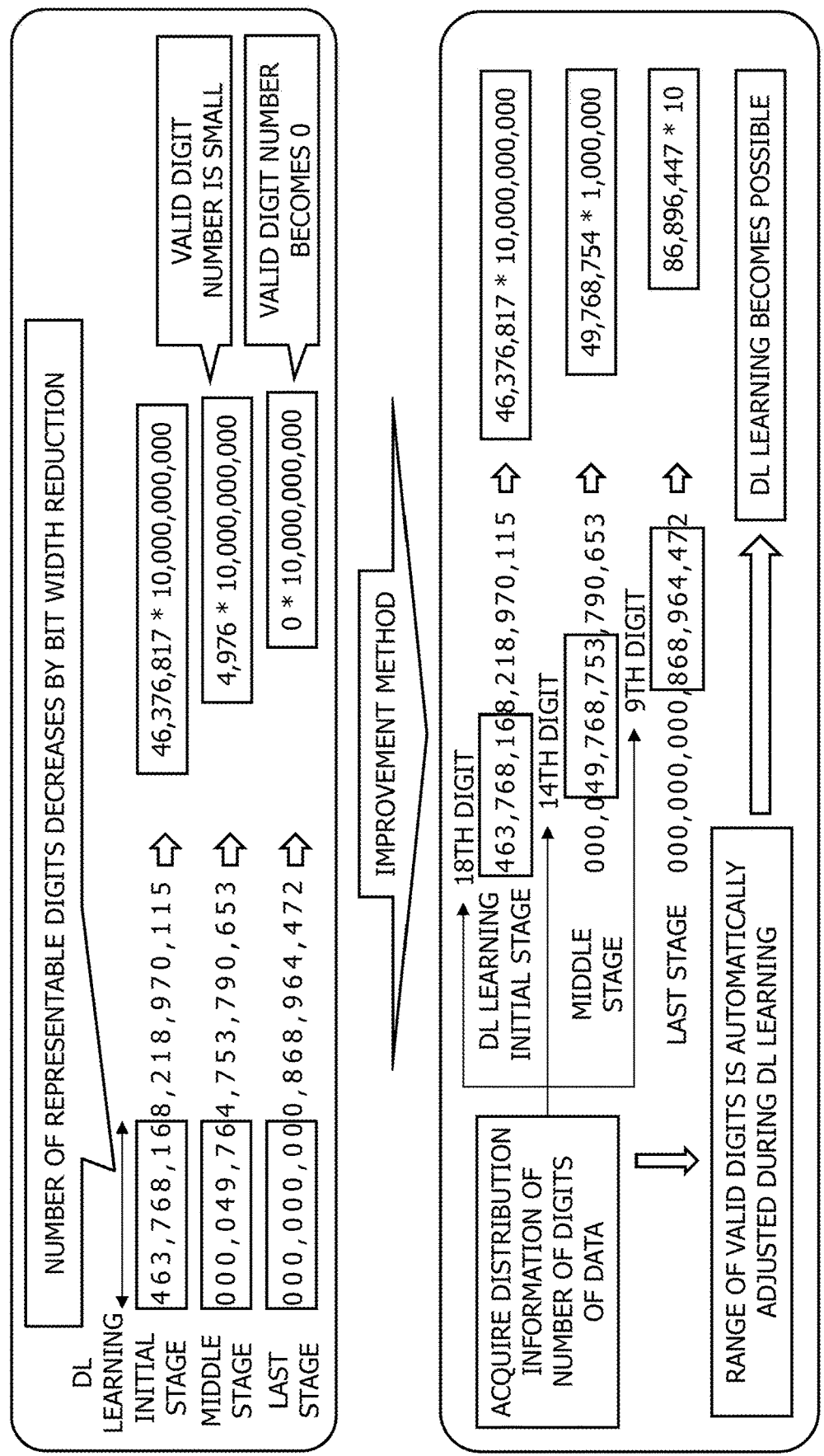
F I G. 31

FIG. 32
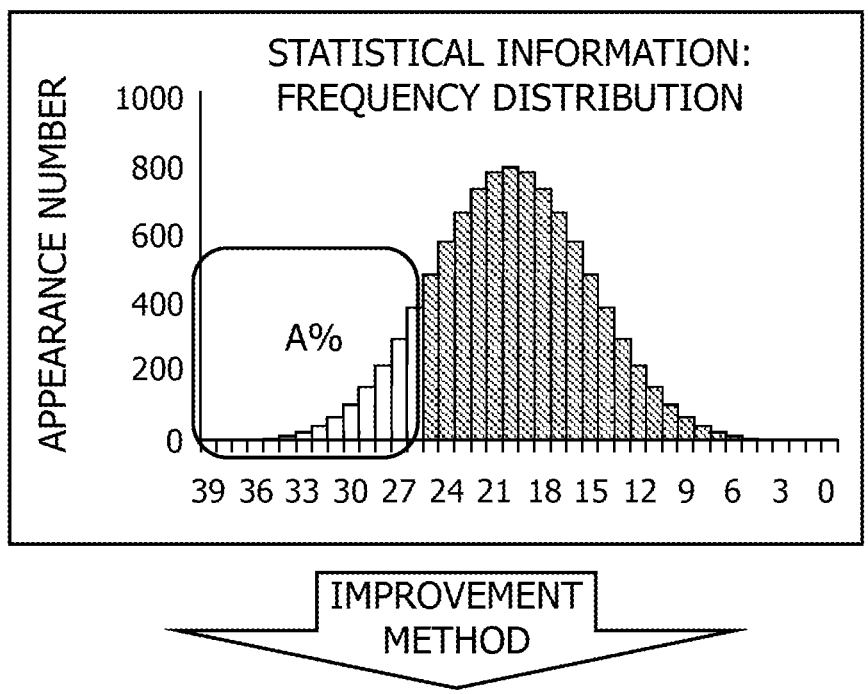
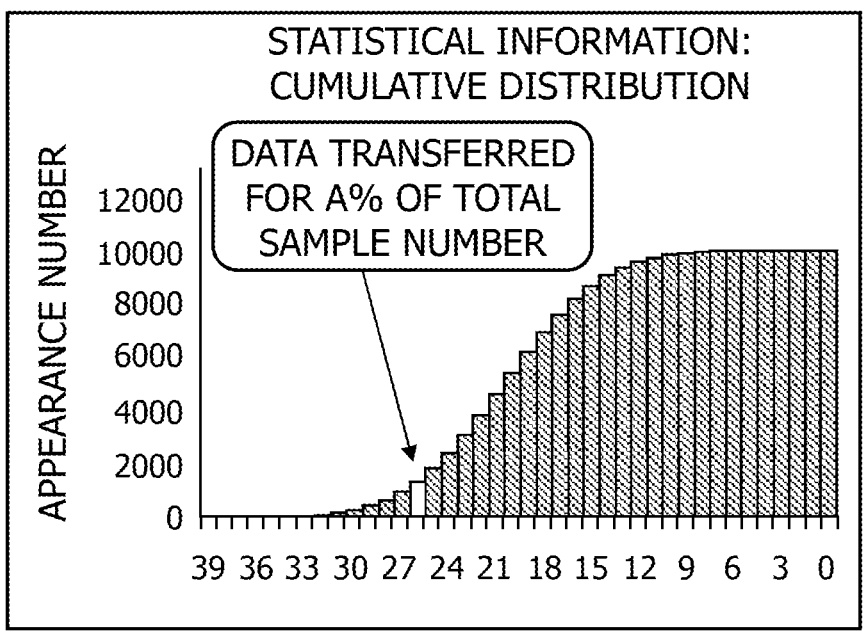

FIG. 33
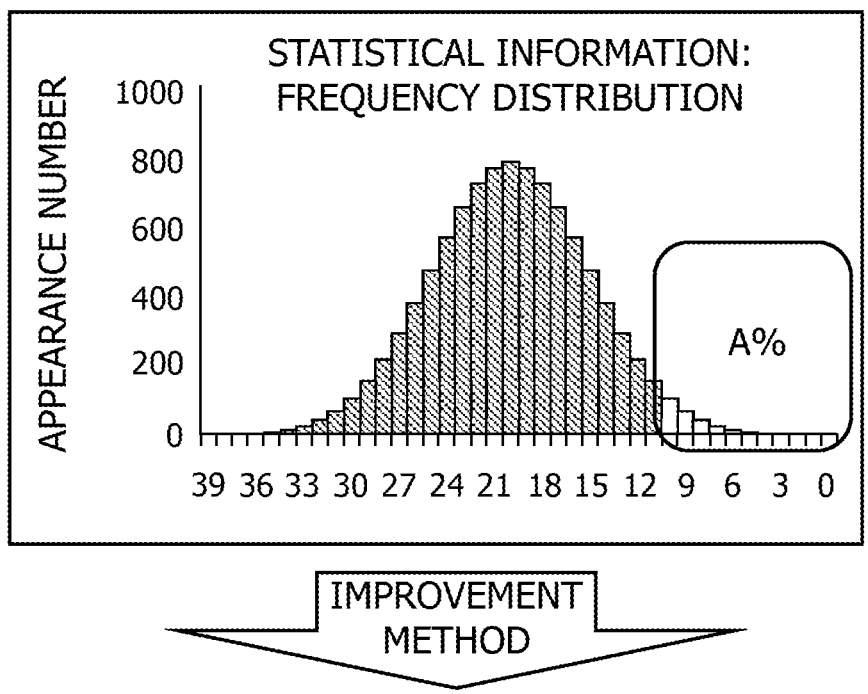
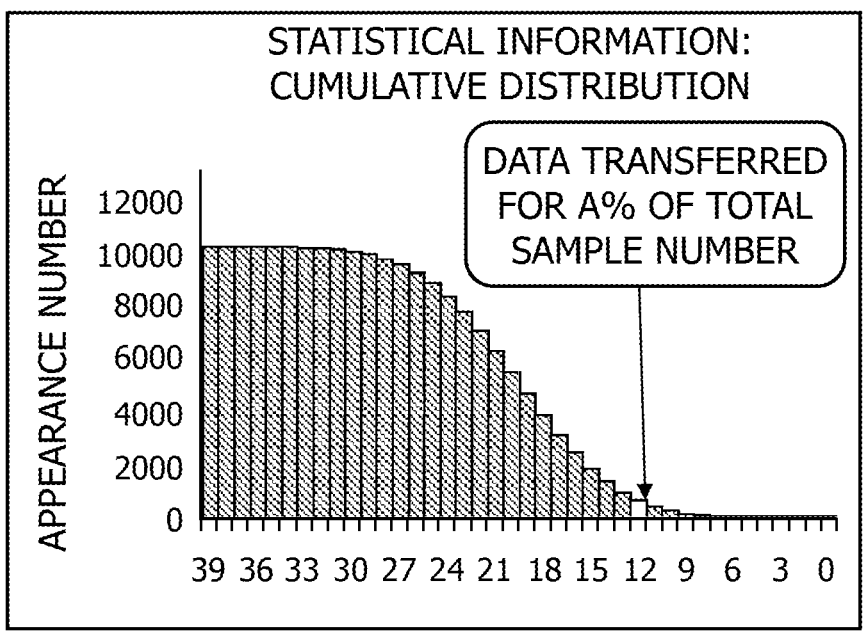

EXAMPLE OF RTL DESCRIPTION OF COUNTER
input wire ck, rst, set, en;
input wire[5:0] data ;
output reg [5:0] q;
always@(posedge ck, negedge rst) begin
  if(rst) q <= 6'h00;
  else begin
    if (set) q <= data;
    else begin
      if(en) begin
        if(q==0) begin q <= 0;   end
        else    begin q <= q - 1;end
      end
    end
  end
end

DIGIT POSITION DESIGNATION
COUNT DOWN

F I G. 48

```
EXAMPLE OF RTL DESCRIPTION OF RESULT HOLDING 1 UNIT
input wire ck, rst, d;
output reg q;
always@(posedge ck, negedge rst) begin
  if(rst) q <= 1'b0;
  else begin
    if (d) q <= 1;
    else q <= q;
  end
end
```

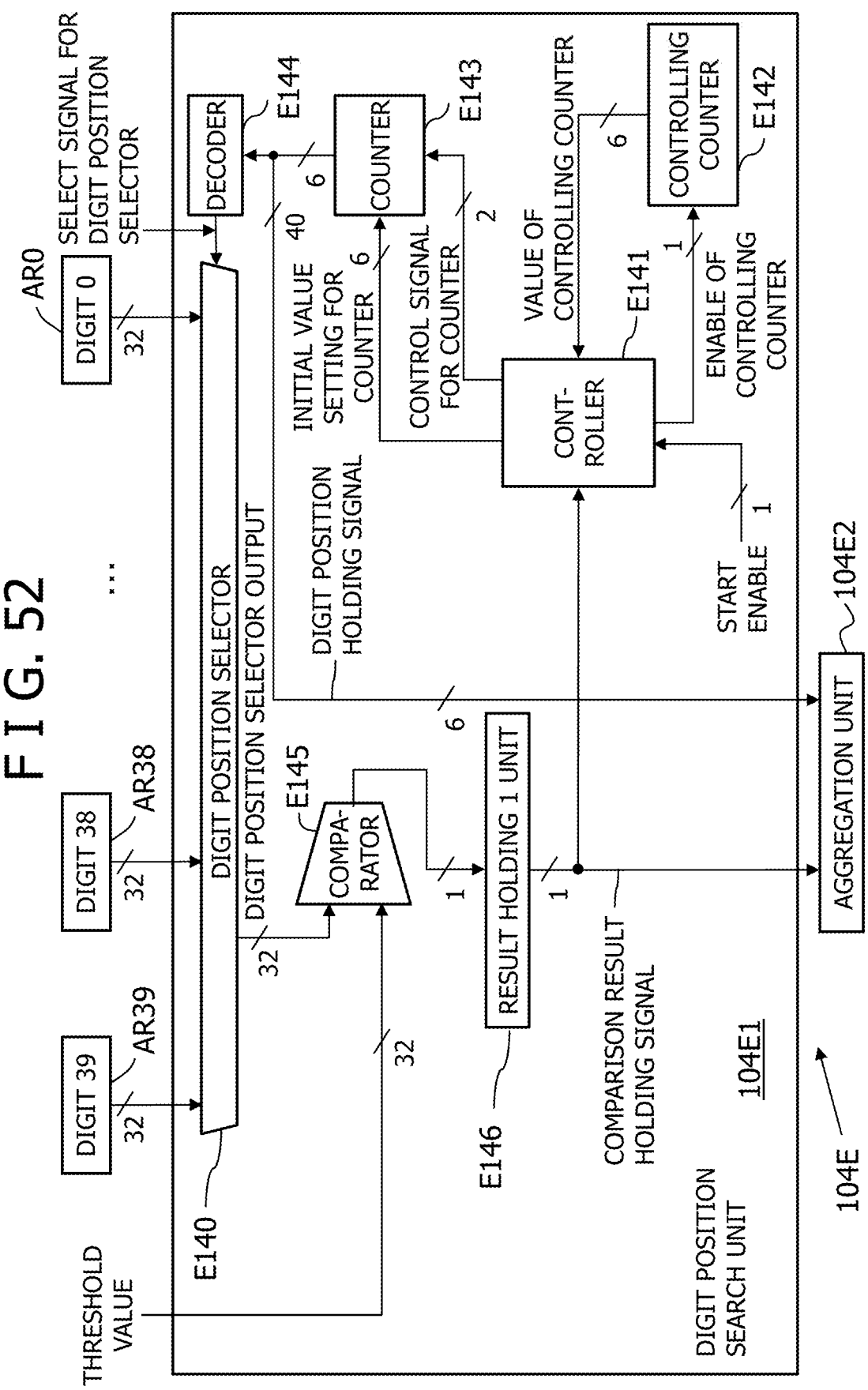
F I G. 52

FIG. 53

EXAMPLE OF RTL DESCRIPTION OF COUNTER

```
input wire ck, rst, set, en;
input wire[5:0] data ;
output reg [5:0] q;
always@(posedge ck, negedge rst) begin
  if(rst) q <= 6'h00;
  else begin
    if (set) q <= data;
    else begin
      if(en) begin
        if(q==39) begin q <= 39;   end
        else     begin q <= q + 1;end
      end
    end
  end
end
```

F I G. 61

| ENABLE | DIGIT POSITION INFORMATION 6 BITS | OUTPUT 32 BITS |
|---|---|---|
| 0 | X | 0x0000 |
| 1 | 0 | 0x0001 |
| 1 | 1 | 0x0002 |
| 1 | 2 | 0x0004 |
| 1 | 3 | 0x0008 |
| 1 | 4 | 0x0010 |
| ... | ... | ... |
| 1 | 31 | 0x8000 |

ARITHMETIC PROCESSOR, ARITHMETIC PROCESSING APPARATUS INCLUDING ARITHMETIC PROCESSOR, INFORMATION PROCESSING APPARATUS INCLUDING ARITHMETIC PROCESSING APPARATUS, AND CONTROL METHOD FOR ARITHMETIC PROCESSING APPARATUS

CROSS-REFERENCE TO RELATED APPLICATION

This application is based upon and claims the benefit of priority of the prior Japanese Patent Application No. 2017-200898, filed on Oct. 17, 2017, the entire contents of which are incorporated herein by reference.

FIELD

The embodiments discussed herein relate to an arithmetic processor, an arithmetic processing apparatus including the arithmetic processor, an information processing apparatus including the arithmetic processing apparatus, and a control method for the arithmetic processing apparatus.

BACKGROUND

Nowadays, needs are increasing, especially, for deep learning (DL) out of machine learning in which artificial intelligence is used. The deep learning may be regarded as a technique for machine learning that uses a multilayer neural network (deep learning neural network: DNN). FIG. 1 exemplifies a configuration of a neural network. The neural network is a model of nerve cells (neurons) on a computer. A nerve cell has a cell body (soma), a dendrite that receives a signal inputted from a different cell body, and an axon that outputs a signal to a different cell body. Further, a transmission structure for a signal called synapse is formed between an extremity of the axon that outputs a signal and the dendrite that receives a signal. In the neural network, information transmission through a synapse between nerve cells is modeled.

Further, in a multilayer neural network in which neural networks are multilayered, deep learning is executed. In order to increase the recognition performance of a multilayer neural network in which deep learning is executed, there is a tendency to scale up the multilayer neural network. For example, the number of parameters processed by a multilayer neural network ranges from several millions to tens of millions. In order for the multilayer neural network to approach the human brain, it is considered that the parameter number ultimately spans to tens of billions. Accordingly, it is anticipated that learning data in deep learning increases from now on and the calculation load and the memory load in the multilayer neural network increase. Therefore, improvement in recognition performance and learning efficiency in regard to learning data that continue to increase is demanded. In order to improve the recognition performance and the learning efficiency and reduce the load, it is desirable to reduce the weight of the multilayer neural network.

Incidentally, in deep learning, various arithmetic operations including multiplication, product-sum operation and vector multiplication are executed. However, in deep learning, the request for accuracy in individual arithmetic operations is not so strict as in that in ordinary arithmetic operations. For example, in ordinary arithmetic operations or the like, a programmer develops a computer program such that overflow does not occur as much as possible. Meanwhile, in deep learning, a high value is permitted to become saturated to some degree. This is because, in deep learning, adjustment of a coefficient (weight) when convolution operation of a plurality of input data is performed is a principal process and extreme data from among the input data are frequently not emphasized. Also this is because, since a large amount of data is repetitively used to adjust a coefficient, by performing digit adjustment in accordance with the progress of learning also for a value saturated once, it becomes possible for the value to be reflected on adjustment of the coefficient without being saturated.

Thus, in order to take such a characteristic of deep learning into consideration to achieve reduction of the chip area of an arithmetic processing apparatus for deep learning, increase of the power efficiency and so forth, it is conceivable to use arithmetic operation by a fixed point number without using a floating point number. This is because fixed point operation may simplify the circuit configuration rather than floating point number operation.

FIG. 2 exemplifies a configuration of bits to be used for data representation. By decreasing the bit width used for data representation of data (weight and parameter) to be processed in deep learning like a 32-bit floating point number, a 16-bit fixed point number and an 8-bit fixed point number, the amount of data to be handled in the multilayer neural network may be reduced. By the reduction of the data amount to be handled, it is expected that the processing amount in deep learning is reduced and the learning time is decreased.

However, since the fixed point number is narrow in acceptable dynamic range of a value, the arithmetic operation accuracy sometimes deteriorates in comparison with that of the floating point number. FIG. 3 exemplifies a modeled form of a relation between processes by a 32-bit floating point number, a 16-bit fixed point number and an 8-bit fixed point number and accuracy of inference. In FIG. 3, the "fixed point number" is described as "integer." This does not limit the fixed point number to an integer. Since the fixed point number may be recognized also as a binary integer, in the present specification, a fixed point number is sometimes referred to as integer. It is predicted that, if the bit width is reduced, the arithmetic operation accuracy deteriorates as seen in FIG. 3. If the arithmetic operation accuracy deteriorates, deep learning may not be carried out well. This is because, in deep learning, product-sum operation is repeated by a great number of times in a forward direction and a backward direction and a result of the arithmetic operation sometimes exceeds the dynamic range of the fixed point number. Therefore, it is desired to overcome the above-described subject that arises from decrease of the bit width by a technology that improves the arithmetic operation accuracy.

In order to discuss the subject arising from decrease of the bit width, a procedure of deep learning is described first. FIG. 4 exemplifies a processing procedure in ordinary deep learning. Further, FIG. 5 exemplifies details of forward processing of Conv_1 and reverse processing of FC2 from within the processing procedure of FIG. 4. The flow of processing of deep learning is such as depicted in FIG. 4. In the process of deep learning, correct data corresponding to individual input data exist. The configuration of a network that executes deep learning is determined by a person.

Input data are inputted from the left to the network, and the network propagates a processing result of each layer in the rightward direction (forward propagation), compares correct data and the result with each other and propagates a difference of the result in the leftward direction (reverse propagation). For example, in the example of FIG. 5, by executing product-sum operation of a coefficient Wij for an input parameter xj, convolution arithmetic operation for the Conv_1 layer is executed. Each layer has a coefficient (Wij), and after arithmetic operation is performed up to the uppermost layer (in FIG. 4, FC2) of the multilayer neural network, the arithmetic operation result is compared with correct data, and the coefficient of each layer is updated based on a result of the comparison. By such variations (ΔWij) of the coefficients, the network is optimized. It is to be noted that the multilayer neural network may perform the update of a coefficient for each one data. Alternatively, the multilayer neural network may perform calculation in regard to a plurality of data (for example, 256 data) in parallel and simultaneously and update the weights based on a result of averaging of update information of 256 coefficients. A set of the plurality of data used for the weight update at this time is hereinafter referred to as mini batch. In the case where a set of plural data is processed in parallel to perform weight update, also the set of data processed in parallel and simultaneously may be referred to as mini batch.

FIG. 6 exemplifies a subject arising from decrease in bit width of a parameter and a weight in deep learning. The data amount may be reduced by decreasing the bit width. However, in deep learning, the process exemplified in FIG. 4 is repeated by a great number of times. For example, if input data are image data of 100,000 images and are passed by 100 times per one input data (image data of one image) through the network of FIG. 4 for the object of optimization of the weight coefficient, the data pass through the multilayer neural network by 10,000,000 times. Further, since inner product (product-sum arithmetic operation) between a weight and a parameter is executed for each layer as exemplified in FIG. 5, arithmetic operation is performed by several tens of thousands of times. Digit positions of data in such a case as just described are exemplified in FIG. 6. As deep learning advances to an initial stage, a middle stage and a final stage, the digit positions of the data are successively displaced. Accordingly, it is estimated that, if the deep learning is continued simply by the fixed point, the number of effective digits decreases and the calculation fails finally. Accordingly, also in deep learning, consideration for accuracy in representation of a small value, for example, for an effective digit number, is demanded. To this end, a technology that expands the fixed point number has been proposed.

For example, in processing by Mixed Fixed Point, a decimal point position unified in an overall program is not used but a decimal point position (Q format) suitable for each variable is used. For example, the Q3.12 format defines 16-bit data of one digit for a sign bit, three digits for an integer part and 12 digits for a decimal part. In Mixed Fixed Point, different variables are treated as being different in decimal point position, for example, in digit number of the integer part and digit number of the decimal part.

As a different example, in processing by Dynamic Fixed Point (dynamic fixed point number), during execution, a value region of a variable is acquired, and a decimal point position is reviewed at a fixed timing. Accordingly, Mixed Fixed Point operation and Dynamic Fixed Point operation may be considered as fixed point operation, which is simpler in processing than floating point operation, to which an aspect of floating point operation is added.

Also a digital signal processor (DSP) has been proposed which has a function for a program for executing processing by Mixed Fixed Point operation or Dynamic Fixed Point operation. For example, a DSP that executes an arithmetic operation instruction with a block shift designation is available. According to the arithmetic operation instruction with a block shift designation, arithmetic operation is executed with a bit width greater than the bit width of a variable, and the value is shifted from a result of the arithmetic operation to cut out a value and the value is registered into a register for the variable. In this instruction, the shift amount S (for example, a value from −128 to 127) when the value is cut out from the result of the arithmetic operation may be designated by an immediate/general purpose register. For example, if the DSP executes an instruction of Result=Saturate (((in1 (operator) in2)>>S), 16), an arithmetic operation result is shifted by S bits and, while lower 16 bits are left, upper bits are subjected to a saturation process. In the case where S≥0, the DSP performs arithmetic right shift on the arithmetic operation result, for example, performs right shift with a sign bit embedded while lower bits are deleted. On the other hand, in the case where S<0, the DSP performs arithmetic left shift on the arithmetic operation result, for example, performs left shift with a sign bit maintained and deletes lower bits in a complement.

Also a DSP has been proposed which executes block count leading sign (BCLS) outputting. The BCLS outputting is a function of the DSP for taking a count leading sign of an arithmetic operation result and writing a result into a register. Here, the count leading sign is the position of the bit "1" at the highest-order position of a positive number (position of the bit "0" at the highest-order position of a negative number). For example, if the DSP executes max (block_count_leading_sign (in1 (operator) in2)−1), the position of the bit "1" at the highest-order position of a positive number (position of the bit "0" at the highest-order position of a negative number) is registered into a register from an arithmetic operation result by the operator with the variable in1 and the variable in2.

FIG. 7 exemplifies a recognition error rate in the case where a single precision floating point number (Single Precision Floating Point), a half precision floating point number (Half Precision Floating Point), a fixed point number (Fixed point) and a Dynamic Fixed Point number are applied (refer to non-patent document 1) in deep learning. This FIG. 7 is replicated from Courbariaux et al., "TRAINING DEEP NEURAL NETWORKS WITH LOW PRECISION MULTIPLICATIONS" accepted as a workshop contribution at ICLR 2015, International Conference on Learning Representations (ICLR), Sep. 23, 2015. It is to be noted that data in the first row (Goodfellow et al. (2013a)) indicates an evaluation result of a different thesis. Further, in the table of FIG. 7, Prop. indicates a bit width upon data propagation in recognition (forward direction) and learning (backward direction). Further, Up. indicates a bit width upon weight coefficient updating. Furthermore, PI MNIST, MNIST, CIFAR-10 and SVHN indicate data sets used in deep learning.

Examples of the related art include, for example, Japanese Laid-open Patent Publication No. 2012-203566, and Japanese Laid-open Patent Publication No. 2009-271598.

As described above, in the prior art, a scheme for decreasing arithmetic operation accuracy deterioration of fixed point operation has been proposed. However, according to the prior art, an arithmetic processing apparatus that execute arithmetic operation fails to efficiently acquire a material for decision for decreasing arithmetic operation accuracy deterioration of fixed point operation. Therefore, there is the possibility that it may be difficult to efficiently carry out increase of the accuracy in fixed point number operation. The embodiment discussed herein as one aspect contemplates provision of an arithmetic processing apparatus and so forth that may efficiently increase the accuracy of a fixed point number and may reduce the physical amount and the power consumption of circuitry to make it possible to efficiently increase the accuracy in fixed point number operation.

SUMMARY

According to an aspect of the embodiments, an arithmetic processor includes a plurality of arithmetic circuits that individually execute an arithmetic operation for fixed point data; and at least one of first and second statistical information is acquired regarding a plurality of fixed point data that are results of arithmetic operation executed by the plurality of arithmetic circuits. The first statistical information is obtained by accumulating a bit pattern, which is obtained by setting a flag bit to each of bit positions corresponding to a range from a least-significant-bit position to a highest-order bit position for each of the digits corresponding to the bit positions, and the second statistical information is obtained by accumulating a bit pattern, which is obtained by setting a flag bit to each of bit positions corresponding to a range from the position of the sign bit to a lowest-order-bit position for each of the digits corresponding to the bit positions.

The object and advantages of the invention will be realized and attained by mean of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 exemplifies a recognition error rate;
FIG. 31 exemplifies a subject relating to the comparative example and the embodiment 1;
FIG. 32 exemplifies solving means in an arithmetic processing apparatus of the embodiment 1;
FIG. 33 depicts an example of processing for determining a distribution of lowest-order bit positions having a non-sign bit value as a cumulative distribution;
FIG. 48 exemplifies operation of a result holding 1 unit in the form of a pseudo code of RTL;

FIG. 52 exemplifies a detailed configuration of a digit position search unit according to an embodiment 3;

FIG. 53 depicts a pseudo code of RTL exemplifying operation of a counter;

FIG. 61 exemplifies a truth table of a decoder according to the embodiment 5;

DESCRIPTION OF EMBODIMENTS

In the following, embodiments of the present disclosure are described with reference to the drawings.

Comparative Example

Figure 1:
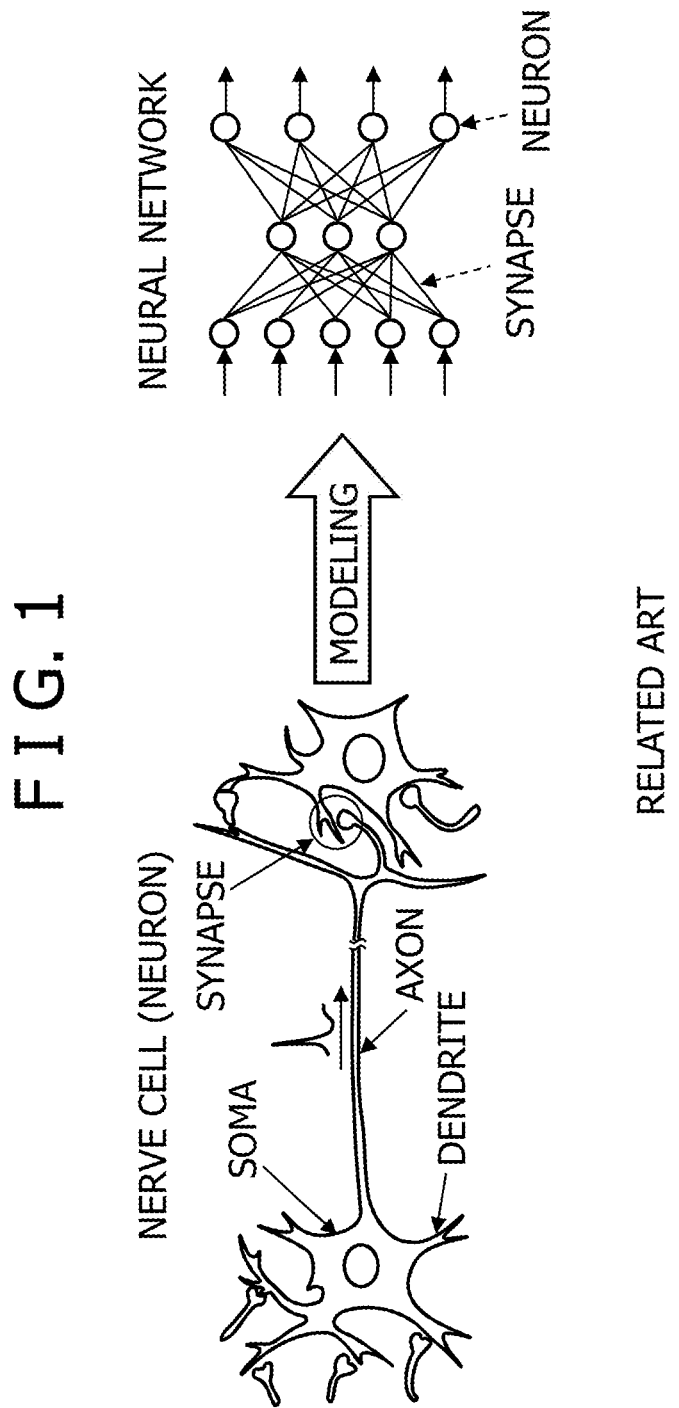
FIG. 1 exemplifies a configuration of a neural network.
Figure 2:
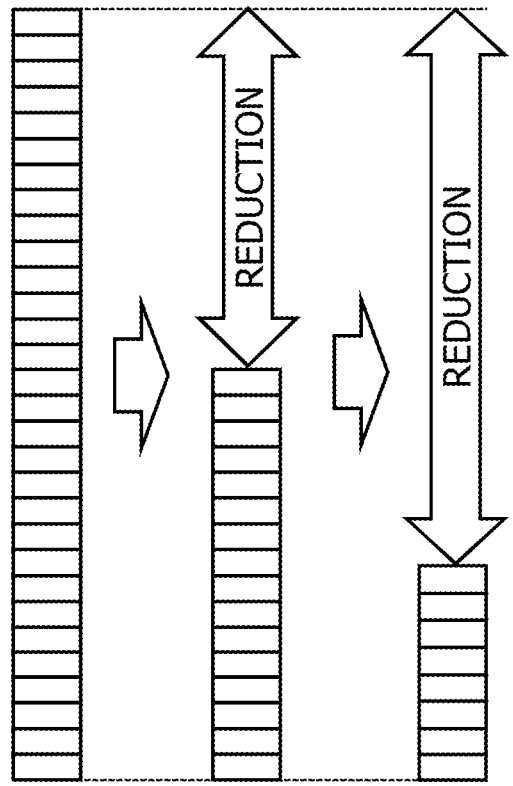
FIG. 2 exemplifies a configuration of bits to be used for data representation.
Figure 3:
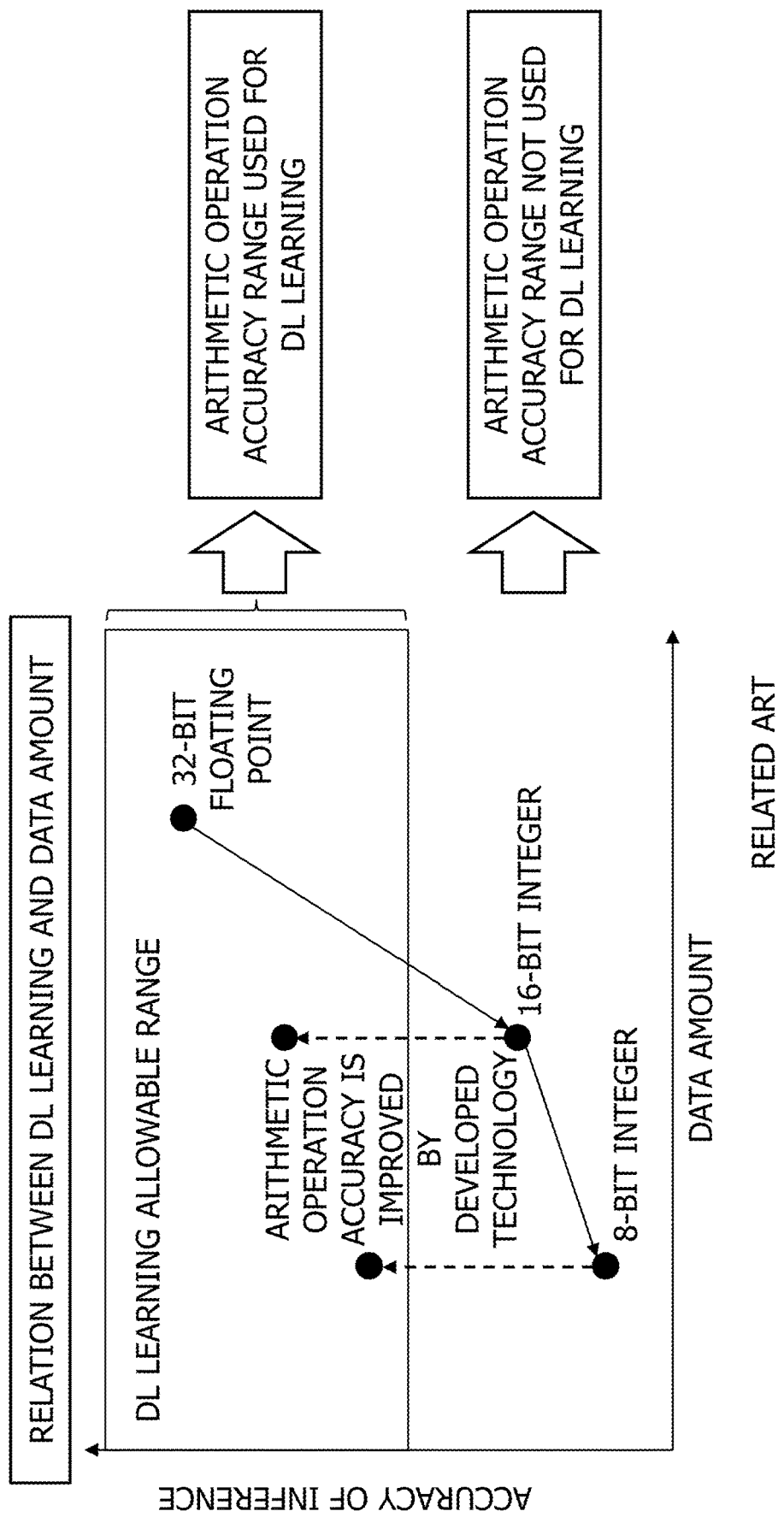
FIG. 3 exemplifies a modeled form of a relation between processes by a 32-bit floating point number, a 16-bit fixed point number and an 8-bit fixed point number and accuracy of inference.
Figure 4:
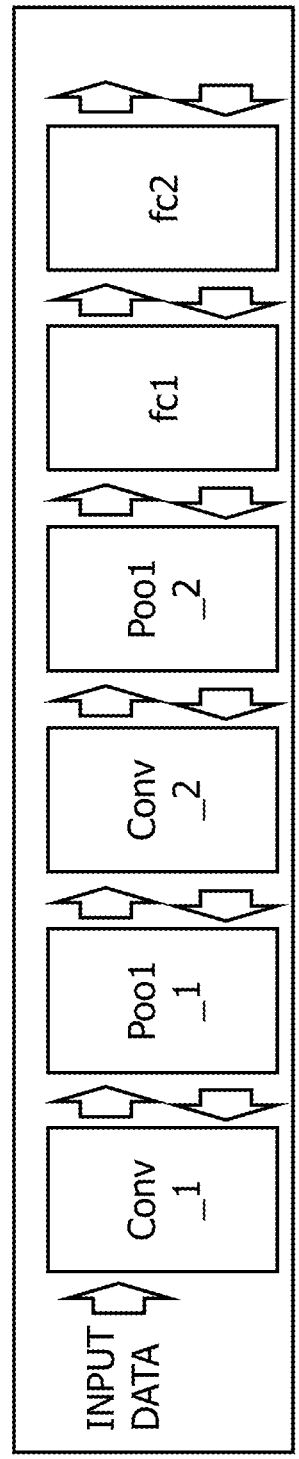
FIG. 4 exemplifies a processing procedure in ordinary deep learning.
Figure 5:
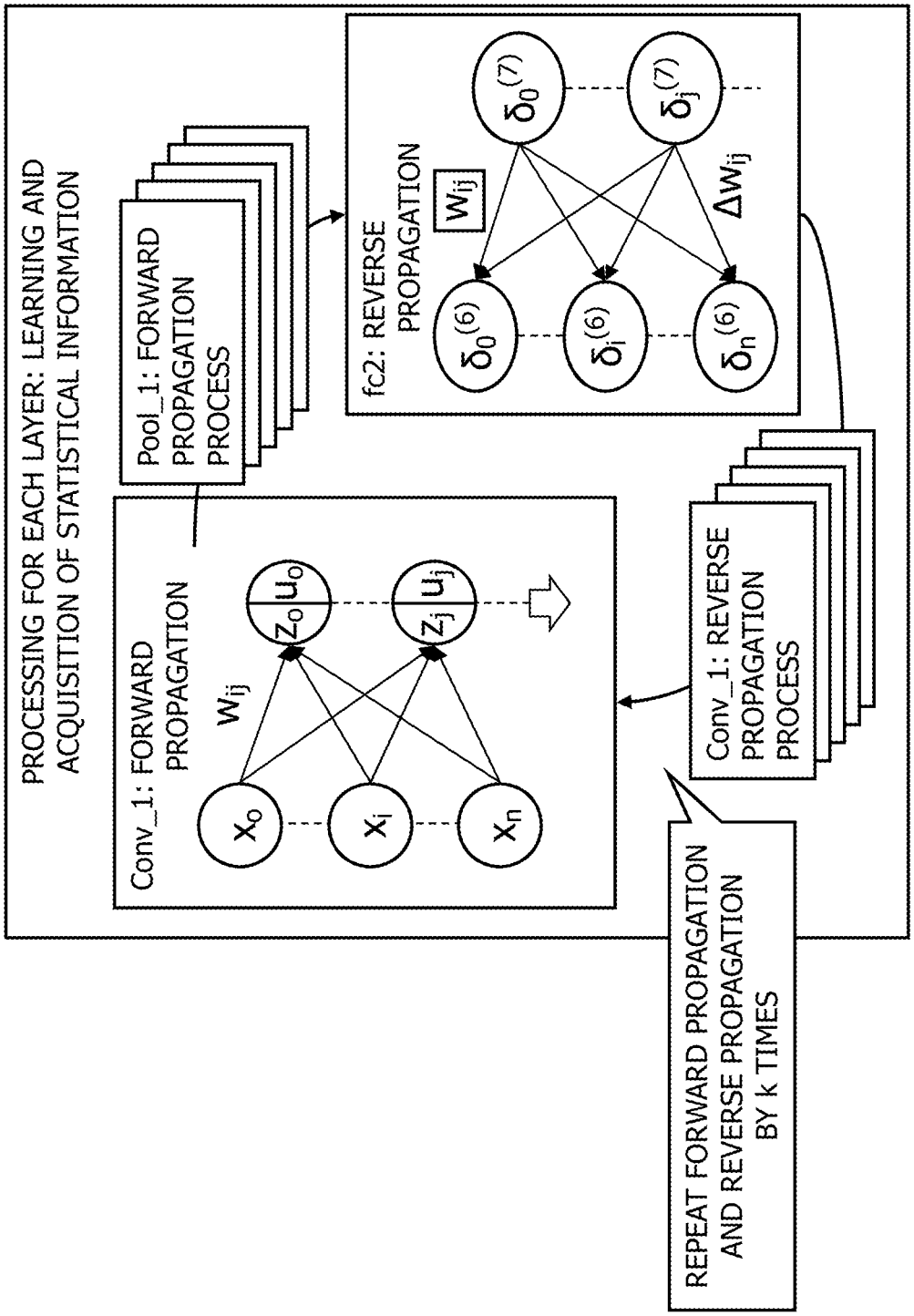
FIG. 5 exemplifies details of forward processing and reverse processing in FIG. 4.
Figure 6:
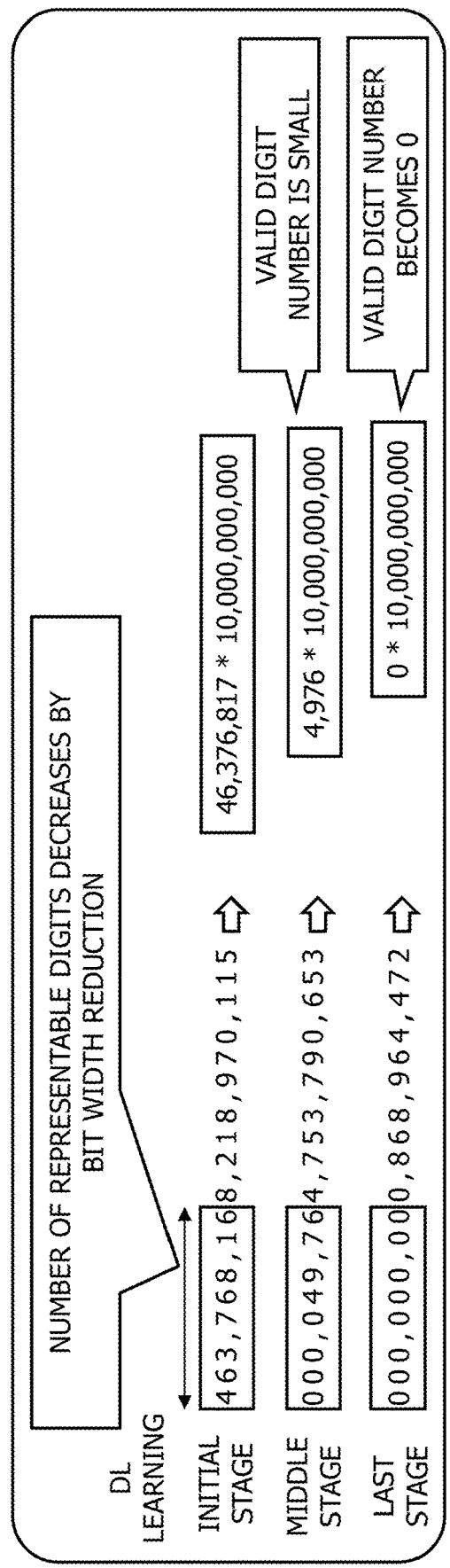
FIG. 6 exemplifies a subject arising from decrease in bit width of a parameter and a weight in deep learning.
Figure 8:
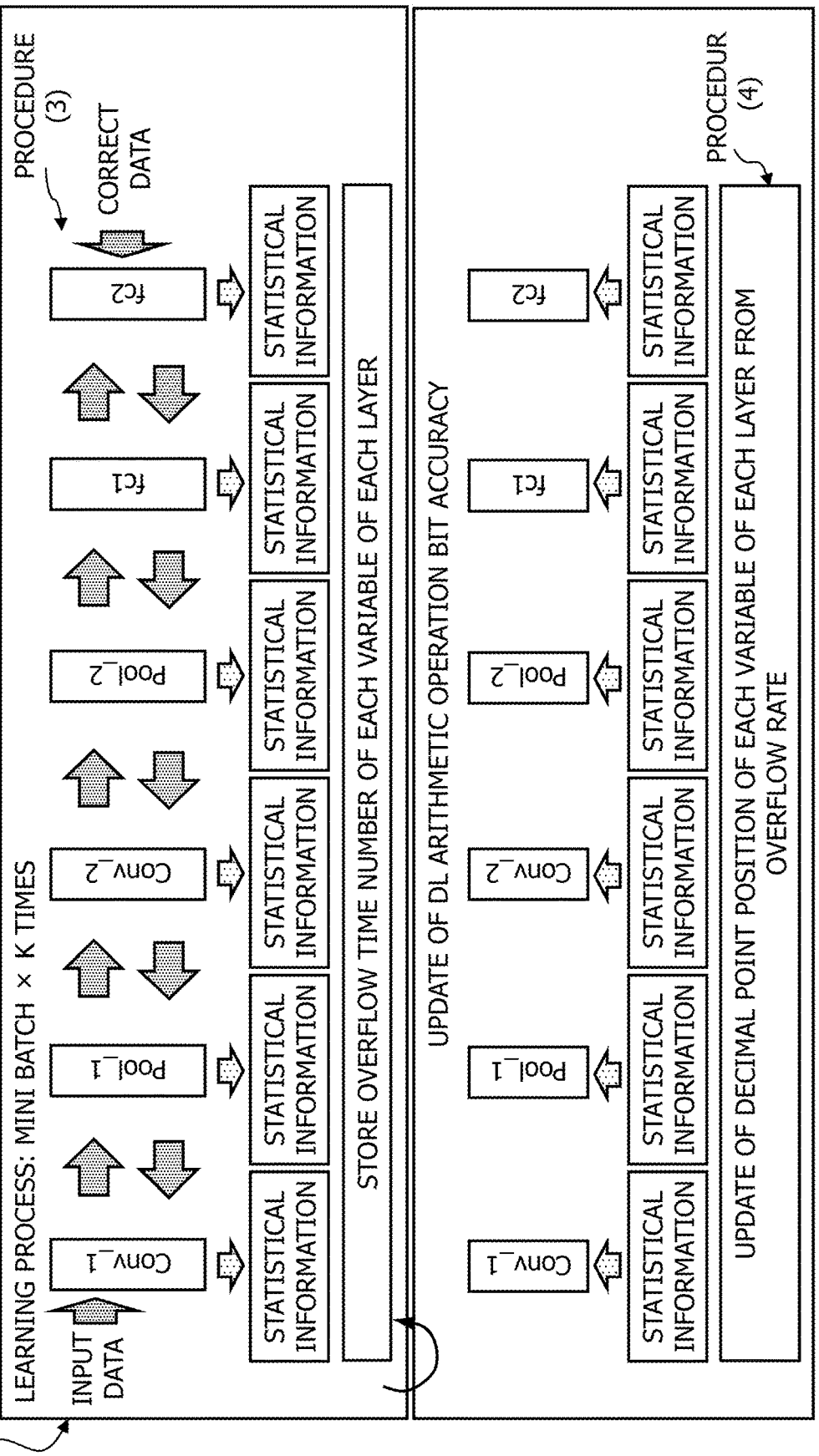
FIGS. 8 and 9 exemplify procedures of deep learning relating to a comparative example.
Figure 9:
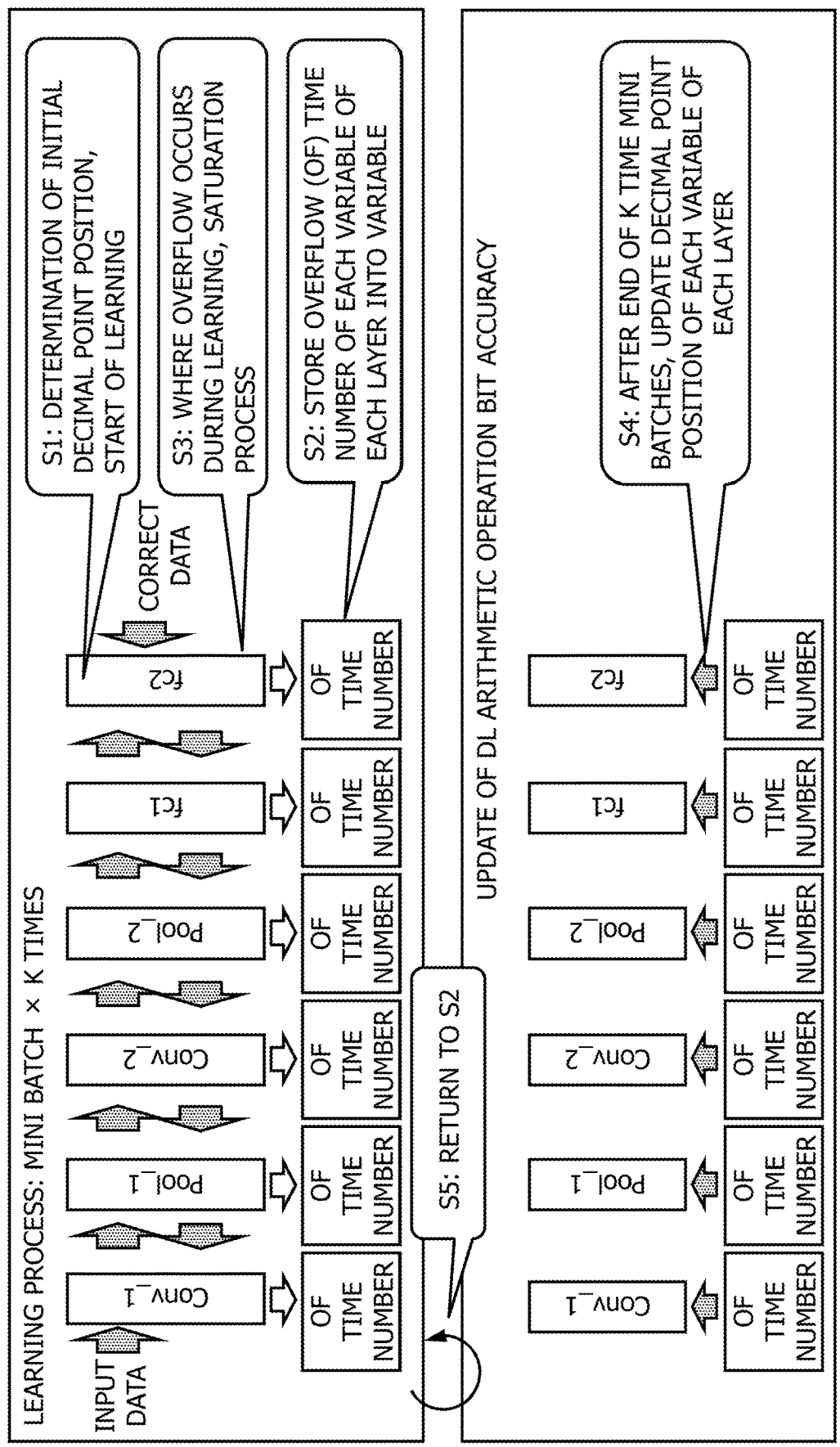

Deep learning in an information processing apparatus according to a comparative example is described with reference to FIGS. 8 to 26. FIGS. 8 and 9 are views exemplifying procedures of deep learning according to the comparative example. The information processing apparatus of the comparative example executes deep learning in accordance with a computer program. The information processing apparatus of the comparative example includes a processor capable of executing processing of a Dynamic Fixed Point number. For example, the information processing apparatus of the comparative example acquires statistical information during deep learning and automatically adjusts the fixed point position of a variable to be used for the learning. Procedure (1): An initial decimal point position for each variable is determined (not depicted) by a trial using a floating point number (one time for a mini batch or the like) or user designation. Procedure (2): The number of times of overflow is stored as statistical information for each variable of each layer during learning of a mini batch by K times. Procedure (3): Where overflow occurs during learning of a mini batch, a saturation process is performed and the learning is continued. Procedure (4): After ending of the mini batch by K times, the decimal point position of the fixed point number is adjusted from the statistical information. Procedure (5): Returning back to the procedure (2), the learning is advanced.

As depicted in FIG. 9, the deep learning of the comparative example is executed by processing for a convolution layer (Conv_1) and a pooling layer (Pool_1) in a first layer, a convolution layer (Conv_2) and a pooling layer (Pool_2) in a second layer, an entire coupling layer 1 (fc1) and an entire coupling layer 2 (fc2). The deep learning is executed divisionally in units of a process called mini batch. Here, the mini batch signifies a combination of K data obtained by dividing an aggregate {(Ini, Ti), i=1 to N} of input data that is a target of learning into a plurality of sets (for example, M sets of K data, N=K*M). Further, the mini batch signifies a processing unit of learning executed for such individual sets of input data (K data). Here, Ini indicates input data (vector) and Ti indicates correct answer data (vector). As described below, the information processing apparatus of the comparative example acquires a number of times of overflow of each variable in each layer and accumulates the acquired data into a variable within a computer program for each of given numbers of mini batches during the deep learning, and automatically adjusts the fixed point position of the variables to be used for deep learning.

The information processing apparatus of the comparative example determines an initial decimal point position of each variable, for example, by a trial using a floating point number (one time for a mini batch or the like) or user designation and starts learning (S1). Then, the information processing apparatus stores a number of times of overflow of each variable in each layer as statistical information during learning of a mini batch by K times (S2). At this time, every time arithmetic operation, substitution or the like for each variable within the program for executing the learning is performed, the information processing apparatus decides presence or absence of overflow and counts the number of times and substitutes the calculated time number into a counter variable for retaining the number of times.

In the case where overflow occurs in the variable during learning of a mini batch, a saturation process for the variable is performed and the learning is continued (S3). Here, the saturation process is a process for clipping a variable to a positive maximum value when overflow occurs in a positive number and to a negative minimum value when overflow occurs in a negative number.

After the mini batch for K sets of data ends (after learning by K times ends), the information processing apparatus calculates an overflow rate from the overflow time number accumulated in the counter variable and adjusts the decimal point position of the fixed point number based on the overflow rate (S4). Then, the information processing apparatus returns the processing to the process at S2 and advances the learning.

Figure 10:
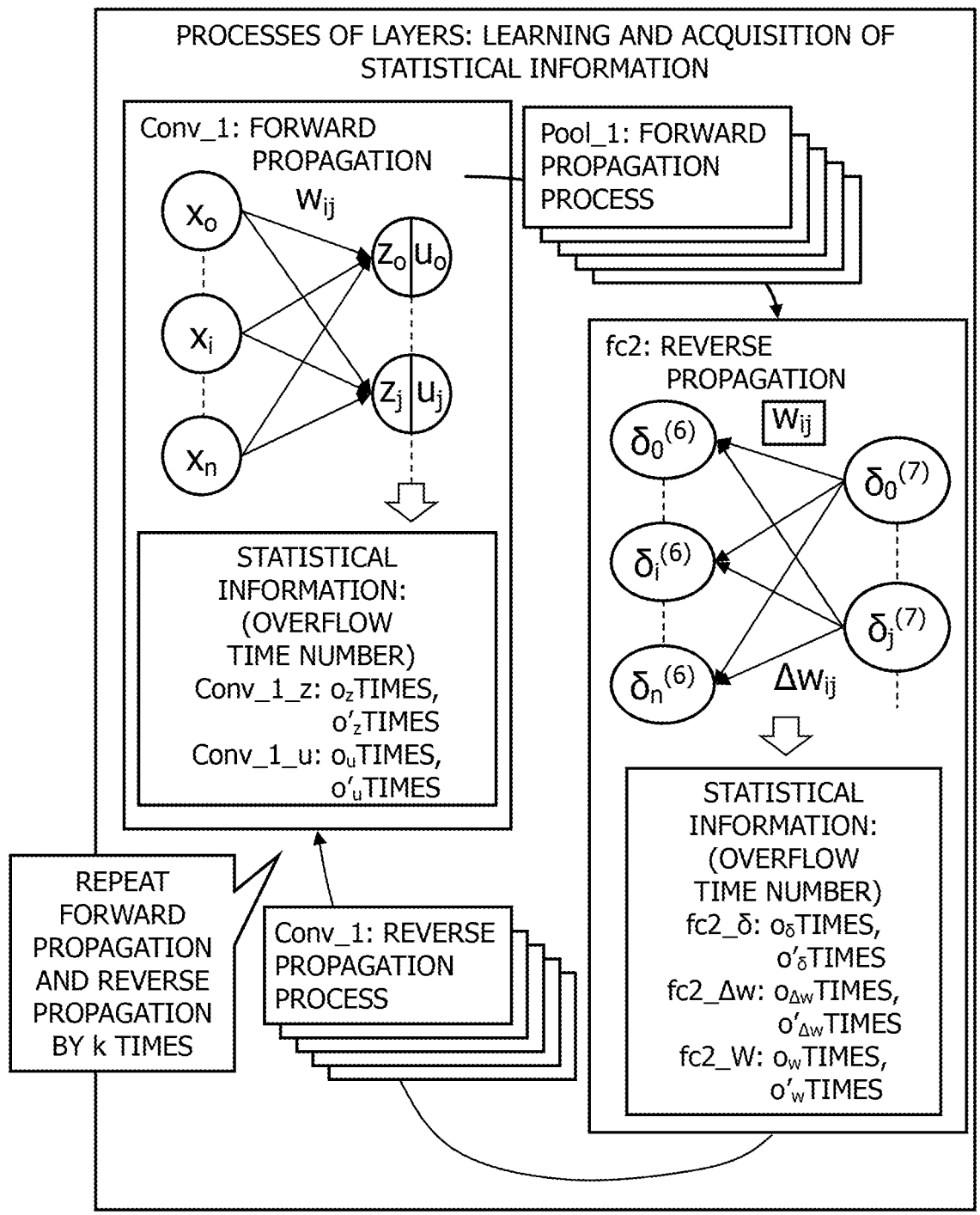
FIG. 10 exemplifies details of processing for individual layers in FIG. 9.

FIG. 10 is a view exemplifying details of processing for individual layers in FIG. 9. In FIG. 10, the convolution layer (Conv_1) and pooling layer (Pool_1) in the first layer and the entire coupling layer 2 (fc2) are exemplified. In this example, in the convolution layer (Conv_1) in the first layer, convolution operation is executed between input data ini (x0, . . . , xn) and weights (wij) to calculate z0, . . . , zj, . . . and so forth. Further, an activation function is arithmetically operated relating to z0, . . . , zj, . . . and so forth to calculate u0, . . . , uj, . . . and so forth. The information processing apparatus accumulates the overflow time number of the variables z0, ..., zj, ... in the convolution layer (Conv_1) in the first layer into the counter variable Conv_1_z. Further, the information processing apparatus accumulates the overflow time number in the variables u0, ..., uj, ... and so forth in the convolution layer (Conv_1) in the first layer into the counter variable Conv_1_u. For example, in the case where the counter variable Conv_1_u is an array, the number of overflowing variables from among the variables u0, ..., uj, ... is accumulated into the counter variable Conv_1_u(1). Further, into the counter variable Conv_1_u(2), the number of variables that overflow if doubled from among the variables u0, ..., uj, ... is accumulated.

A result of arithmetic operation in the convolution layer (Conv_1) of the first layer is propagated from the pooling layer (Pool_1) in the first layer to an upper layer. At this time, the information processing apparatus executes similar arithmetic operation and accumulation of an overflow time number also in the second and succeeding layers. The information processing apparatus executes such arithmetic operation as described above also in the upper layer and propagates a result of the arithmetic operation to a further upper layer. Then, the information processing apparatus finally calculates errors $\delta 0(7), \ldots, \delta j(7), \ldots$ from difference values between the obtained results of the arithmetic operation and correct answer data Ti in the entire coupling layer 2 (fc2). Then, the information processing apparatus executes propagation in the reverse direction based on the errors $\delta 0(7), \ldots, \delta j(7), \ldots$. As a result, the information processing apparatus calculates difference values $\Delta Wij$ between the errors $\delta 0(6), \ldots, \delta j(6), \ldots, \delta n(6)$ at the output of a lower-order layer (for example, the coupling layer 1 (fc1)) and weights for the next cycle to the weight variables Wij. At this time, the information processing apparatus accumulates the overflow time number in the errors $\delta 0(7), \ldots, \delta j(7), \ldots$ and the errors $\delta 0(6), \ldots, \delta j(6), \ldots, \delta n(6)$ into a counter variable fc2_6. Further, the information processing apparatus accumulates the overflow time number at the difference values $\Delta Wij$ into the counter variable fc2_$\Delta W$. Further, the information processing apparatus accumulates the overflow time number in the weight variables Wij into the counter variable fc2_W.

Then, the information processing apparatus calculates a difference in weight while propagating an error from the entire coupling layer 1 (fc1) to the convolution layer (Conv_1) in the first layer in the reverse direction. The information processing apparatus repetitively performs such forward propagation and reverse propagation as described above by K times using K sets of input data. After a mini batch by K times ends, the information processing apparatus updates the fixed point position of each variable based on the overflow time number of the counter variable corresponding to the variable.

Figure 11:
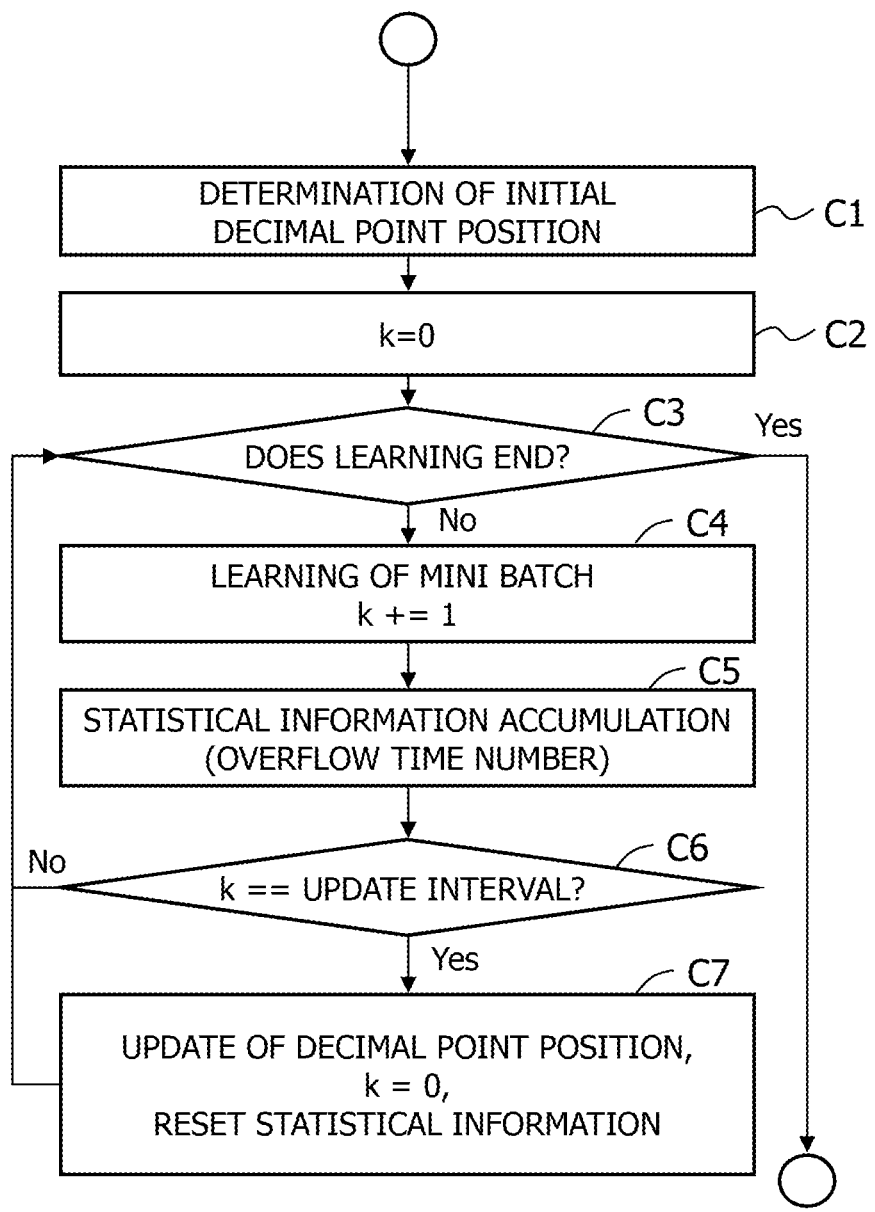
FIG. 11 exemplifies a flow chart of a learning process by an information processing apparatus of the comparative example.

A flow chart of a learning process by the information processing apparatus of the comparative example is exemplified in FIG. 11. In this process, the information processing apparatus determines an initial decimal point position (C1). Then, the information processing apparatus initializes the time number k with the value 0. Then, the information processing apparatus decides whether or not a condition for ending learning is satisfied (C3). The learning ends in the case where the number of errors in the entire coupling layer (fc2) is equal to or lower than a reference value or the time number of the learning reaches a prescription maximum value.

In the case where the condition for ending learning is not satisfied, the information processing apparatus executes a next mini batch and counts up the variable k (C4). Then, the information processing apparatus accumulates the overflow time number as statistical information into each counter variable (C5). For example, the information processing apparatus accumulates the number of overflowing variables and the number of variables that overflows if doubled in each layer.

Then, the information processing apparatus decides whether or not the time number k reaches an update interval (for example, K) (C6). In the case where the time number k does not reach the update interval, the information processing apparatus returns the processing to the process at C3. On the other hand, in the case where the time number k reaches the update interval, the information processing apparatus updates the decimal point position in accordance with the overflow time number of the variable. For example, the information processing apparatus may calculate an overflow rate by dividing the overflow time number by an execution time number of the arithmetic operation similarly as in non-patent document 1. In the case where the overflow rate exceeds a prescribed value, the information processing apparatus may lower the current decimal point position of the variable by one digit to expand the integer part by 1 bit. Further, in the case where a value doubled by the overflow rate is equal to or lower than a prescribed value, the information processing apparatus may raise the decimal point position by one digit to reduce the integer part by 1 bit. Then, the information processing apparatus returns the processing to the process of C3.

It is to be noted that, in the process by a Dynamic Fixed Point number in non-patent document 1, presence or absence of overflow is recorded every time arithmetic operation or substitution of a variable is performed and the overflow rate (time number of overflowing arithmetic operation with respect to the total time number of arithmetic operation, overflowing substitution time number with respect to the total substitution time number or the like) is calculated. In this process, the decimal point position of each variable is changed in accordance with the following procedures 1 and 2 every time a given time period elapses.

(Procedure 1) Where the overflow rate is higher than a prescribed value (rmax), the decimal point position is lowered by one.

(Procedure 2) In the case where a doubled value of the overflow rate is equal to or lower than the prescribed value (rmax), the decimal point position is raised by one.

However, the process described above is a process that the overflow time number is accumulated every time arithmetic operation for each layer is performed and, where the overflow rate exceeds a prescribed value and in the case where a doubled value of the overflow rate becomes lower than the prescribed value, the fixed point position is displaced by 1 bit. This process is an update process of the fixed point position based on the overflow time number or the overflow rate. It is difficult for the information processing apparatus to decide, from the overflow time number or the overflow rate, which position is an appropriate decimal point position.

Accordingly, the process of the comparative example uses a procedure that, upon update of a fixed point position, an appropriate position is tried by a process for lowering or raising the decimal point position by one digit or the like and decision is further performed repetitively based on a result of the trial. Therefore, the decimal point position is updated by a plural number of times until the information processing apparatus determines an appropriate decimal point position. For example, in the case where the information processing apparatus decides the overflow rate for each of mini batches by K times and the decimal point position is updated by 1 bit as described above, mini batches for N*K times (* indicates multiplication) are executed in order to displace the decimal point position by N bits. Therefore, the learning process is repetitively performed in a state in which the decimal point position is inappropriate. For example, there is the possibility that saturation of fixed point number data or underflow may occur at an undesirable level during learning and accuracy of a learning result may be degraded and convergence may be delayed.

Further, since the information processing apparatus of the comparative example merely acquires the overflow time number and executes an accumulation process in the program of the deep learning, there is the possibility that the learning time period may increase. For example, since the information processing apparatus does not have a function for providing information to be used to determine an appropriate decimal point position to the program, there is the possibility that a code for accumulating the overflow time number may be incorporated in the program, which increases the processing time period.

<Statistical Information>

Therefore, in the following comparative example, a processor of an information processing apparatus acquires statistical information to reduce the overhead in a program for acquisition of statistical information. Here, the statistical information to be acquired by the processor is one of kinds of information given below or a combination of them. An application program executed by the information processing apparatus acquires statistical information from the processor to optimize the decimal point position. The processor executes an instruction for Dynamic Fixed Point operation in accordance with processing of the application program.

(1) Distribution of Non-Sign Highest-Order Bit Positions

Figure 12:
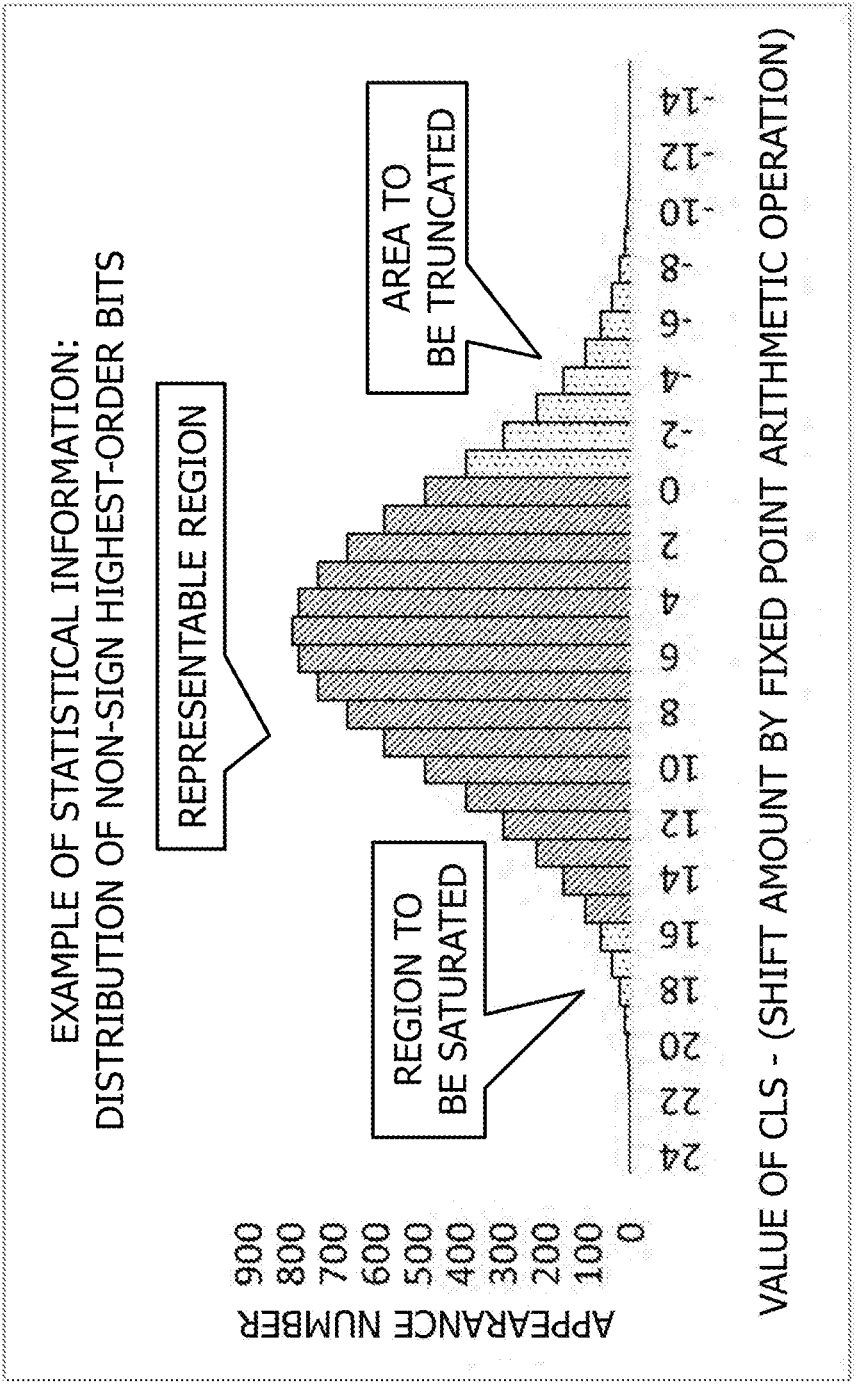
FIG. 12 exemplifies distribution data of non-sign highest-order bit positions.

FIG. 12 exemplifies distribution data of non-sign highest-order bit positions. FIG. 12 depicts an example of data of an intermediate result of arithmetic operation where the data are configured from 40 bits and are shifted rightward by 14 bits for digit alignment of fixed point numbers. The non-sign highest-order bit position signifies, for a positive number, the highest-order bit position at which the bit is 1 and, for a negative number, the highest-order bit position at which the bit is 0. The non-sign highest-order bit position is, for example, where a bit sequence includes bits from bit[39] that is the most significant bit to bit[0] that is the least significant bit, that one of bits bit[k] different from the sign bit bit[39], which indicates a maximum index k. Once a distribution of non-sign highest-order bit positions is obtained, it is possible to grasp a distribution range of values as absolute values.

In FIG. 12, the axis of ordinate indicates an appearance number of non-sign highest-order bit positions and the axis of abscissa indicates the position Count Leading Sign (CLS) of the highest-order bit. In FIG. 12, it is assumed that the decimal point is positioned at the right side of a bit "0." In the comparative example, an arithmetic operation circuit of a processor of an information processing apparatus and a register in the arithmetic operation circuit have a bit width (for example, 40 bits) equal to or greater than a bit number of a register designated by the operand of an instruction (for example, 16 bits). It is to be noted, however, that the bit width of an arithmetic operation circuit of a processor of an information processing apparatus and a register in the arithmetic operation circuit is not restricted to 40 bits. Further, an arithmetic operation result is stored into a register of a bit width smaller than that of an arithmetic operation circuit (into a register designated by the operand of an instruction) such as a register of 16 bits. As a result, an arithmetic operation result (for example, 40 bits) is shifted by a shift amount designated by the operand, and bits smaller than the bit "0" are subjected to a given rounding process, and data exceeding the bit width of the register designated by the operand (data exceeding the bit 15) are subjected to a saturation process.

Further, numerical values applied to the axis of abscissa of FIG. 12 indicate numerical values that may be represented with a fixed point. For example, if the information processing apparatus shifts a fixed point number by −2 bits (by 2 bits in the rightward direction), the highest-order bit is shifted to the position of 14, whereupon the region to be saturated decreases by 2 bits while a region in which underflow occurs and each bit becomes 0 decreases by 2 bits. For example, if the information processing apparatus shifts the decimal point position by 2 bits to the left, the region to be saturated is expanded by 2 bits while the region in which underflow occurs decreases by 2 bits. On the other hand, for example, if the information processing apparatus shifts the fixed point number by 2 bits in the positive direction (by 2 bits in the leftward direction), the highest-order bit is shifted to the position of 18, whereupon the region to be saturated decreases by 2 bits while the region in which underflow is to occur is expanded by 2 bits. For example, if the information processing apparatus shifts the decimal point position by 2 bits to the right, the region to be saturated decreases by 2 bits while the region in which underflow occurs is expanded by 2 bits.

The information processing apparatus may immediately determine, during execution of learning, an appropriate shift amount in Dynamic Fixed Point arithmetic operation, for example, an appropriate fixed point position, by acquiring a distribution of non-sign highest-order bit positions. For example, the information processing apparatus may determine a fixed point position such that data to be saturated may have a ratio equal to or lower than a designated ratio. As an example, the information processing apparatus may determine a fixed point position by prioritizing that saturation of data indicates a given degree rather than that underflow of data indicates a given degree.

The distribution of non-sign highest-order bit positions is accumulated into a given register (hereinafter referred to also as statistical information register) in the processor 10 (refer to FIG. 13) of the information processing apparatus. The processor 10 executes such instructions as reading out and writing instructions for distribution data from and into the statistical information register, a clear instruction of the statistical information register and so forth. Accordingly, into the statistical information register, distribution data of one or more fixed point numbers that have become a target of instruction execution after execution of an immediately preceding clear instruction till the present point of time are accumulated. The accumulated distribution data are read out into a memory by a reading out instruction. Alternatively, the processor 10 may be configured such that it may execute a load instruction into the statistical information register in place of the clear instruction and may load the value 0 into the statistical information register.

(2) Distribution of Non-Sign Lowest-Order Bit Positions

A distribution of non-sign lowest-order bit positions is a distribution of lowest-order bit positions at each of which the bit indicates a value different from the sign. For example, where a bit sequence includes bits from the bit bit[39] that is the most significant bit to the bit bit[0] that is the least significant bit, that one of bits bit[k] different from the sign bit bit[39], which indicates a minimum index k. Further, from a distribution of non-sign lowest-order bit positions, a lowest-order bit in which effective data is included is grasped.

(3) Maximum Value of Non-Sign Highest-Order Bit Position

A maximum value of a non-sign highest-order bit position is a maximum value among highest-order bit positions at which the bit value is different from the value of the sign bit in regard to one or more fixed point numbers that have become a target of instruction execution after a clear instruction is executed last till the present point of time. The information processing apparatus may use the maximum value at the non-sign highest-order bit position for determination of an appropriate shift amount, for example, of an appropriate decimal point position, in Dynamic Fixed Point operation.

The processor 10 executes such instructions as a reading out instruction of a maximum value from the statistical information register, a clear instruction of the statistical information register and so forth. Accordingly, in the statistical information register, maximum values after execution of the last clear instruction till the present point of time are accumulated, and the maximum values are read out into the memory by the reading out instruction.

(4) Minimum Value of Non-Sign Lowest-Order Bit Position

A minimum value of a non-sign lowest-order bit position is a minimum value among lowest-order bit positions at each of which the bit value is different from the value of the sign bit in regard to one or more fixed point numbers after a clear instruction is executed last till the present point of time. The information processing apparatus may use the minimum value of the non-sign lowest-order bit position for determination of an appropriate shift amount, for example, of an appropriate decimal point position, in Dynamic Fixed Point arithmetic operation.

The processor 10 executes such instructions as a reading out instruction of a minimum value from the statistical information register, a clear instruction of the statistical information register and so forth. Accordingly, in the statistical information register, minimum values after execution of the last clear instruction till the present point of time are accumulated, and the minimum values are read out into the memory by the reading out instruction.

<Configuration>

Figure 13:
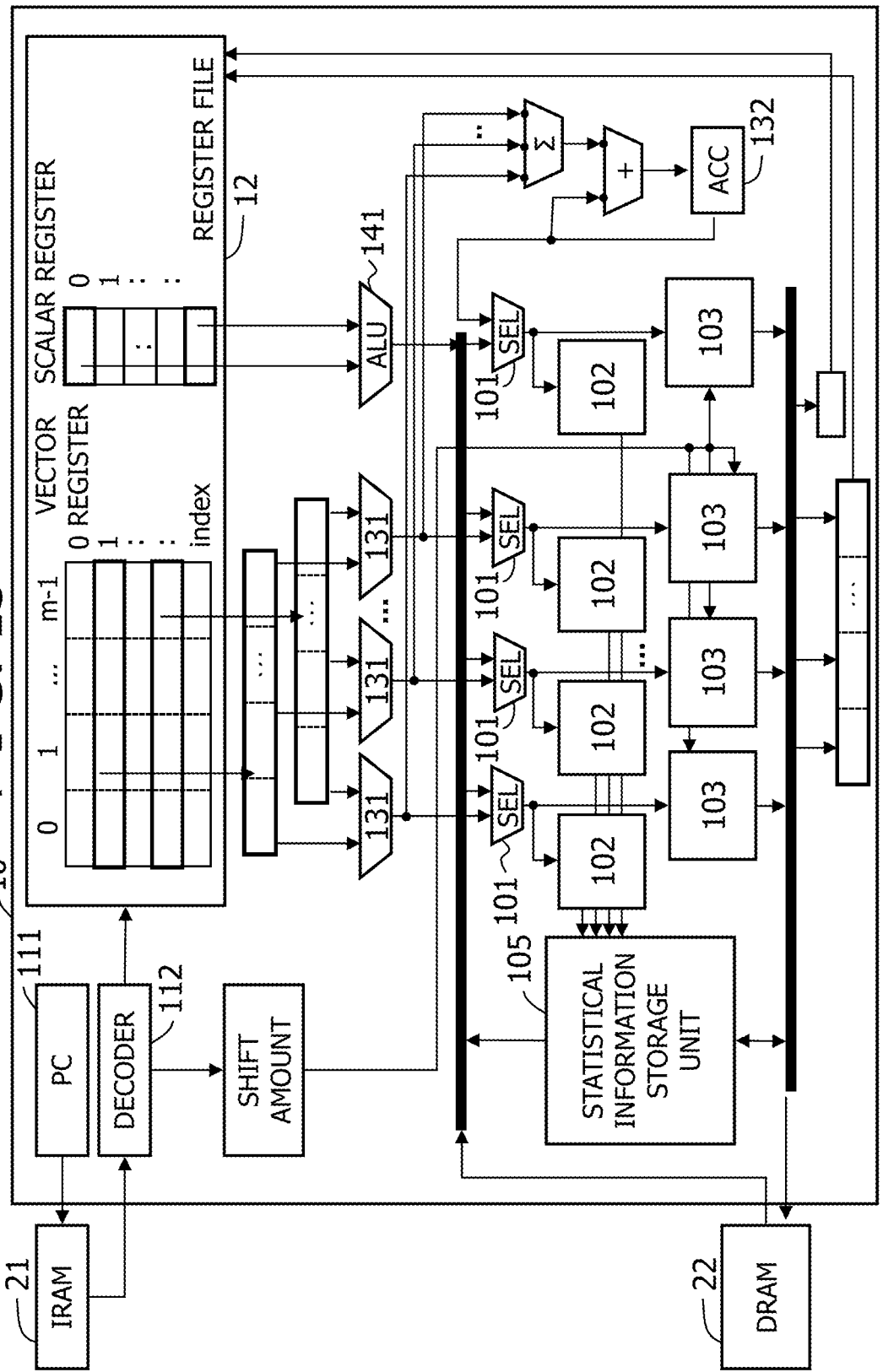
FIG. 13 exemplifies a configuration of a processor of the information processing apparatus of the comparative example.

FIG. 13 exemplifies a configuration of the processor 10 of the information processing apparatus. In FIG. 13, also an instruction memory (IRAM) 21 and a data memory (DRAM) 22 are exemplified together with the processor 10. The processor 10 is an arithmetic processing apparatus of the single instruction multiple data (SIMD) type.

The processor 10 includes a program counter (PC) 111, a decoder (Decoder) 112, a register file 12, arithmetic operators 131 for vector operation, an arithmetic operator (Arithmetic Logic Unit (ALU)) 141 for scalar operation and an accumulator 132 for adding results from the arithmetic operators 131 for vector operation. The processor 10 further includes a plurality of selectors 101 for selecting an arithmetic operation result of the arithmetic operators 131 for vector operation, arithmetic operator 141 for scalar operation, accumulator 132 and so forth and a reading out result from the data memory 22. It is to be noted that the plurality of selectors in FIG. 13 are collectively referred to as selector 101. Further, the plurality of arithmetic operators for vector operation are collectively referred to as arithmetic operator 131.

The processor 10 further includes statistical information acquisition units 102 for acquiring statistical information from data selected by the selector 101, and a statistical information storage unit 105 for storing the statistical information acquired by the statistical information acquisition units 102. It is to be noted that the plurality of statistical information acquisition units in FIG. 13 are collectively referred to as statistical information acquisition unit 102.

The processor 10 further includes a data conversion units 103 for changing the fixed point position of data selected by the selector 101. Further, the plurality of data conversion units in FIG. 13 are collectively referred to as data conversion unit 103.

As depicted in FIG. 13, an instruction is fetched from an address of the instruction memory 21 indicated by the program counter 111, and the decoder 112 decodes the fetched instruction. It is to be noted that a controller for instruction fetch for executing fetch of an instruction is not depicted in FIG. 13.

If the decoder 112 decodes an instruction, the components of the processor 10 are controlled in accordance with a result of the decoding. For example, in the case where the result of the decoding is a vector operation instruction, data of a vector register of the register file 12 is inputted to the arithmetic operators 131 for vector operation, thereby performing the vector operation. Arithmetic operation results of the arithmetic operators 131 for vector operation are supplied to the statistical information acquisition units 102 and the data conversion units 103 through the selectors 101. Further, the arithmetic operation result of the arithmetic operators 131 for vector operation are inputted to the accumulator 132, by which the arithmetic operation results of the arithmetic operators 131 for vector operation are added, for example, in cascade. An arithmetic operation result of the accumulator 132 is supplied to the statistical information acquisition units 102 and the data conversion units 103 through the selectors 101.

On the other hand, for example, in the case where the instruction of the result of the decoding is a scalar operation instruction, data of the scalar register of the register file 12 is inputted to the arithmetic operator 141 for scalar operation. An arithmetic operation result of the arithmetic operator 141 is supplied to the statistical information acquisition units 102 and the data conversion units 103 through the selectors 101 similarly to the arithmetic operation result of the accumulator 132.

Furthermore, for example, in the case where the instruction of the result of decoding is a load instruction, data is read out from the data memory 22 and is supplied to the statistical information acquisition units 102 and the data conversion units 103 through the selectors 101. Results of data conversion by the data conversion units 103 are stored into the registers of the register file 12.

On the other hand, in the case where the instruction of the result of decoding is an instruction to execute Dynamic Fixed Point operation, the decoder 112 issues an instruction to supply a shift amount to the data conversion units 103. The shift amount is acquired, for example, from the operand (immediate value) of the instruction, the register designated by the operand, the data memory 22 of the address indicated by the address register designated by the operand or the like and is supplied to the data conversion units 103.

The data conversion units 103 shift fixed point number data obtained as a result of vector operation, a result of scalar operation, an arithmetic operation result of the accumulator 132, a reading out result from the data memory 22 or the like by a designated shift amount S. Further, the data conversion units 103 executes a saturation process of high-order bits and rounding of low-order bits together with the shift. The data conversion units 103 includes a rounding processing unit that receives, for example, an arithmetic operation result of 40 bits as an input thereto and performs rounding determining low-order S bits as the decimal part, a shifter that executes arithmetic shift by the shift amount S, and a saturation processing unit that performs a saturation process.

The rounding processing unit performs rounding determining the low-order S bits as the decimal part. In the case where S is in the negative, the rounding processing unit performs nothing. As the rounding, nearest rounding, rounding to 0, rounding to positive infinity, rounding to negative infinity, random number rounding and so forth are exemplified. The shift amount S is a shift amount that is acquired from the instruction by the decoder, for example, as exemplified in FIG. 13.

The shifting unit performs, in the case where S is in the positive, S-bit arithmetic right shift and performs, in the case where S is in the negative, arithmetic left shift, for example, −S-bit arithmetic left shift. The saturation processing unit outputs, in the case where the shift result is equal to or greater than 2E15−1 (positive maximum value), 2E15, outputs, in the case where the shift result is equal to or smaller than −2E15 (negative minimum value), −2E15, and outputs, in any other case, lower-order 16 bits of the input. Here, 2E15 represents 2 to the 15th power.

Then, the data conversion units 103 maintains, upon left shift, the sign of high-order bits and performs a saturation process for the other bits than the sign bit, for example, discards the high-order bits and embeds 0 into the low-order bits. Further, the data conversion units 103 embeds, upon right shift, the sign bit into a high-order bit (lower-order bit than the sign bit). Then, the data conversion units 103 outputs data obtained by rounding, shifting and saturation processes described above with a bit width (for example, register of 16 bits) same as that of the registers of the register file 12 or the like.

Accordingly, only if a computer program executed by the processor 10 designates a shift amount to the operand of an instruction for executing Dynamic Fixed Point operation, the processor 10 updates, during execution of the program, the decimal point position of the fixed point number by the designated shift amount.

On the other hand, the instruction as a result of the decoding is an instruction for indicating statistical information acquisition (hereinafter referred to as instruction with a statistical information acquisition function), the statistical information acquisition units 102 acquire and store statistical information into the statistical information storage unit 105. Here, the statistical information is (1) a distribution of non-sign highest-order bit positions, (2) a distribution of non-sign lowest-order bit positions, (3) a maximum value of the non-sign highest-order bit position, (4) a minimum value of the non-sign lowest-order bit position, or a combination of them as described hereinabove.

Figure 14:
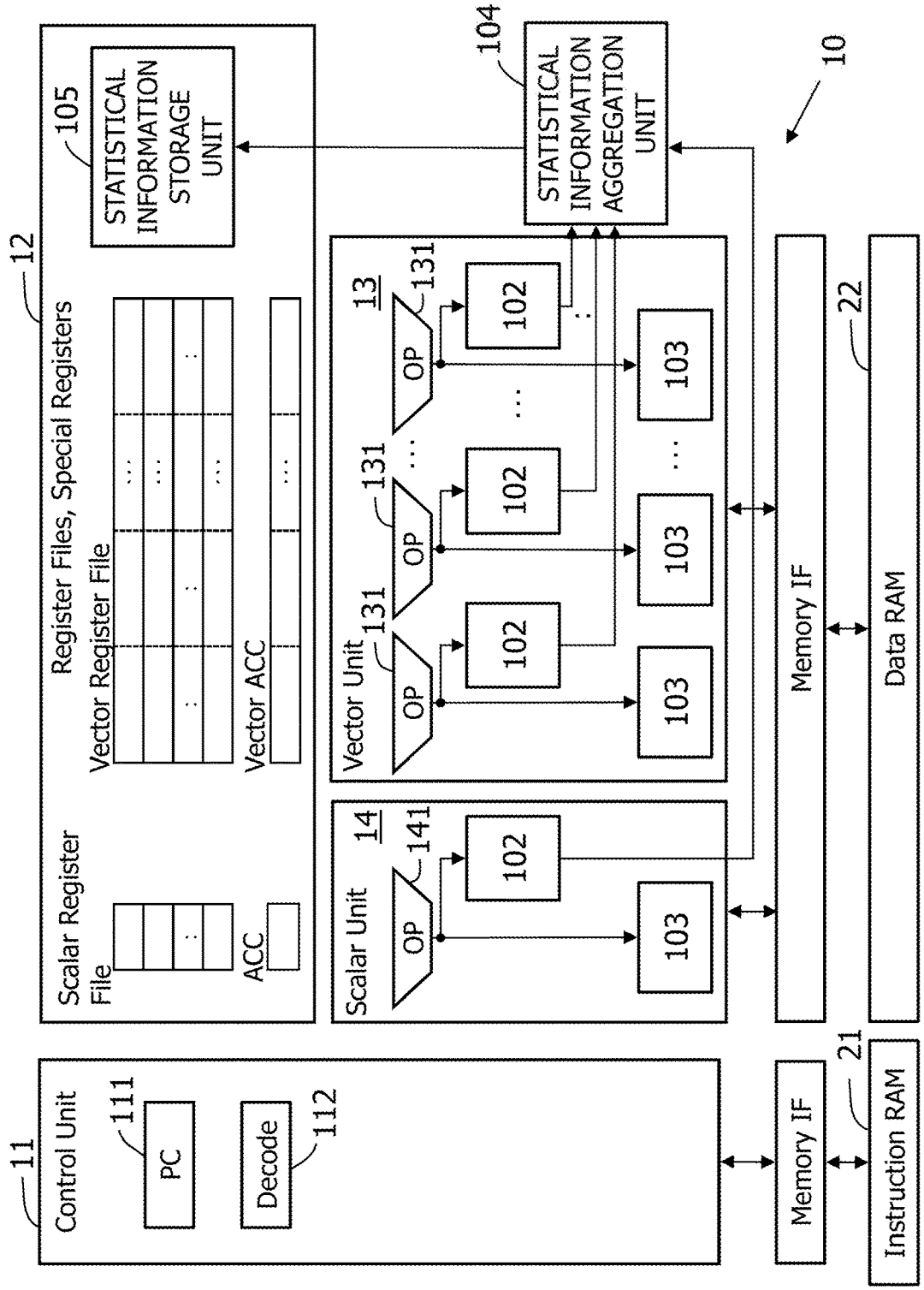
FIG. 14 exemplifies circuit blocks of the processor of the comparative example.

FIG. 14 exemplifies circuit blocks of the processor 10 of FIG. 13. The processor 10 includes a control unit 11, a register file 12, a vector unit 13 and a scalar unit 14. The control unit 11 includes a program counter 111 and a decoder 112. The register file 12 includes a vector register file, a vector operation accumulator register (Vector ACC), a scalar register file, and a scalar operation accumulator register (ACC). The vector unit 13 includes arithmetic operators 131 for vector operation, statistical information acquisition units 102 and data conversion units 103. The scalar unit 14 includes an arithmetic operator 141 for scalar operation, a statistical information acquisition unit 102 and a data conversion unit 103.

Further, in the configuration example of FIG. 14, a statistical information aggregation unit 104 for aggregating statistical information from the plurality of statistical information acquisition units 102 is additionally provided. Further, the statistical information storage unit 105 forms part of the register file 12. Further, the instruction memory 21 is coupled to the control unit 11 through a memory interface (Memory I/F). Further, the data memory 22 is coupled to the vector unit 13 and the scalar unit 14 through a memory interface (Memory I/F).

Figure 15:
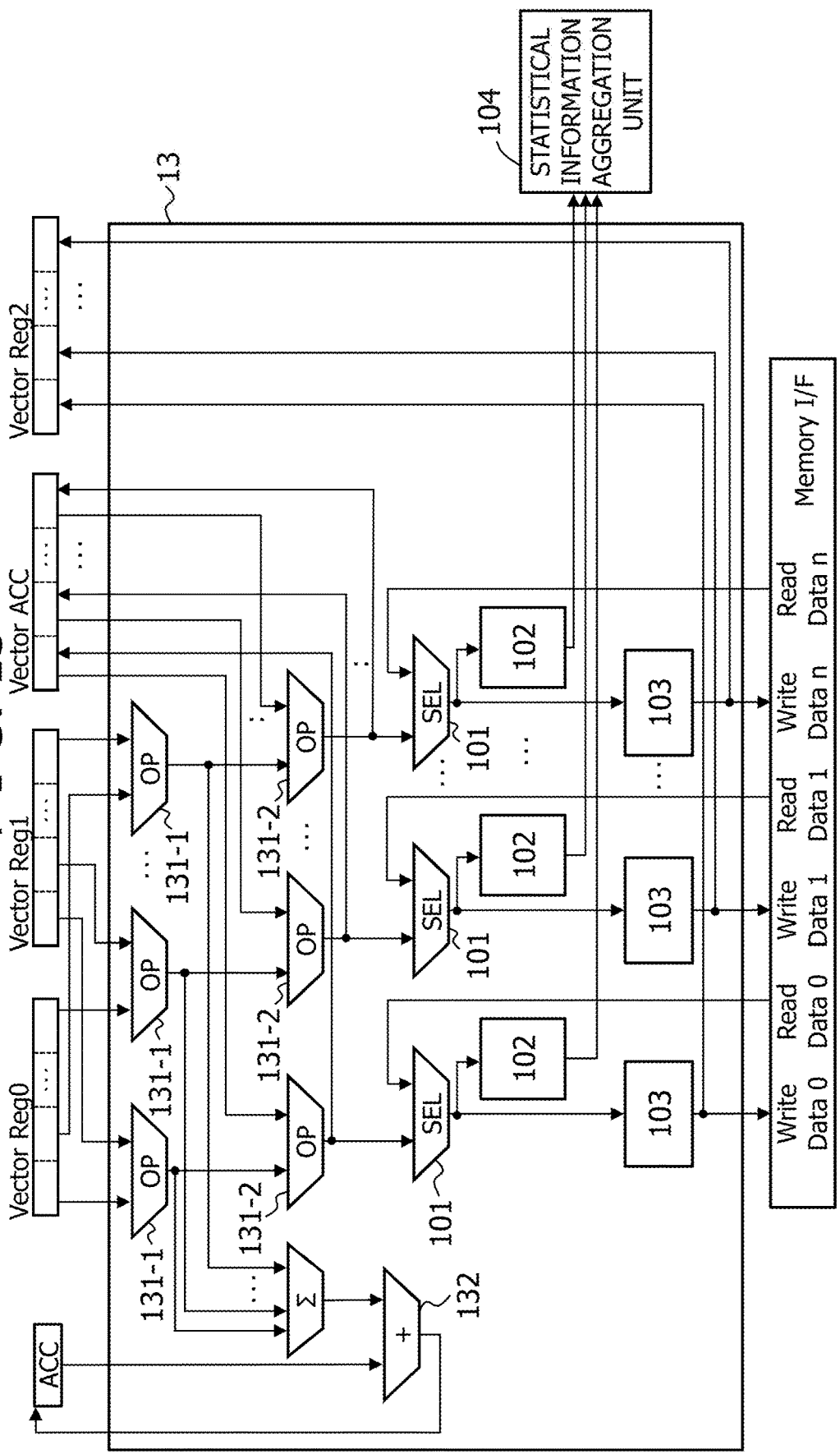
FIG. 15 exemplifies details of a vector unit.

Details of the vector unit 13 are exemplified in FIG. 15. In FIG. 15, also the statistical information aggregation unit 104 is exemplified. In the vector unit 13, data of vector registers Vector Reg0 and Vector Reg1 are arithmetically operated by arithmetic operators 131-1 for vector operation. Results of arithmetic operation of the arithmetic operators 131-1 for vector operation are inputted to the accumulator 132 for product sum arithmetic operation and arithmetic operators 131-2 for vector operation.

The accumulator 132 for product sum arithmetic operation scalar adds arithmetic operation results of the arithmetic operators 131-1 for vector operation and stores a result of the scalar addition into the scalar operation accumulator register (ACC). The arithmetic operators 131-2 for vector operation output the arithmetic operation results of the arithmetic operators 131-1 for vector operation, the data of the vector operation accumulator register (Vector ACC) or a result of addition of them in accordance with an arithmetic operation mode designated by the instruction.

The selectors 101 select the output results of the arithmetic operators 131-2 for vector operation or reading out results (Read Data 0, . . . , Read Data n) from the data memory 22 and input the selected results to the statistical information acquisition units 102 and the data conversion units 103. The statistical information acquired by the statistical information acquisition units 102 is inputted to the statistical information aggregation unit 104. Further, data converted by the data conversion units 103 are stored into the data memory 22 (Write Data 0, . . . , Write Data n) through selector not depicted or retained into a vector register (Vector Reg2).

Figure 16:
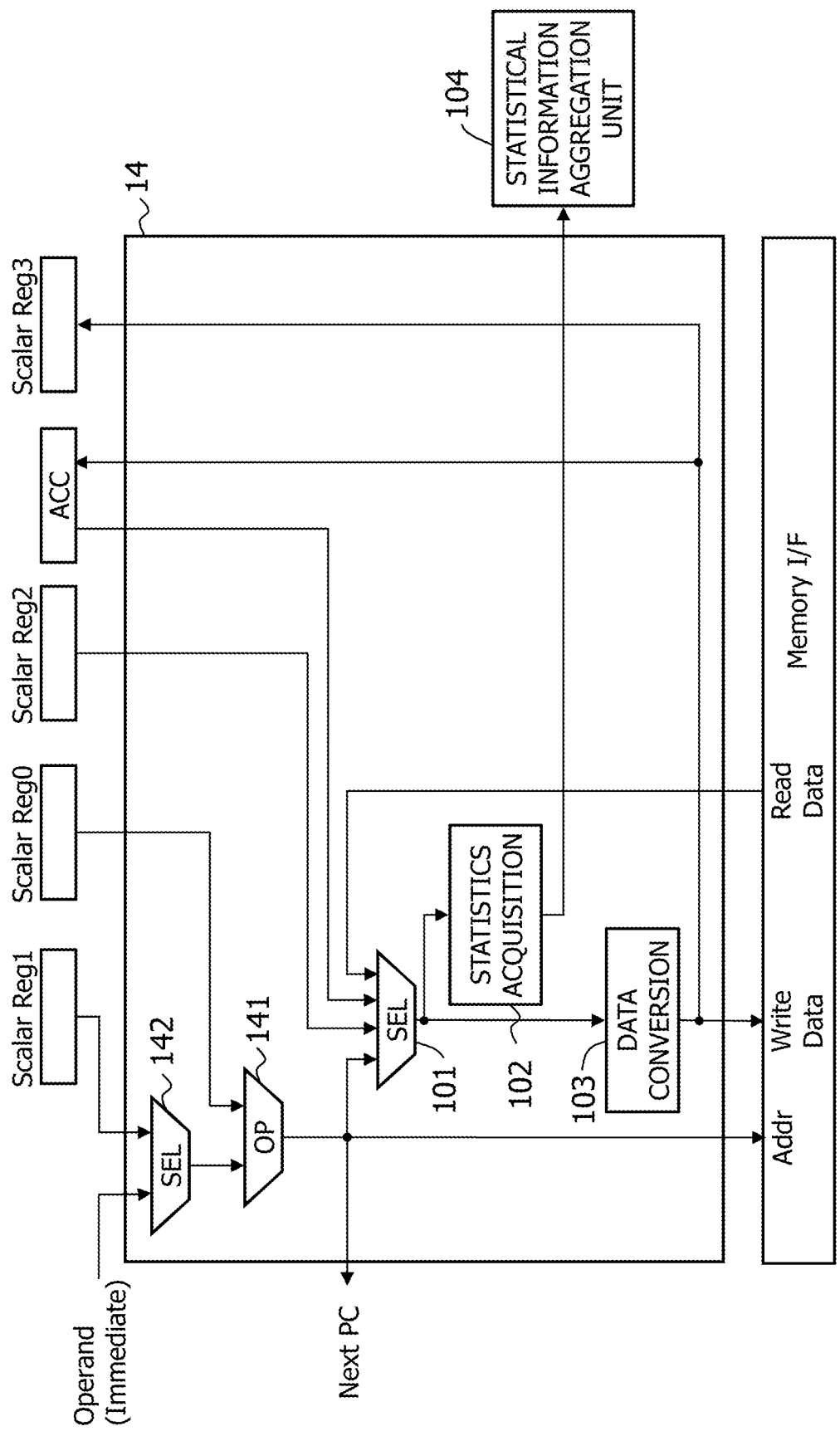
FIG. 16 exemplifies a configuration of a scalar unit.

A configuration of the scalar unit 14 is exemplified in FIG. 16. The scalar unit 14 includes a selector 142 for selecting one of data obtained from the operand of an immediate value (Immediate) and data from a scalar register Scalar Reg1, and an arithmetic operator 141 for scalar for arithmetically operating a selection result of the selector 142 and data of a scalar register Scalar Reg0. An arithmetic operation result of the arithmetic operator 141 is stored into an address (Addr) of the data memory 22 through a memory interface (Memory I/F). Further, an arithmetic operation result of the arithmetic operator 141 is inputted to a statistical information acquisition unit 102 and a data conversion unit 103 through a selector 101.

The selector 101 selects one of the arithmetic operation result of the arithmetic operator 141 for scalar, the data of the scalar register Scalar Reg2, the data of the scalar operation accumulator register (ACC) and the data (Read data) read out through the memory interface (Memory I/F). The selector 101 inputs the selected data to the statistical information acquisition unit 102 and the data conversion unit 103. The statistical information acquisition unit 102 acquires statistical information from the data inputted from the selector 101 and inputs the statistical information to the statistical information aggregation unit 104.

From among the statistical information acquisition units 102, the statistical information acquisition unit 102 that acquires a non-sign highest-order bit position is hereinafter referred to as statistical information acquisition unit 102A. Further, from among the statistical information acquisition units 102, the statistical information acquisition unit 102 that acquires a non-sign lowest-order bit position is hereinafter referred to as statistical information acquisition unit 102B. Further, from among the statistical information aggregation units 104, the statistical information aggregation unit 104 that counts bit positions acquired by the statistical information acquisition unit 102 to acquire a distribution of bits at the bit positions is referred to as statistical information aggregation unit 104A. Further, from among the statistical information aggregation unit 104, the statistical information aggregation unit 104 that performs ORing operation of bit positions acquired by the statistical information acquisition unit 102 as a preceding stage for acquiring a maximum value and a minimum value of the bit position is hereinafter referred to as statistical information aggregation unit 104B.

Figure 17:
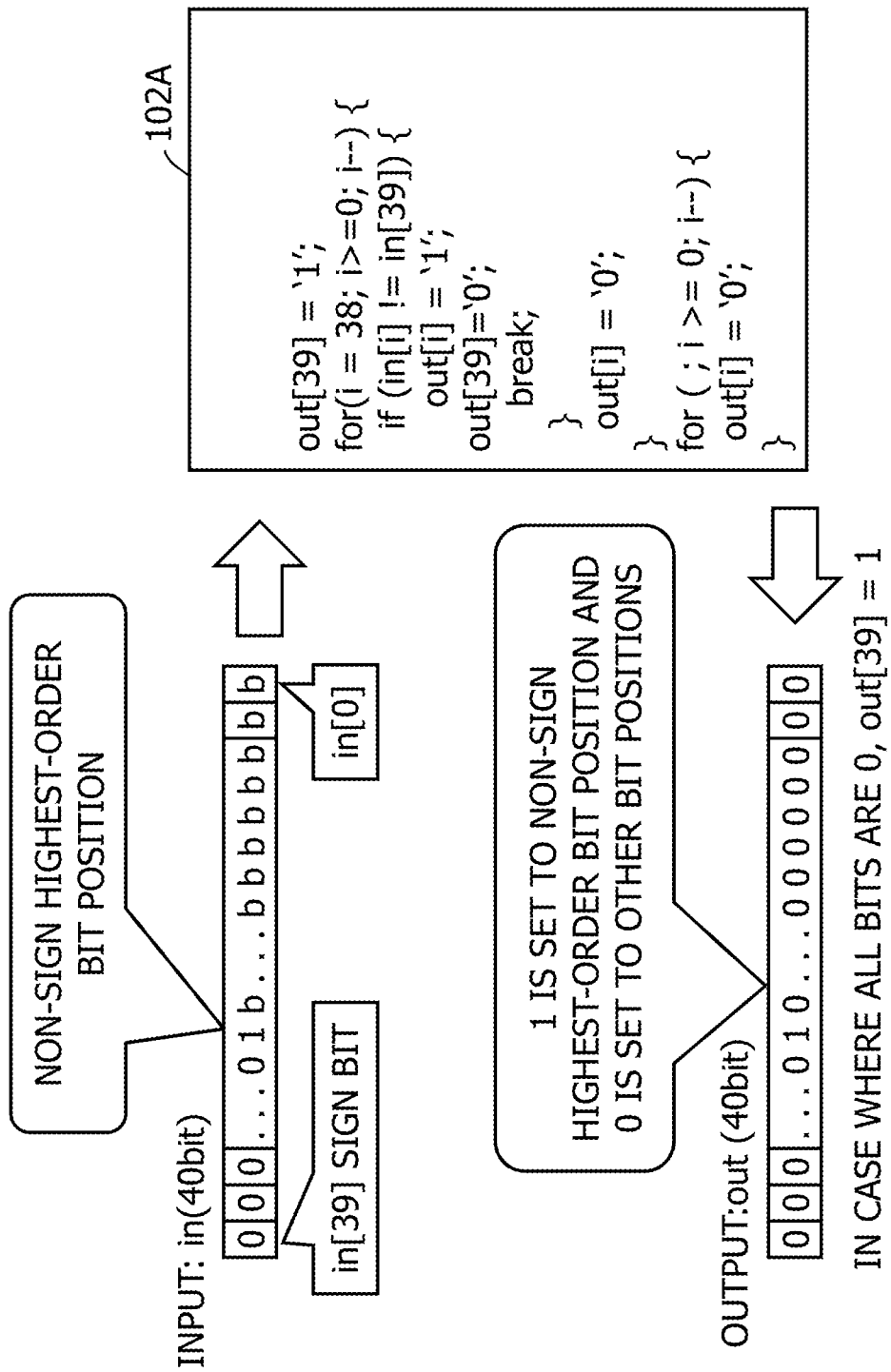
FIG. 17 exemplifies processing of a statistical information acquisition unit that acquires a non-sign highest-order bit position.

FIG. 17 exemplifies processing of the statistical information acquisition unit 102A that acquires a non-sign highest-order bit position. In FIG. 17, a process by a non-sign highest-order bit detector included in the statistical information acquisition unit 102A is exemplified. In the example of FIG. 17, input data (in(40 bit)) is exemplified in which the sign bit is 0; the bit at a position indicated as the "non-sign highest-order bit position" is 1; and all of the bits on the higher-order side of this bit are 0 while all of the bits on the lower-order side of this bit are b. Here, b is one of 0 and 1. The statistical information acquisition unit 102A processes the input data to generate output data (out(40 bit)) in which the bit at the non-sign highest-order bit position is 1 while the bits at the other bit positions are 0. In the case where the input data is 0 at all bits or 1 at all bits, 1 is outputted at the 39th bit position and 0 is outputted at the bit 38*th* and succeeding bit positions. It is to be noted that, while, in the following description, the data of the arithmetic circuit of the processor 10 is exemplified as data of 40 bits, the data of the arithmetic circuit of the processor 10 is not limited to that of 40 bits.

The non-sign highest-order bit detector searches, for a positive number, bits in a direction toward a lower-order bit from the bit in[38] and outputs the number of a bit position at which 1 is searched out first in a bit pattern of a binary number. Further, the non-sign highest-order bit detector searches, for a negative number, bits in a direction toward a lower-order bit from the bit in[38] and outputs the number of a bit position at which 0 is searched out first in a bit pattern of a binary number. Further, in the case where the input data is 0 at all bits or 1 at all bits, the non-sign highest-order bit detector outputs 1 at the bit position for the 39th bit and outputs 0 at the bit positions for the 38th and succeeding bits.

Figure 18:
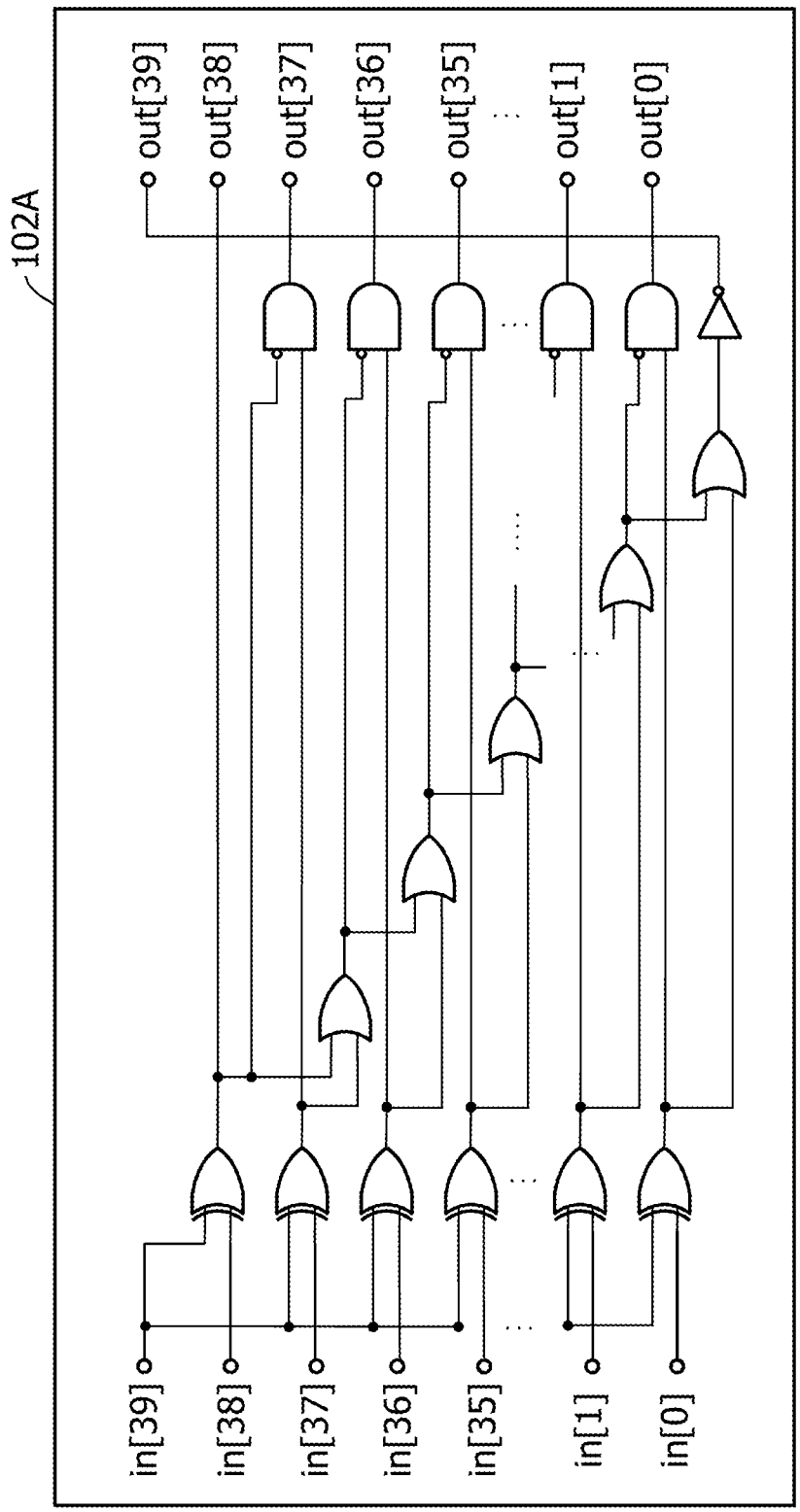
FIG. 18 exemplifies a configuration of a hardware circuit of a statistical information acquisition unit that acquires a non-sign highest-order bit position.

FIG. 18 exemplifies a configuration of a hardware circuit of the statistical information acquisition unit 102A that acquires a non-sign highest-order bit position. By this process, exclusive ORing between the sign bit in[39] and the other bits (in[38] to in[0]) is executed. Consequently, the exclusive OR value between the sign bit in[39] and a bit having a same value as that of the sign bit in[39] is 0, and the exclusive OR value between the sign bit in[39] and a bit having a value different from that of the sign bit in[39] is 1.

Now, if it is assumed that the bit in[38] has a different value from that of the bit in[39], the output data out[38] becomes 1 by exclusive ORing. On the other hand, to the output data out[37], an exclusive OR value of in[39] and in[37] is inputted through an AND gate. To the other input of the AND gate, a bit value inverted from an exclusive OR value of in[39] and in[38] is inputted. Therefore, in the case where in[39] and in[38] are incoincident, the output of the AND gate is 0 irrespective of the exclusive OR value of in[39] and in[37].

Similarly, to the output data out[36], an exclusive OR value of in[39] and in[36] is inputted through an AND gate similar to that described above. To one of inputs of the AND gate, a bit value inverted from an OR value (output of an OR gate) of two exclusive OR values including an exclusive OR value of in[39] and in[38] and an exclusive OR value of in[39] and in[37] is inputted. Therefore, in the case where in[39] and in[38] are incoincident, the output of the AND gate is 0 irrespective of the exclusive OR value of in[39] and in[36]. Similarly, the output of the AND gate is 0 irrespective of the exclusive OR value of in[39] and in[i] (i is equal to 37 or less).

On the other hand, if in[38] and in[39] have values equal to each other, the exclusive OR value of in[39] and in[38] is 0, and the output data out[38] becomes 0. Therefore, the AND gate to which the exclusive OR value of in[39] and in[37] is inputted outputs 1 or 0 depending upon the exclusive OR value of in[39] and in[37]. Similarly, the negated input of an AND gate from which out[i] (i is 37 or less) is outputted is 0 when all of the exclusive OR values of in[39] and in[j] (j is equal to or higher than j+1 and equal to or less than 38) are 0, and if the exclusive OR value of in[39] and in[i] (i is 37 or less) becomes 1, 1 is set to out[i]. Since, at a bit lower than the bit position (i), the negated input of an AND gate from which out[i] is outputted becomes 1, 0 is set to out[i]. Accordingly, by the circuit of FIG. 18, output data out(40 bit) in which 1 is set to the non-sign highest-order bit position and 0 is set to the other bits is acquired.

Figure 19:
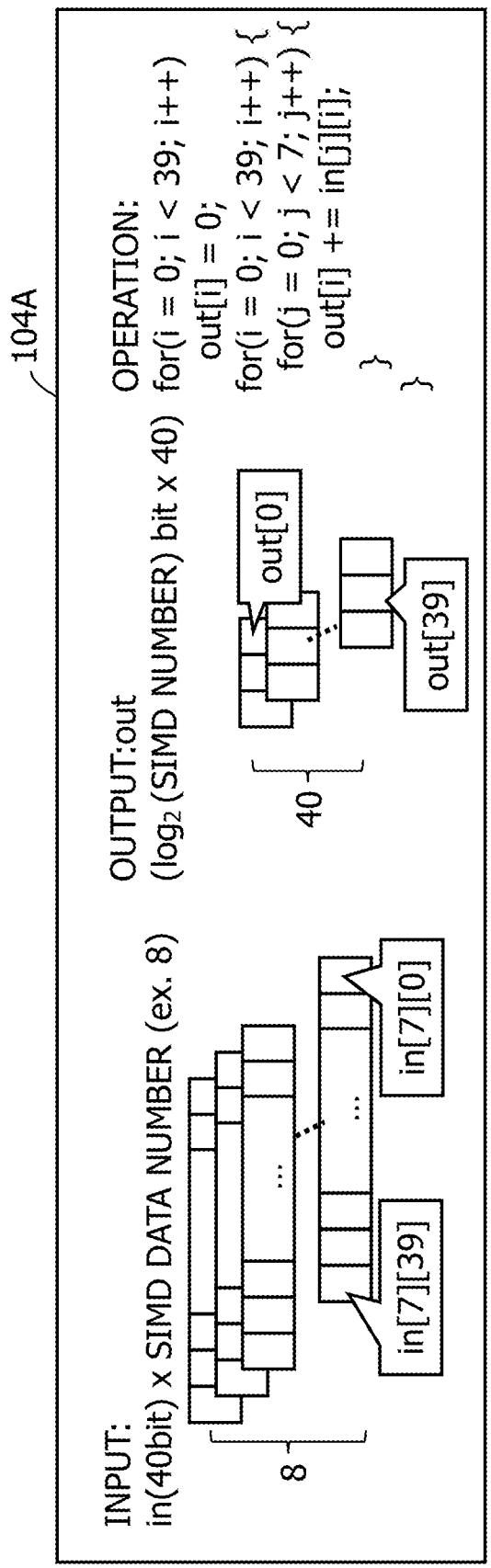
FIG. 19 exemplifies processing of a statistical information aggregation unit of the comparative example.

FIG. 19 is a view exemplifying a process of the statistical information aggregation unit 104A that acquires a distribution of bits from data acquired by the statistical information acquisition unit 102. In FIG. 19, a process for acquiring a distribution of bits from SIMD data where 8 data of 40 bits are processed in parallel is exemplified. In FIG. 19, a process of the statistical information aggregation unit 104A that is a hardware circuit is described in pseudo codes.

For example, input data are exemplified as 8 (rows)×40 (bits) array data. Meanwhile, input data of 40 bits for each row represents a non-sign highest-order bit position (output of the statistical information acquisition unit 102A of FIG. 18) or a non-sign lowest-order bit position. In this process, for the output data out of 40 bits, all bits are cleared. Then, the values of elements of the columns i of the input data array in[j][i] are added to all rows (j=0 to 7). Accordingly, different from FIG. 17, in the pseudo codes of FIG. 19, the output data (array element) out[j] is an integer of log 2(SIMD data number) bits (in the example of FIG. 19, 3 bits). It is to be noted that, although it is assumed that, in FIG. 19, the SIMD data number (number of data to be processed in parallel) is 8, the SIMD data number is not restricted to 8.

Figure 20:
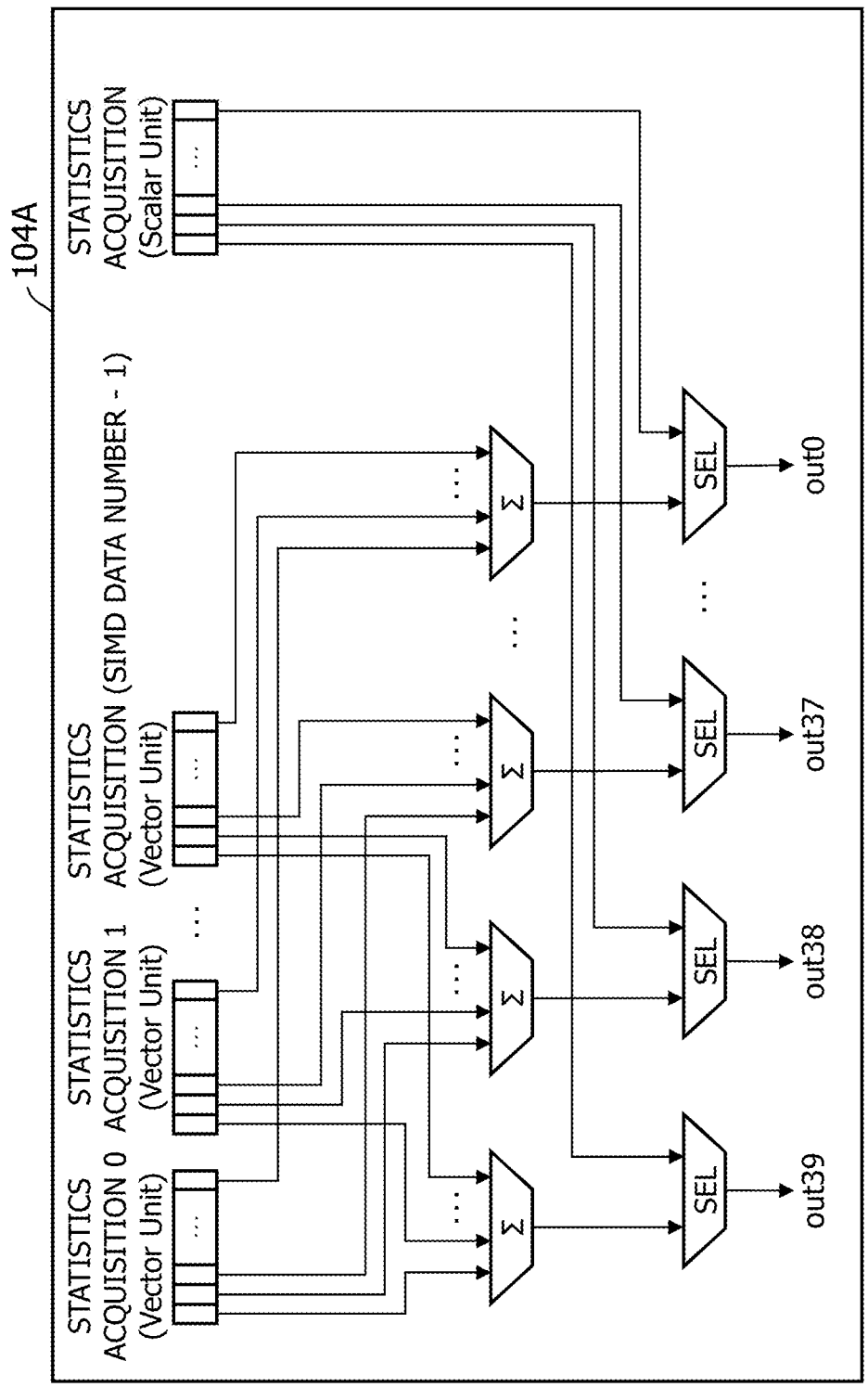
FIG. 20 exemplifies a configuration of a hardware circuit of the statistical information aggregation unit of the comparative example.

FIG. 20 exemplifies a configuration of a hardware circuit of the statistical information aggregation unit 104A that acquires a distribution of bits from data acquired by the statistical information acquisition unit 102. From data acquired by the statistical information acquisition unit 102 (here, from statistics acquisition 0 to statistics acquisition (SIMD data number−1)), the number of 1s at the ith bit (i=0 to 39) of eight series of statistical information is counted by bit population count operation. The input data is a non-sign highest-order bit position acquired by the statistical information acquisition unit 102A (FIGS. 17 and 18). Accordingly, the statistical information aggregation unit 104A counts the appearance time number of "1" at each bit from a number of non-sign highest-order bit positions equal to the number of SIMD data acquired by the statistical information acquisition unit 102A to count the appearance time number of each highest-order bit position. The statistical information aggregation unit 104A stores the count results into the output data out0 to out39.

Also it is possible to use a non-sign lowest-order bit position by the statistical information acquisition unit 102B as the input data. The statistical information aggregation unit 104A counts the appearance time number of "1" of each bit from a number of non-sign lowest-order bit positions equal to the number of SIMD data acquired by the statistical information acquisition unit 102B to count the appearance time number of each lowest-order bit position. The statistical information aggregation unit 104A stores the count results into the output data out0 to out39. For example, the statistical information aggregation unit 104A may process any of a non-sign highest-order bit position and a non-sign lowest-order bit position.

Each selector (SEL) in FIG. 20 selects data acquired from a bit population count arithmetic operator (Σ) and the scalar unit 14. The data selected by the selectors (SEL) are outputted to the output data out0 to out39. Accordingly, data acquired by the scalar unit 14 in the statistical information acquisition units 102 are outputted, in arithmetic operation by one time of the scalar unit 14, as they are to the output data out0 to out39 without being added. The output data out0 to out39 are data to be passed to the statistical information storage unit 105 (refer to the input data in0 to in39 of 105A of FIGS. 22 and 105B of FIG. 23).

Figure 21:
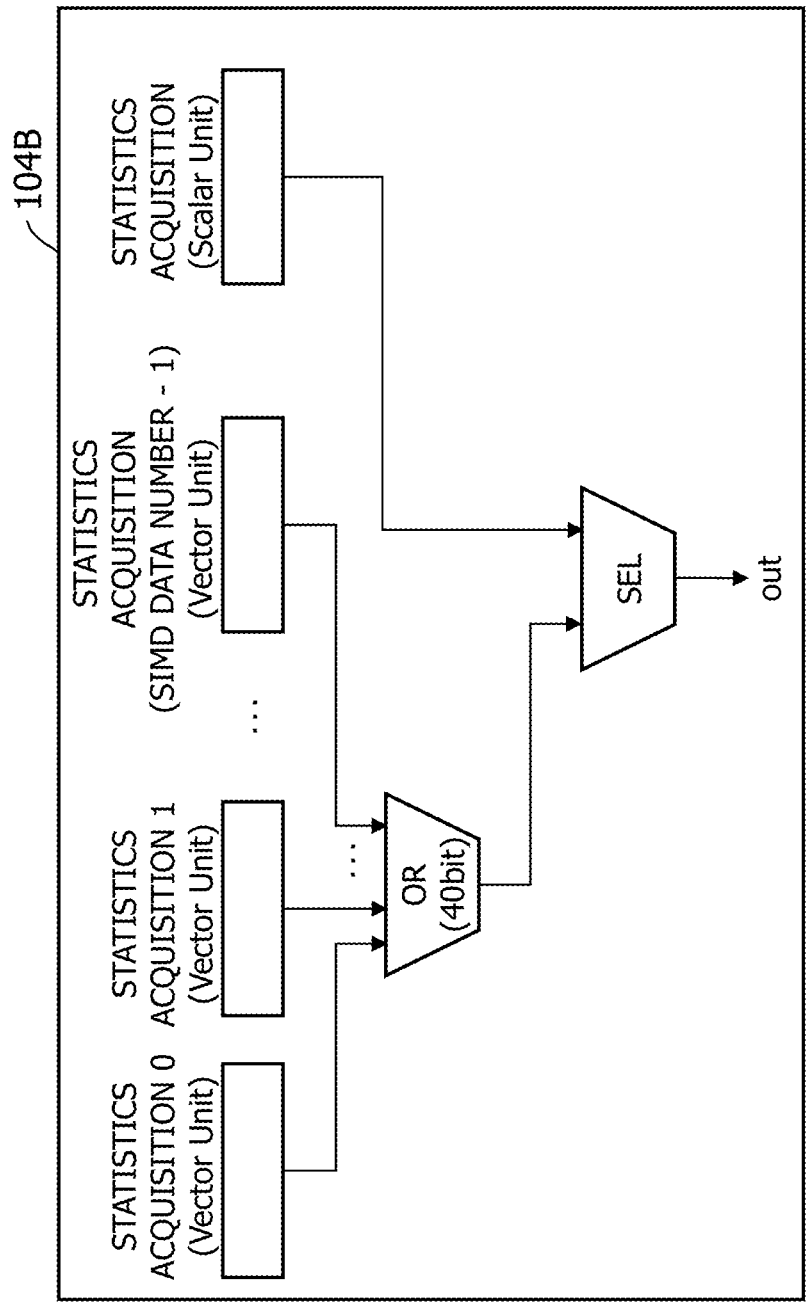
FIG. 21 exemplifies a configuration of a hardware circuit of a statistical information aggregation unit that aggregates bit positions by ORing operation.

FIG. 21 exemplifies a configuration of a hardware circuit of the statistical information aggregation unit 104B that aggregates bit positions by ORing operation as a premise to acquire a maximum value and a minimum value of a bit position from data acquired by the statistical information acquisition units 102. Data acquired by the statistical information acquisition units 102 (here, statistics acquisition 0 to statistics SIMD data number–1) are ORed by an OR gate (40 bits). Further, a selector (SEL) in FIG. 21 selects the ORed value (OR) and data acquired from the scalar unit 14. The data selected by the selector (SEL) is outputted to the output data out. Accordingly, the data acquired by the scalar unit 14 in the statistical information acquisition units 102 are outputted, in one time arithmetic operation, as they are to the output data out without being ORed. The output data out is data to be passed to the statistical information storage unit 105.

Figure 22:
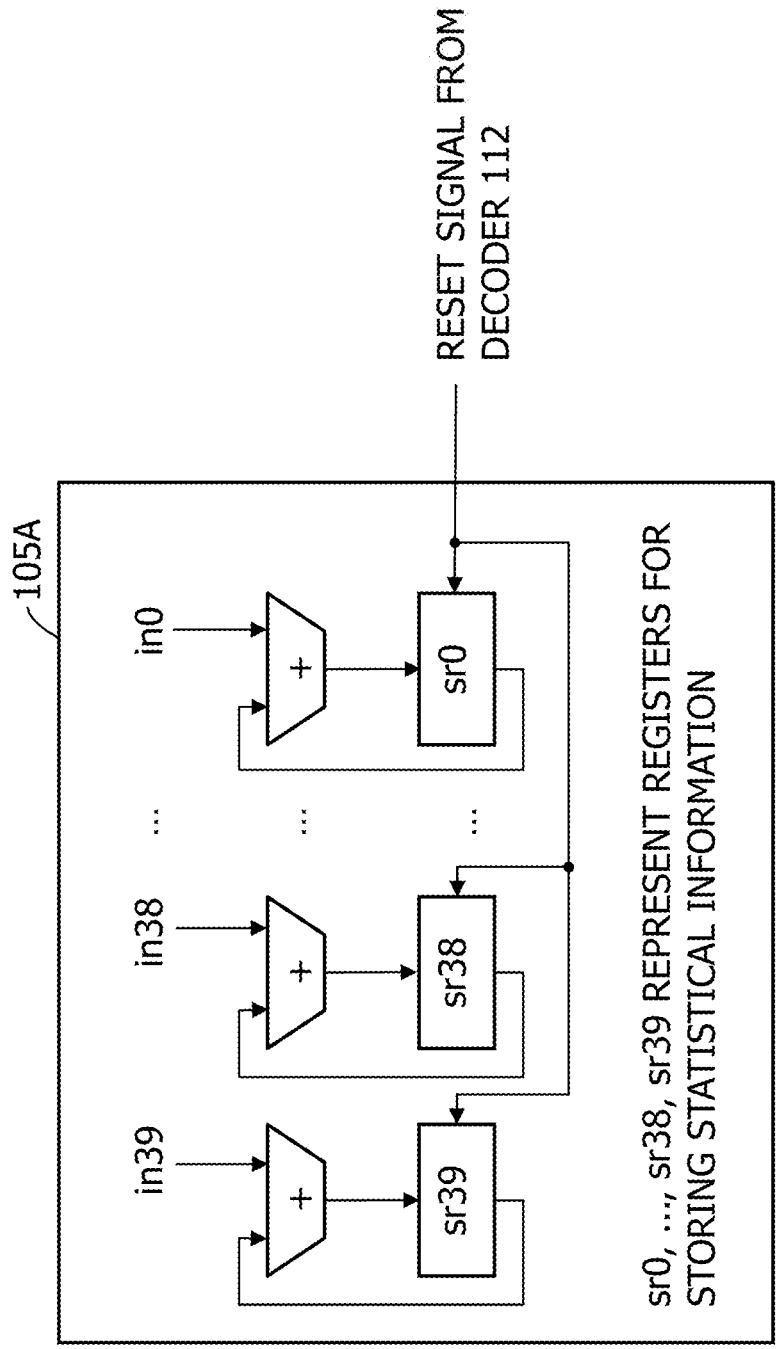
FIG. 22 exemplifies a configuration of a statistical information storage unit that stores statistical information from a statistical information aggregation unit into a register for exclusive use.

FIG. 22 exemplifies, as a particular example of the statistical information storage unit 105 (refer to FIG. 14), a configuration of the statistical information storage unit 105A that stores statistical information from the statistical information aggregation unit 104A into a register for exclusive use. In FIG. 22, in39 to in0 indicate statistical information from the statistical information aggregation unit 104 corresponding to out39 to out0 of FIG. 20. Further, sr39 to sr0 are values of registers that store the statistical information. The processor 10 writes initial values v39 to v0 into one or a plurality of ones of the registers sr39 to sr0 through selectors not depicted in accordance with a write instruction. However, the processor 10 may reset the registers sr39 to sr0 by a reset signal from a decoder. The processor 10 accumulates statistical information using an adder and stores the statistical information into the registers sr39 to sr0 every time an instruction with a statistical information acquisition function is executed. Further, the processor 10 reads out one or a plurality of ones of values from one of the registers (sr39 to sr0) and saves the values into a data memory designated by a reading out instruction or into a general purpose register designated by the reading out instruction.

Figure 23:
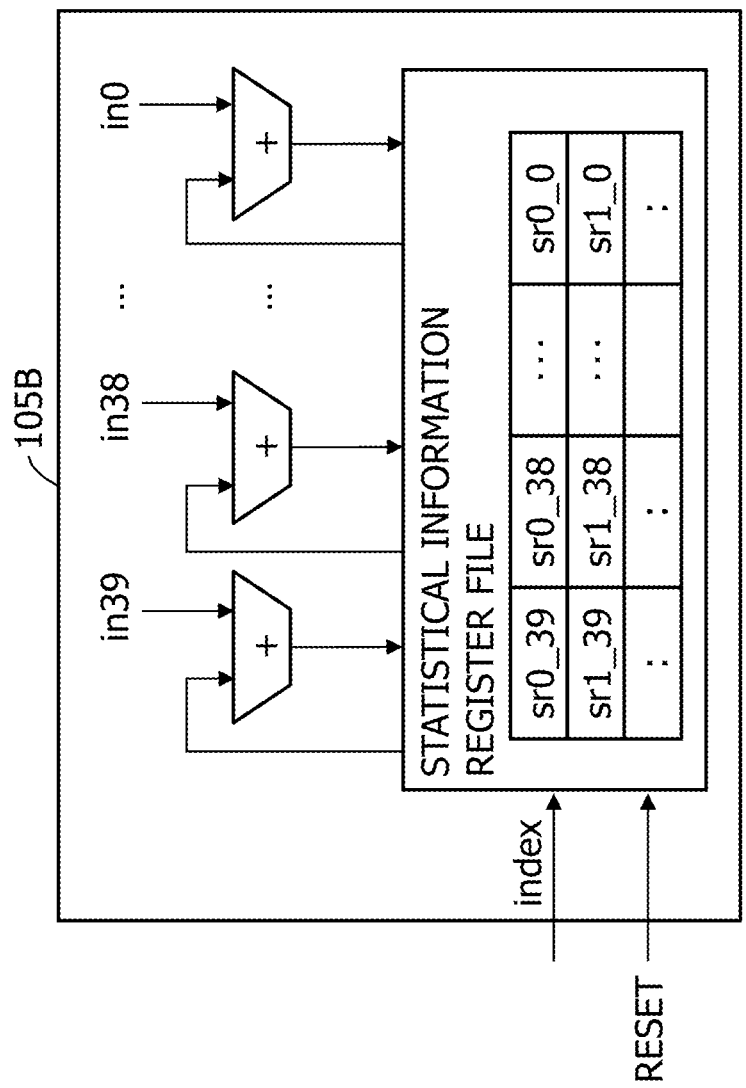
FIG. 23 exemplifies a modification to a statistical information aggregation unit.

FIG. 23 exemplifies a modification to the statistical information aggregation unit 104 and is an example of a configuration of a circuit by which the storage destination of statistical information is designated by an index from the decoder 112. In FIG. 23, for example, regions of sr[j][i] (j= 0, . . . , k, i=0, . . . , 39) are secured, and a row j of a register file is designated by index.

The processor 10 writes an initial value into one or a plurality of ones of the row j of the register file designated by index through a selector not depicted in accordance with a write instruction. It is to be noted, however, that the processor 10 may reset the row j of the register file designated by index in accordance with a control signal from the decoder 112. Then, the processor 10 accumulates statistical information from in39 to in0 by an adder and stores the accumulated statistical information into the row j of the register file designated by index. Further, the processor 10 reads out statistical information from the row j of the register file designated by index in accordance with a control signal from the decoder 112. Further, the processor 10 reads out one or a plurality of values of the row j of the register file designated by index and saves the read out values into a data memory designated by the reading out instruction or stores the read out values into a general purpose register designated by the reading out instruction.

<Instruction with Statistical Information Acquisition Function>

In the following, a configuration of the instruction with a statistical information acquisition function is exemplified. Here, as a configuration method of an instruction, a method 1 and a method 2 are exemplified.

(Method 1)

In the method 1, to an instruction set of the processor 10, an arithmetic operation instruction, a load instruction and so forth for acquiring statistical information are added individually. The configuration of an instruction given below is exemplary, and the instruction with a statistical information acquisition function by the processor 10 is not limited to the instruction given below.

[vmul_s instruction] configuration of instruction: vmul_s vs, vt, vd, imm

The vmul_s instruction is an instruction to the processor 10 for multiplying the vector registers vs and vt, shifting a result of the multiplication by imm bits, performing rounding and saturation and then storing a result of the sounding and saturation into the vector register vd. The processor 10 acquires statistical information before shift of the multiplication result and accumulates the statistical information into a statistical information register. The statistical information register is, for example, sr0 to sr39 of FIG. 22, the statistical information register file srj_i (j=0, 1, . . . , i=0, 1, . . . ) of FIG. 23 or the like. The statistical information register is similar in the following description.

It is to be noted that also read/write and load/store instructions for causing the processor 10 to transfer statistical information between an internal register of the processor 10 and the data memory 22 are prepared separately. Further, a reset instruction for causing the processor 10 to reset the internal register may be prepared separately. This similarly applies also in the following description.

[vld_s instruction] configuration of instruction: vld_s ss, st, rd

The vld_s instruction is an instruction for causing the processor 10 to load vector data from an address obtained by addition of the address registers ss and st and storing the vector data into the vector register rd. The processor 10 acquires statistical information of the loaded data and accumulates the statistical information into the statistical information register.

[read_acc_s instruction] configuration of instruction: read_acc_s, rd, imm

The read_acc_s instruction is an instruction for causing the processor 10 to shift data of the accumulator register (40 bits) by imm bits, perform rounding and saturation and store resulting data into the scalar register rd. The processor 10 acquires and accumulates statistical information of the accumulator register into the statistical information register.

(Modification to Method 1)

In addition to the method 1 described above, a register index (s) for storing statistical information may be added to the operand of an instruction such that a storage destination of statistical information may be designated. In the following, the configuration of the instruction is exemplified. The index (s) of the instruction designates index of the statistical information register file of FIG. 23 or the like.

vmul_s vs, vt, vd, imm, svld_s ss, st, vd, sread_acc_s, rd, imm, s (Method 2)

Figure 24:
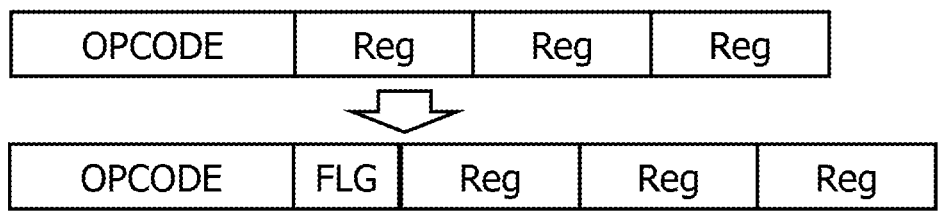
FIGS. 24 and 25 exemplify instruction formats.

An instruction format by the method 2 is exemplified in FIG. 24. The instruction format may be expanded such that a bit for designating whether or not statistical information is to be acquired is added. For example, a statistical information acquisition function may be added to all instructions. FIG. 24 exemplifies the expanded instruction format. As depicted in FIG. 24, FLG=1 designates acquisition of statistical information. On the other hand, FLG=0 does not designate acquisition of statistical information and is an instruction same as that described hereinabove.

(Modification to Method 2)

Figure 25:
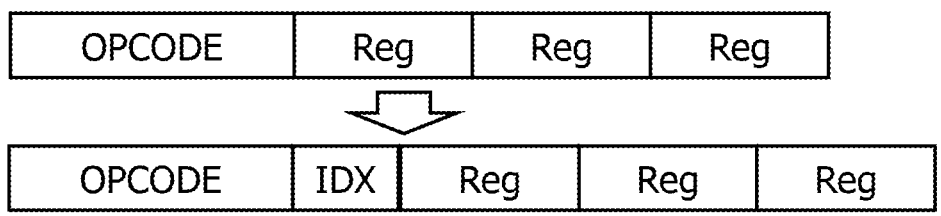

FIG. 25 exemplifies an instruction format according to a modification to the method 2. The instruction format may be expanded such that a register index into which statistical information is to be stored is designated. In FIG. 25, IDX indicates the register index (index of FIG. 23). It is to be noted, however, that, in the case where IDX=000, the processor 10 does not acquire statistical information. The decoder 112 decodes the instruction format of FIG. 25 to acquire the register index IDX.

Since the information processing apparatus executes such an instruction with a statistical information acquisition function as described above, the instruction with a statistical information acquisition function may be executed by a subroutine for exclusive use. A compiler may incorporate, when it compiles the subroutine for exclusive use, the instruction with a statistical information acquisition function into an execution form. Alternatively, the subroutine for exclusive use may be created by an assembly language such that execution of the instruction with a statistical information acquisition function is designated. In a computer program for causing the information processing apparatus to execute deep learning, such a subroutine for exclusive use as described above may be called.

<Execution Procedure>

Figure 26:
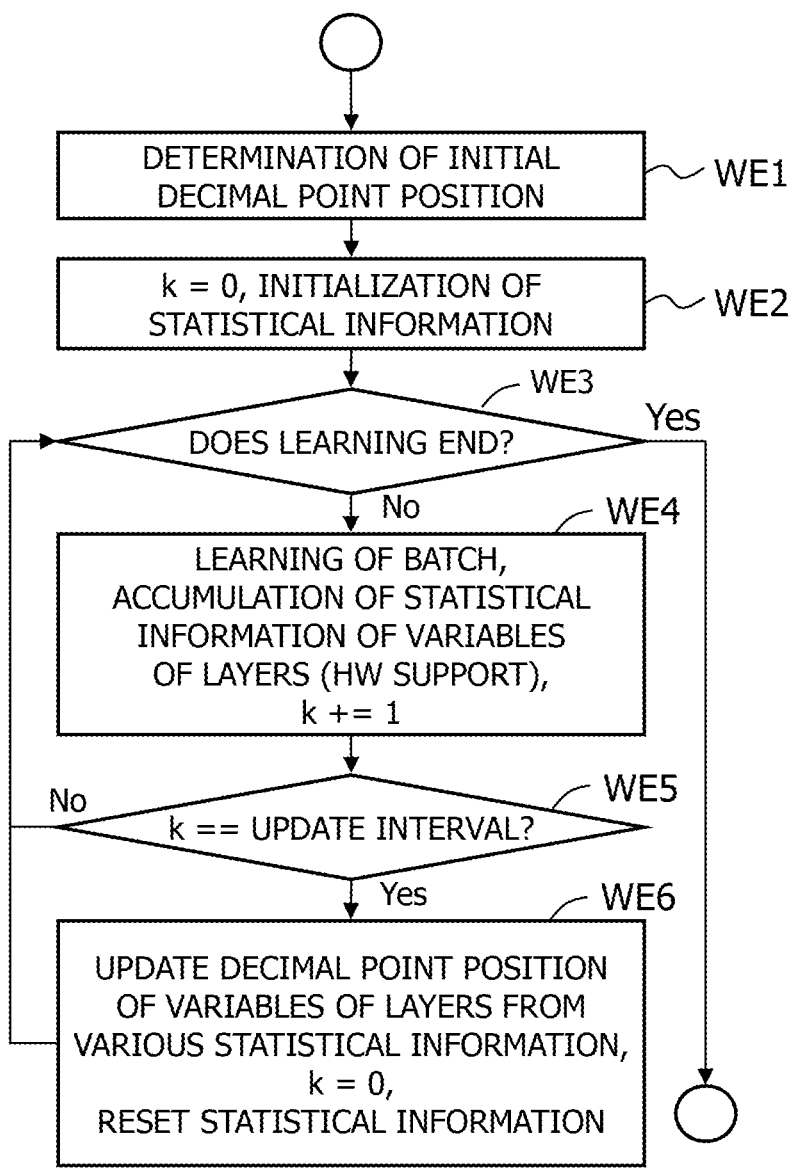
FIG. 26 exemplifies a flow chart of a learning process by the information processing apparatus of the comparative example.

FIG. 26 exemplifies a flow chart of a learning process by the information processing apparatus of the comparative example. In this process, the information processing apparatus determines an initial decimal point position (WE1).

The information processing apparatus may determine an initial decimal point position for each variable from experiment values or actual values in the past or by user designation.

Then, the information processing apparatus initializes a time number k to 0. Further, the information processing apparatus initializes a variable for storing statistical information in the program (WE2). Then, the information processing apparatus decides whether or not a condition for ending learning is satisfied (WE3). The learning is ended in the case where errors in the entire coupling layer (fc2) become equal to or smaller than a reference value or where the learning time number reaches a prescribed maximum value.

In the case where the condition for ending learning is not satisfied, the information processing apparatus executes a next mini batch. At this time, the information processing apparatus accumulates statistical information of each variable of each layer into the statistical information register or the statistical information register file. The accumulation of statistical information is executed by hardware of the processor 10 as described hereinabove. Then, the information processing apparatus counts up the variable k (WE4).

Then, the information processing apparatus decides whether or not the time number k reaches an update interval (WE5). In the case where the time number k does not reach the update interval, the information processing apparatus returns the processing to the process at WE3. On the other hand, in the case where time number k reaches the update interval, the information processing apparatus reads out statistical information from the statistical information register, the statistical information register file or the region of the memory in which the statistical information is saved, in which various kinds of statistical information are accumulated. Then, the information processing apparatus updates the decimal point position of each variable of each layer based on the read out statistical information (WE6).

At this time, the information processing apparatus may determine the decimal point position such that, for example, the ratio of data to be saturated and data to underflow to the entire data number satisfies a target condition. Further, in the case where both the ratio of the data to be saturated to the entire data and the ratio of the data to underflow to the entire data are difficult to satisfy the target condition, the information processing apparatus may prioritize one of them. As an alternative, the information processing apparatus may set a decimal point position such that an average of a bit position of an upper limit at which saturation does not occur and a bit position of a lower limit at which effective data exists is positioned at the center of a range within which data may be represented in a fixed point number. Further, the information processing apparatus initializes the time number k to 0 and resets the registers for storing statistical information. Then, the information processing apparatus returns to the process of C3.

Embodiment 1

Figure 27:
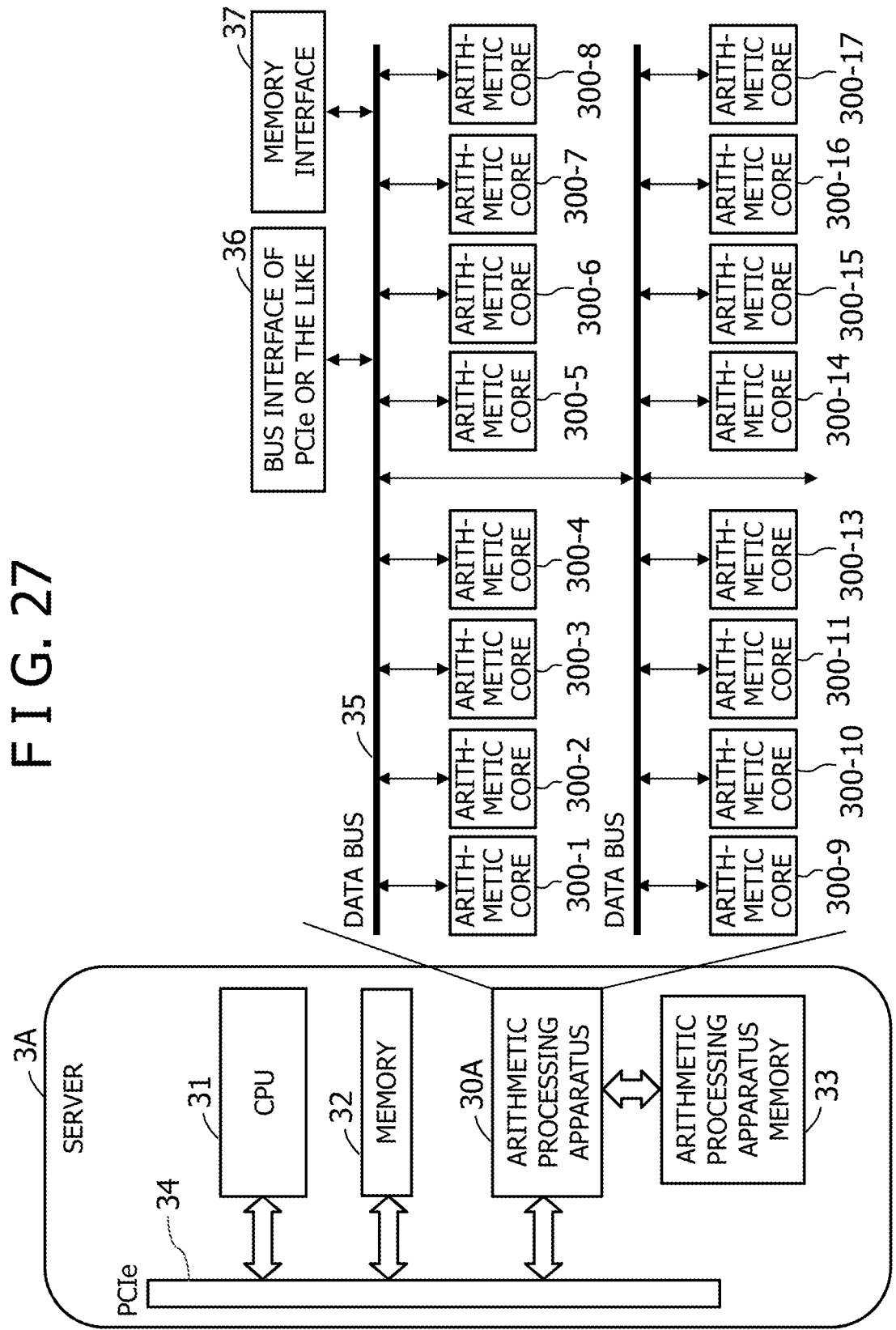
FIG. 27 exemplifies a configuration of a server according to an embodiment 1.

In the following, a server 3, an arithmetic processing apparatus 30, an arithmetic core 300 and a control method for them according to an embodiment 1 are described with reference to FIGS. 27 to 46. FIG. 27 is a view exemplifying a configuration of a server 3A according to the embodiment 1. The server 3A is configured such that a central processing unit (CPU) 31, a memory 32, an arithmetic processing apparatus 30A and an arithmetic processing apparatus memory 33 are coupled to each other by a bus 34 of peripheral component interconnect (PCI) express (PCIe) or the like. The CPU 31 is an example of a processing apparatus. The memory 32 is an example of a main storage apparatus.

The arithmetic processing apparatus 30A is coupled to the arithmetic processing apparatus memory 33 for exclusive use and executes arithmetic operation using the arithmetic processing apparatus memory 33. The arithmetic processing apparatus 30A includes a plurality of arithmetic cores 300 based on single instruction multiple data (SIMD) instructions. The plurality of arithmetic cores 300 are individually distinguished from each other by branch numbers like arithmetic cores 300-1 to 300-16 (k=1 to 16). However, the number of arithmetic cores 300 is not restricted to 16. Each arithmetic core 300 is an example of an arithmetic processor.

The arithmetic cores 300 are communicatable with each other through a data bus 35. Further, the arithmetic cores 300 are coupled to the CPU 31 and so forth coupled to the bus 34 through the data bus 35 and a bus interface 36 on the higher-order side such as a PCIe interface. Further, the arithmetic cores 300 are coupled to the arithmetic processing apparatus memory 33 through the data bus 35 and a memory interface 37.

Accordingly, the arithmetic processing apparatus 30A accepts an instruction of the CPU 31 through the bus 34, bus interface 36 and data bus 35 and executes arithmetic operation in parallel by the plurality of arithmetic cores 300. On the other hand, the CPU 31 controls the plurality of arithmetic cores 300 in the arithmetic processing apparatus 30A in accordance with a program deployed for execution in the memory 32.

Figure 28:
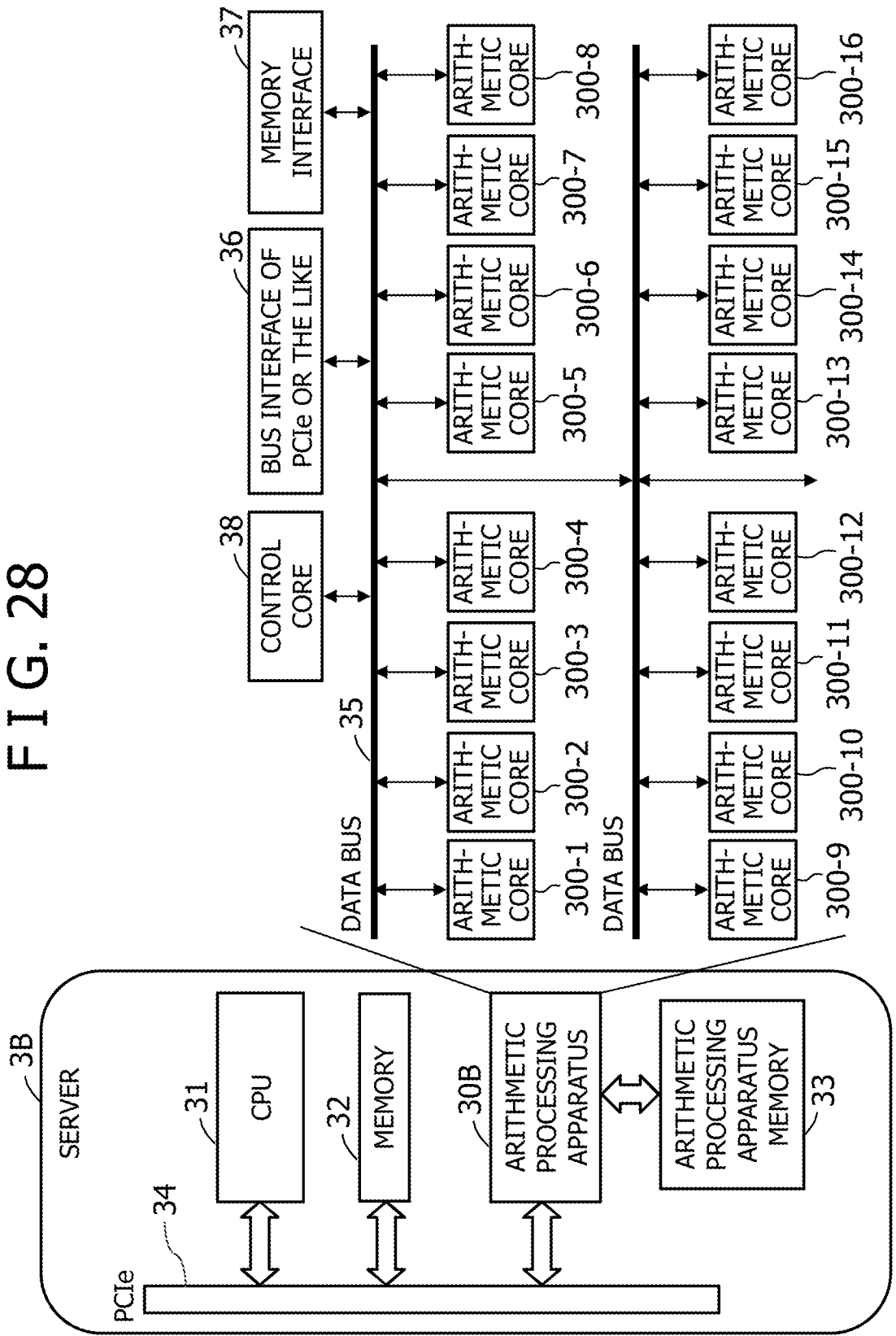
FIG. 28 exemplifies a configuration of another server according to the embodiment 1.

FIG. 28 is a view exemplifying a configuration of a server 3B according to the embodiment 1. The server 3B is configured such that a CPU 31, a memory 32, an arithmetic processing apparatus 30B and an arithmetic processing apparatus memory 33 are coupled to each other through a bus 34 similarly to the server 3A. The difference between the server 3A and the server 3B resides in difference between the arithmetic processing apparatus 30A and the arithmetic processing apparatus 30B. The arithmetic processing apparatus 30B is different from the arithmetic processing apparatus 30A, which does not include a control core 38, in that it includes the control core 38.

For example, the control core 38 controls the plurality of arithmetic cores 300 in the arithmetic processing apparatus 30B in place of the CPU 31. The plurality of arithmetic cores 300 in the arithmetic processing apparatus 30B execute arithmetic operation in parallel under the control of the control core 38. Accordingly, the difference between the arithmetic processing apparatus 30A and the arithmetic processing apparatus 30B resides in whether control of the arithmetic cores 300 is executed by the CPU 31 or by the control core 38 and the arithmetic processing apparatus 30A and the arithmetic processing apparatus 30B have no difference from each other except this. Therefore, the arithmetic processing apparatus 30A and the arithmetic processing apparatus 30B are collectively referred to also as arithmetic processing apparatus 30. It is to be noted that the server 3A and the server 3B are collectively referred to also as server 3. Further, the configuration and operation of the data bus 35, bus interface 36 and memory interface 37 of the arithmetic processing apparatus 30B are similar to those of the arithmetic processing apparatus 30A, and therefore, description of the same is omitted. The arithmetic processing apparatus 30A, 30B, 30 or the like is an example of an arithmetic processing apparatus. The server 3A, 3B, 3 or the like is an example of an information processing apparatus.

Figure 29:
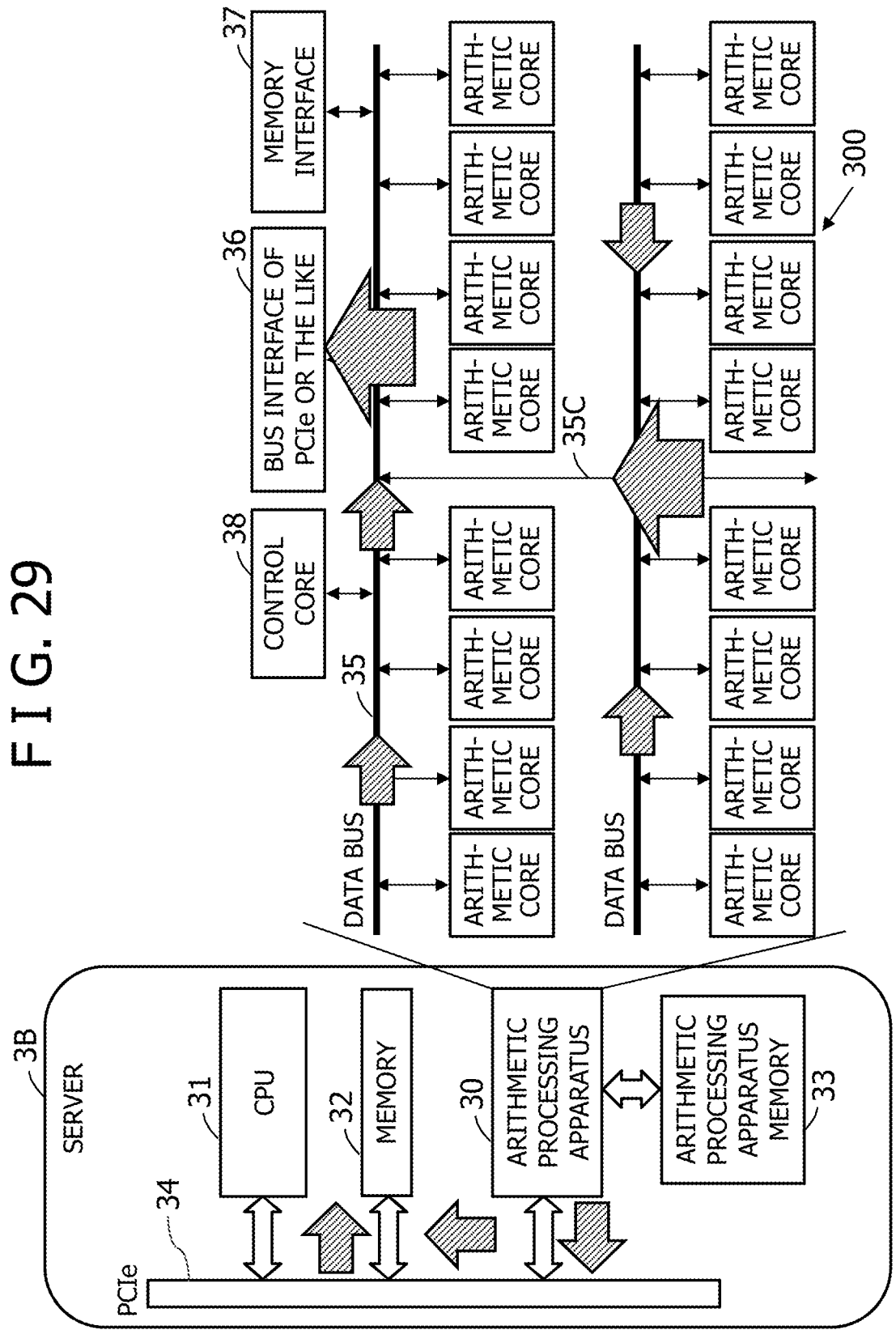
FIGS. 29 and 30 exemplify different subjects in a case where a process based on statistical information exemplified in the comparative example is applied to a server.
Figure 30:
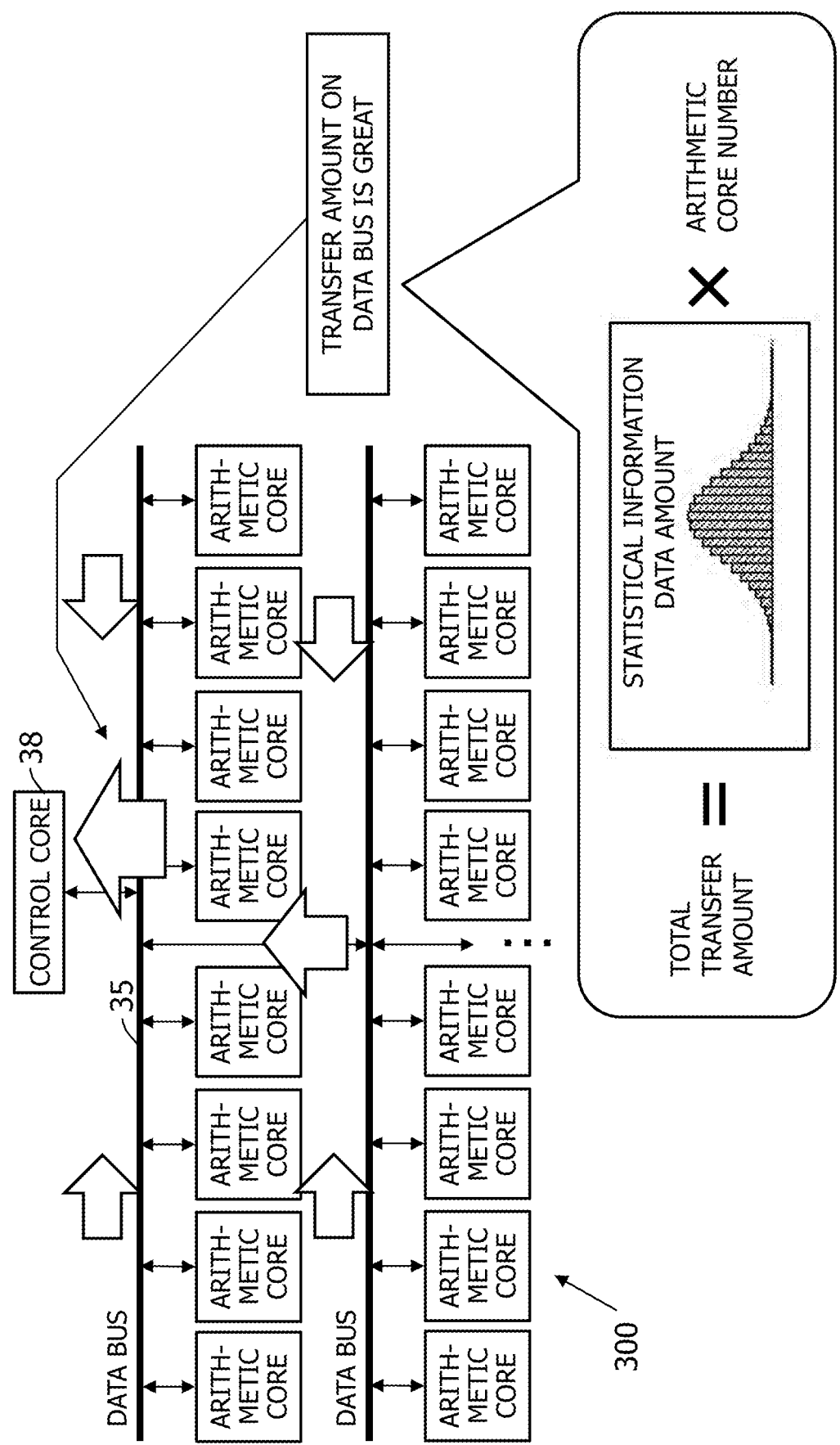

FIGS. 29 and 30 exemplify a subject in the case where the process based on statistical information exemplified in the comparative example is applied to the server 3B. Although FIGS. 29 and 30 exemplify the server 3B, a subject similar to that of the server 3B occurs with the server 3A. For example, statistical information acquired by the arithmetic cores 300 is stored into the memory 32 through the data bus 35 and the bus interface 36 of PCIe or the like. Else, statistical information acquired by the arithmetic cores 300 is stored into the arithmetic processing apparatus memory 33 through the data bus 35 and the memory interface 37 (FIG. 29). The control core 38 aggregates the statistical information stored in the arithmetic processing apparatus memory 33 (FIG. 30).

In FIG. 29, a data bus 35 composed of a plurality of segments is coupled at a coupling portion 35C on the line. If a large number of arithmetic cores 300 are coupled to the data bus 35, at the coupling portion 35C of the data bus 35, transferred statistical information occupies an increasing bandwidth as the position on the coupling portion 35C of the data bus 35 comes near to the bus interface 36. As a result, at a position on the coupling portion 35C nearer to the bus interface 36, the transfer data amount is greater. Further, the load on the bus interface 36 increases.

As described in the comparative example, the statistical information is an accumulation of appearance time numbers of the non-sign highest-order bit position (or the non-sign lowest-order bit position) in a bit number (for example, 40 bits) in an arithmetic operator. Accordingly, the bandwidth of the data bus 35 and the bus interface 36 increases in accordance with the product of the data amount of the statistical information and the arithmetic core number. For example, if the number of the arithmetic cores 300 in the arithmetic processing apparatus 30B is 128, a data amount 128 times that in the case of the single arithmetic core 300 is transferred through the data bus 35 and the bus interface 36.

FIG. 31 exemplifies a subject relating to the comparative example and the embodiment 1. The reason why statistical information is acquired, aggregated and outputted to an external register or the like in the comparative example is that it is intended to solve the subject exemplified in FIG. 31. It is to be noted that, although, in FIG. 31, in order to facilitate display and understandings, data is indicated in a decimal number, actually what is processed in the arithmetic processing apparatus 30 is binary data.

For example, it is assumed that in the arithmetic processing apparatus 30, fixed point data to be outputted from the arithmetic core 300 is a decimal number of 8 digits and the fixed point position is set such that the fixed point data represents the 11th to 18th digits. If the bit number of the fixed point data is reduced for reduction of the circuit scale and the power consumption, the number of digits that may be represented decreases. As a result, in the case where the fixed point position is fixed, the effective digit number of data gradually decreases by repetition of a process such as learning. As depicted in FIG. 31, for example, the effective digit number in decimal number becomes four at the middle stage of processing, and at the last stage, for example, the effective digit number may possibly become zero.

Therefore, in the case where the process of the comparative example described above is applied as it is to the embodiment 1, after arithmetic operation, a program executed by the CPU 31 or the like instructs the arithmetic processing apparatus 30 to adjust the range of effective digits. Consequently, the range of fixed point data may be caused to follow up decrease of the numerical value as exemplified on the lower side in FIG. 31. For example, from the middle stage to the last stage of the process, an application program executed by the CPU 31 indicates a fixed point position to the arithmetic processing apparatus 30 in response to a distribution of the range of digits of data indicated by the statistical information. Such adjustment makes it possible for the server 3 to set a decimal point position of fixed point data, for example, a range of effective digits, appropriately in response to a distribution of ranges of digits of fixed point data after the arithmetic operation. As a result, processing of deep learning (DL) or the like may be achieved with a small number of effective digits. Since an application program makes it possible to adjust the decimal point position of such fixed point data, for example, as exemplified in FIG. 12, in the comparative example, a distribution of positions of non-sign highest-order bits is acquired and aggregated.

For example, there is a subject that it is wanted to adjust the range of digits of fixed point data such that a number of data as great as possible may be included in a range indicated by the "representable region" in FIG. 12. Therefore, in the comparative example, the processor 10 suppresses cancellation during arithmetic operation by arithmetically operating each variable in deep learning by an accumulator or the like having a sufficient bit number (for example, 40 bits). Thus, the processor 10 acquires frequency information of the "non-sign highest-order digit position (or non-sign lowest-order digit position)" from the calculation result for each variable. Then, for example, the application program of the server 3 determines a maximum digit position at which saturation does not occur except high-order A % of the bits (there is the possibility that the data may be singular data). Then, the application program of the processor 10 in the comparative example causes the processor 10 to execute an instruction for changing the digit position of the fixed point data such that the determined digit position may become the highest-order digit to change to the digit position. Consequently, in the changed range of digit positions, data at digit positions higher than the highest-order digit position are saturated and data at digit positions lower than the lowest-order digit position are rounded. Accordingly, it cannot be denied that there is no effect if the technique of the comparative example is applied as it is in such a configuration of the embodiment 1 as exemplified in FIG. 27 or 28. However, this gives rise to a problem that the possibility that the load of data transfer, the circuit scale for processing data transfer, the power consumption and so forth as exemplified in FIGS. 29 and 30 may increase becomes high.

FIG. 32 is a view exemplifying solving means in the arithmetic processing apparatus 30 of the embodiment 1. In FIG. 32, solving means for the comparative example is depicted at the upper stage, and as an improvement method for the solving means at the supper stage, solving means by the embodiment 1 is exemplified for contrast at the lower stage. In the comparative example at the upper stage, statistical information is collected from all digits (40 bits) in order to determine the higher-order A % (overflow rate of singular data).

In the embodiment 1, the statistical information to be acquired by each arithmetic core 300 is changed from a frequency distribution to a cumulative distribution. Here, the cumulative distribution is information (hereinafter referred to as first statistical information) of an accumulation of bit patterns obtained by setting a flag from the highest-order bit position having a non-sign bit value to the least significant bit (LSB) for a plurality of fixed point number data that are arithmetic operation results. For example, in 40 bits (bit 0 to bit 39) that are an arithmetic operation result, the LSB is the bit 0. The bit 39 is a sign bit (MSB). It is assumed that, from among bit positions having a value different from the value of the bit 39, the bit k is the highest-order bit (bit nearest to the sign bit). Consequently, the arithmetic processing apparatus 30 in the embodiment 1 generates a bit pattern in which a flag bit (=1) is set within a range from the bit k to the bit 0 (LSB) and the bit "0" is set within a range from the bit k+1 to the bit 39 (MSB).

Then, the arithmetic processing apparatus 30 collects and accumulates, for example, every time vector operation is executed, a bit pattern from each arithmetic operator included in the vector arithmetic operator to generate a cumulative distribution. According to the procedure described above, it may be considered that the numerical value at each digit in the cumulative distribution is a sample number indicating that a non-sign bit value exists at the digit and higher-order digits than the digit.

Since the sample number represented by each digit of the cumulative distribution is the accumulation sample number from the most significant digit (MSB) to the digit, the sample number at digit positions exceeding A % of the cumulative distribution corresponds to the "sample number of all digits before A % is exceeded" in the comparative example. Therefore, the arithmetic processing apparatus 30 may acquire information for specifying the digit positions exceeding a given threshold value by only transferring sample number information for one digit and the digit position information similarly as in the comparative example.

It is to be noted that, in order to calculate the ratio (A %) of the distribution at digit positions exceeding a given threshold value for the overall cumulative distribution, a total sample number of the entire cumulative distribution that becomes the denominator is required. However, the total sample number of the entire cumulative distribution is known from the circuit configuration. For example, in one time vector operation in the arithmetic core 300, arithmetic operation is executed by a number equal to the number of vector arithmetic operators arranged in parallel. Therefore, the total sample number per one time vector operation is the number of vector arithmetic operators arranged in parallel. In the case where also scalar operation is included in the sample number of the entire cumulative distribution, integration may be performed by a number of times equal to the number of arithmetic operators of a totalization target of the cumulative distribution.

FIG. 33 depicts an example of processing for determining a distribution of lowest-order bit positions having a non-sign bit value as statistical information. Also in FIG. 33, solving means in the comparative example is depicted at the upper stage, and as an improving method for the solving means at the upper stage, solving means in the embodiment 1 is exemplified for contrast at the lower stage. For example, the arithmetic processing apparatus 30 may determine, as a cumulative distribution, information (hereinafter referred to as second statistical information) of an accumulation of bit patterns obtained by setting a flag bit to positions from the lowest-order bit position having a non-sign bit value to the most significant bit (MSB). For example, it is assumed that the arithmetic processing apparatus 30 determines that, from among bit positions having a value different from the value of the bit 39, the bit k is a lowest order bit (nearest to the bit 0). Consequently, the arithmetic processing apparatus 30 in the embodiment 1 generates a bit pattern in which a flag bit (=1) is set within a range from the bit k to the bit 39 (MSB) while the bit "0" is set within a range corresponding to the bit k−1 to the bit 0 (LSB).

Then, the arithmetic processing apparatus 30 collects and accumulates, for example, every time vector operation is executed, a bit pattern from each arithmetic operator included in the vector arithmetic operator to generate a cumulative distribution. The decision based on a distribution of lowest-order bit positions having a non-sign bit value is effective in the case where very small abnormal data on a data distribution is to be excluded.

<Configuration>

Figure 34:
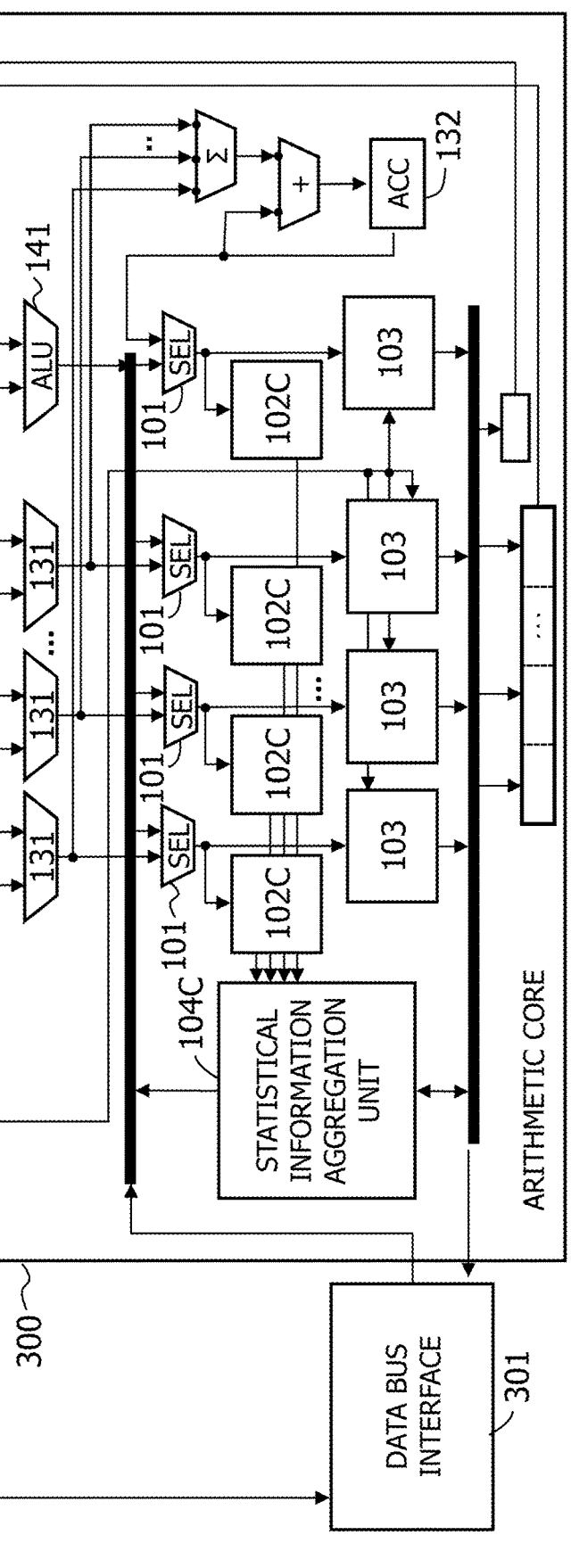
FIG. 34 exemplifies a configuration of an arithmetic core according to the embodiment 1.
Figure 35:
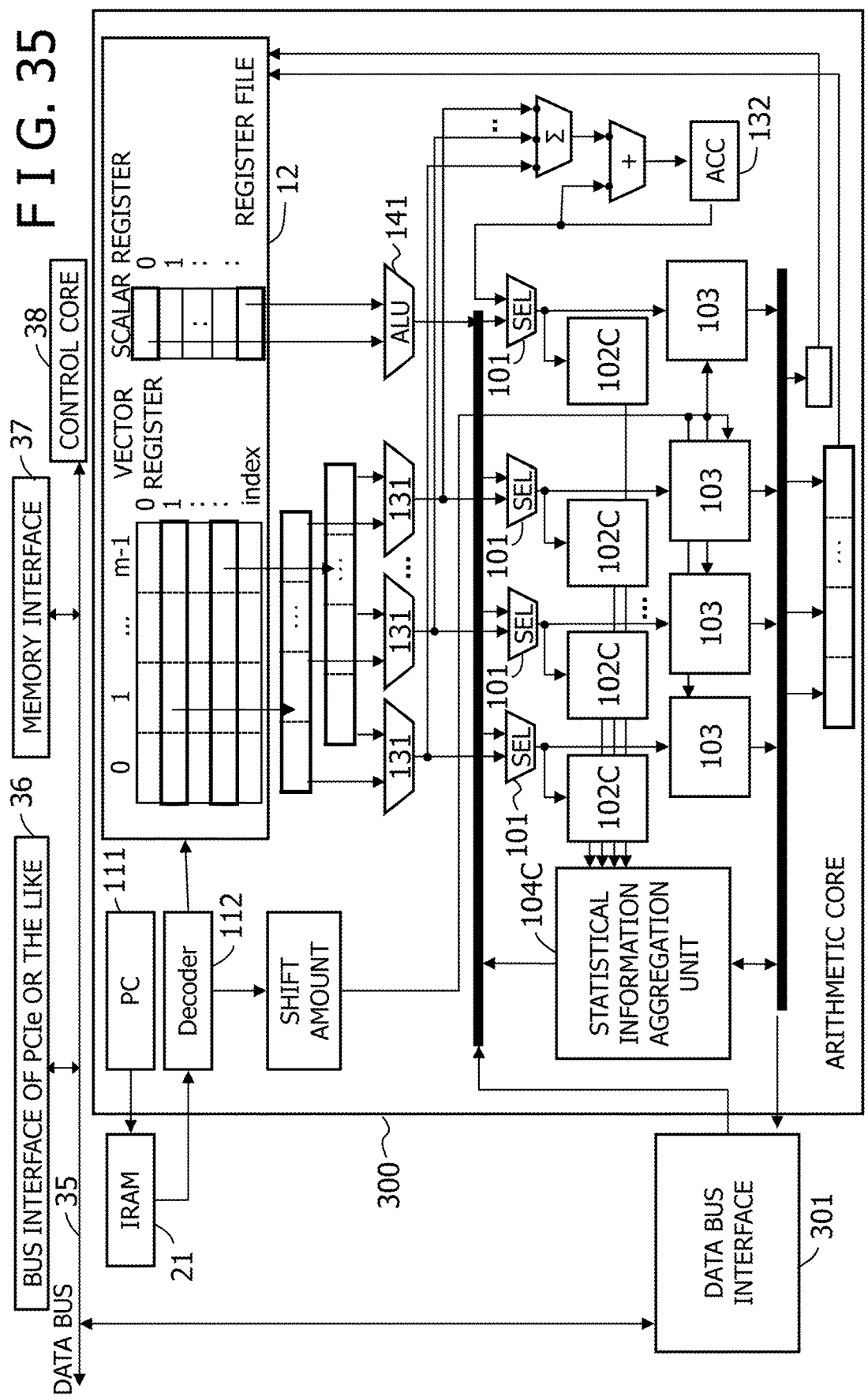
FIG. 35 exemplifies another configuration of an arithmetic core according to the embodiment 1.

Each of FIGS. 34 and 35 exemplifies a configuration of the arithmetic core 300 according to the embodiment 1. FIG. 34 depicts a data bus interface 301, a data bus 35, a bus interface 36 of PCIe or the like and a memory interface 37 together with an arithmetic core 300. It is to be noted that the data bus interface 301 may be included in the arithmetic core 300. Meanwhile, in FIG. 35, a control core 38 is coupled to the data bus 35. On the other hand, FIG. 34 exemplifies an arithmetic core 300 included in an arithmetic processing apparatus 30A that does not include a control core. Further, FIG. 35 exemplifies an arithmetic core 300 included in an arithmetic processing apparatus 30B that includes a control core. However, the arithmetic cores 300 of FIGS. 34 and 35 are similar in configuration and operation except that the arithmetic core 300 in FIG. 34 is controlled by a CPU 31 while the arithmetic core 300 in FIG. 35 is controlled by the control core 38.

Similarly to the processor 10 (FIG. 13) of the comparative example, The arithmetic core 300 includes a PC 111, a decoder (Decoder) 112, a register file 12, arithmetic operators 131 for vector operation, an ALU 141 for scalar operation and an accumulator 132 for adding results of the arithmetic operators 131 for vector operation. The arithmetic core 300 further includes a plurality of selectors 101 for selecting an arithmetic operation result of the arithmetic operators 131 for vector operation, arithmetic operator 141 for scalar operation, accumulator 132 and so forth and a reading out result from the data memory 22. It is to be noted that the plurality of selectors in FIGS. 34 and 35 are collectively referred to as selector 101. Further, the plurality of arithmetic operators for vector operation in FIGS. 34 and 35 are collectively referred to as arithmetic operator 131.

The arithmetic core 300 further includes statistical information acquisition units 102C for acquiring statistical information from data selected by the selectors 101 and an statistical information aggregation unit 104C for aggregating the statistical information acquired by the statistical information acquisition units 102C. It is to be noted that the plurality of statistical information acquisition units 102C in FIGS. 34 and 35 are collectively referred to as statistical information acquisition unit 102C. Further, the processor 10 includes data conversion units 103 for changing the fixed point position of data selected by the selectors 101. Further, the plurality of data conversion units in FIGS. 34 and 35 are collectively referred to as data conversion unit 103.

The arithmetic core 300 is different from the processor 10 of the comparative example, which includes the statistical information acquisition units 102 (102A, 102B), statistical information aggregation unit 104 (104A, 104B) and statistical information storage unit 105 (105A), in that it includes the statistical information acquisition units 102C and the statistical information aggregation unit 104C. In the embodiment 1, the statistical information acquisition unit 102C is different from that of the comparative example in that it acquires a cumulative distribution of a flag exemplified in FIG. 32 (or FIG. 33). For example, in the embodiment 1, the statistical information acquisition units 102C are different from the statistical information acquisition units 102 (102A, 102B) that acquire distribution information of non-sign highest-order bits (or distribution information of non-sign lowest-order bits) of the comparative example. Each of the statistical information acquisition units 102C is an example of a statistical information acquisition unit. Since the arithmetic operators 131 for vector operation, the ALU 141 for scalar operation and so forth output statistical information relating to a plurality of fixed point number data that are results of arithmetic operation executed thereby so as to be acquired by the statistical information acquisition units 102C, each of them is an example of an arithmetic unit that executes an arithmetic operation instruction for fixed point number data.

Meanwhile, the statistical information aggregation unit 104C is different from the statistical information aggregation unit 104 (104A) of the comparative example, which aggregates distribution information of non-sign highest-order bits (or distribution information of non-sign lowest-order bits), in that it stores a cumulative distribution of bit patterns of flag bits exemplified in FIG. 32 (or FIG. 33). A combination of such a statistical information acquisition unit 102C and a statistical information aggregation unit 104C is an example of a statistical information acquisition unit.

The arithmetic core 300 is coupled to the data bus 35 through the data bus interface 301 and is coupled to the bus 34 of PCIe or the like and further to the CPU 31 through the bus interface 36. Further, the arithmetic core 300 is coupled from the data bus 35 to the arithmetic processing apparatus memory 33 through the memory interface 37 (refer to FIGS. 27 and 28).

Each arithmetic core 300 acquires a bit pattern acquired by the statistical information acquisition units 102C as a cumulative distribution. In the following description of the present embodiment, the cumulative distribution of the bit pattern acquired by the statistical information acquisition units 102C is referred to as statistical information. To each arithmetic core 300, a digit position to be acquired from statistical information (cumulative distribution) is set. Here, the digit position is a digit position provided, for example, when arithmetic operation of fixed point data is performed, corresponding to each bit position of the fixed point data and is a digit position with regard to which statistical information (cumulative distribution) is accumulated.

The digit position may be designated arbitrary as a hyper parameter by the user. The statistical information aggregation unit 104C outputs cumulative distribution data (also called sample number) of a designated digit from within the cumulative distributions acquired by the statistical information acquisition unit 102C. For example, the statistical information aggregation unit 104C of each arithmetic core 300 extracts sample number information of statistical information within a section of −L to +M digits (L and M are integers) before and after the designated digit position. Each arithmetic core 300 transfers the extracted sample information to the control core 38 or the CPU 31. It is to be noted that the component corresponding to the statistical information storage unit 105 of the comparative example is provided, in the embodiment 1, for example, as a register not depicted in the statistical information acquisition unit 102C.

Figure 36:
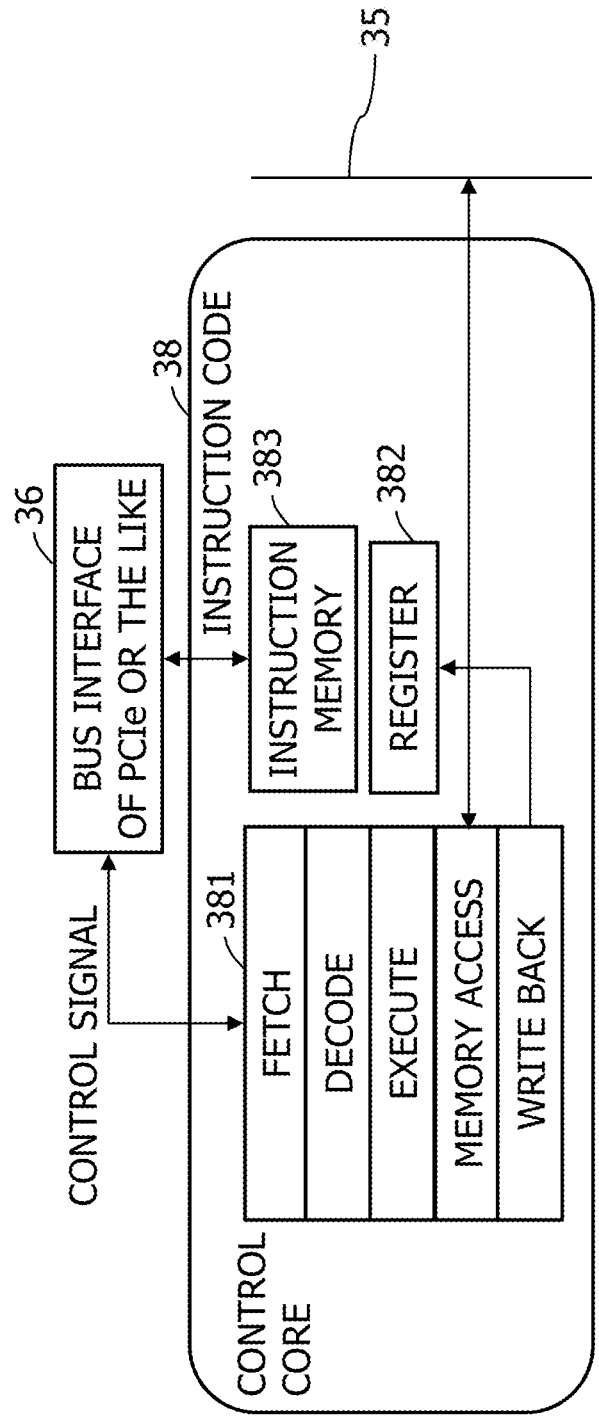
FIG. 36 exemplifies a configuration of a control core.

FIG. 36 exemplifies a configuration of the control core 38. As the control core 38, for example, Reduced Instruction Set Computer (RISC) or Digital Signal Processor (DSP) is used. The control core 38 includes a controller 381, a register 382 and an instruction memory 383. The control core 38 retains the body of an instruction code into the memory 32 (refer to FIG. 28) on the bus 34 through the bus interface 36 of PCIe or the like or into the arithmetic processing apparatus memory 33 coupled to the control core 38 by the memory interface 37.

The controller 381 of the control core 38 stores an instruction code into the instruction memory 383 through the bus interface 36, for example, of PCIe. The CPU 31 activates the control core 38 in accordance with a control signal received through the bus interface 36 of PCIe or the like. The controller 381 of the control core 38 successively fetches and decodes a code of the instruction memory 383 and executes an instruction such as arithmetic operation. The controller 381 of the control core 38 accesses the arithmetic core 300 or the arithmetic processing apparatus memory 33 through the data bus 35 to transfer data to and from the register 382. It is to be noted that writing of data of the memory 32 into the register 382 by the controller 381 is referred to as write back.

A plurality of arithmetic cores 300 exemplified in FIG. 34 or 35 are provided in the arithmetic processing apparatus 30 and are coupled to each other through the data bus 35 such that they execute arithmetic operation in parallel. However, the components of the arithmetic core 300 other than the statistical information acquisition units 102C and the statistical information aggregation unit 104C are similar to those of the processor 10 of the comparative example as described above. Thus, in the following description of the embodiment 1, the statistical information acquisition units 102C and the statistical information aggregation unit 104C are described in detail.

Figure 37:
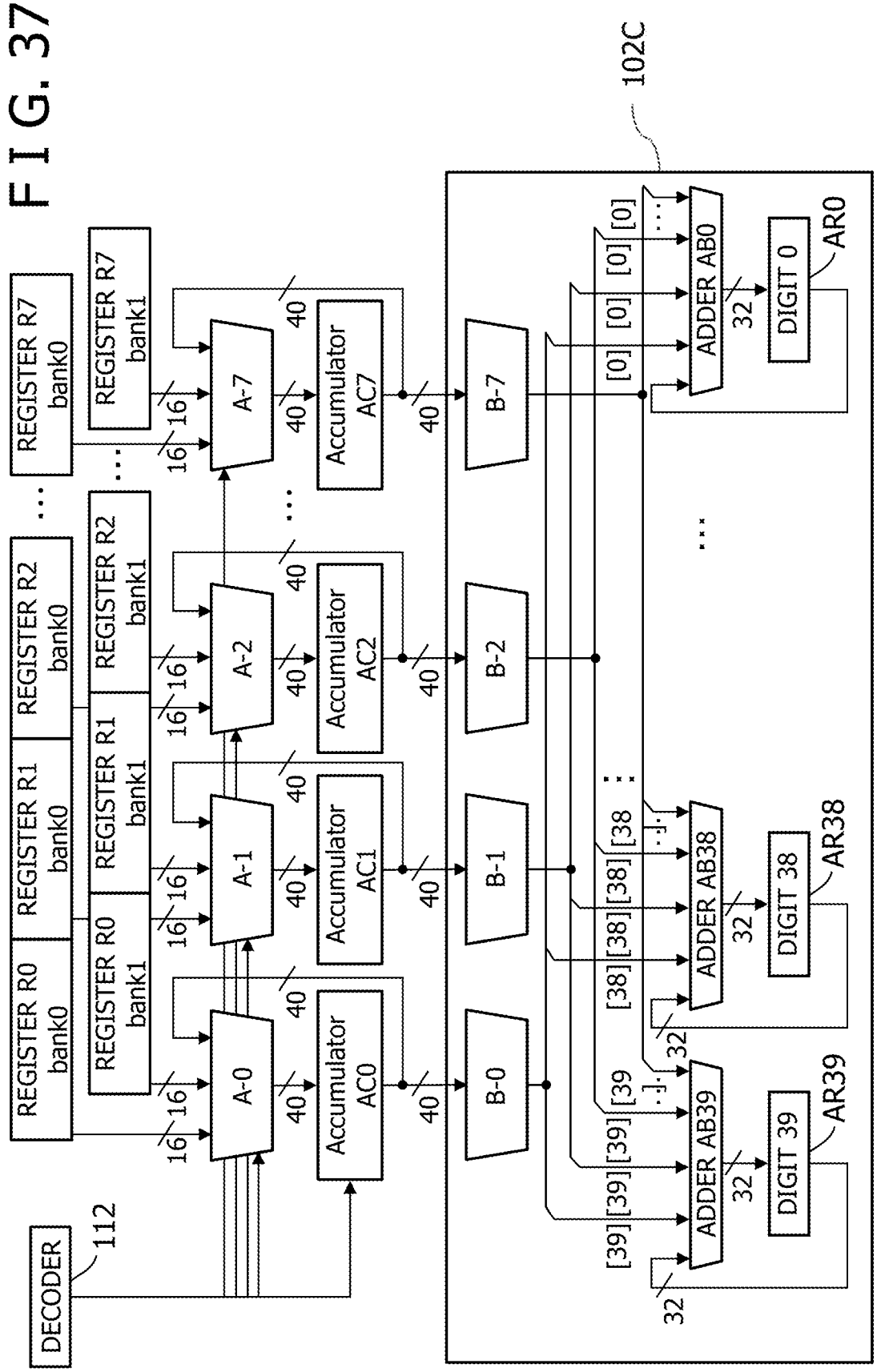
FIG. 37 exemplifies a configuration of a statistical information acquisition unit according to the embodiment 1.

FIG. 37 exemplifies a configuration of the statistical information acquisition unit 102C according to the embodiment 1. FIG. 37 depicts also accumulators AC0 to AC7 that are a target of statistical information acquisition by the statistical information acquisition unit 102C, arithmetic units A-0 to A-7, registers R0 to R7 of a bank 0, registers R0 to R7 of a bank 1, and a decoder 112. It is to be noted that the accumulators AC0 to AC7, arithmetic units A-0 to A-7, registers R0 to R7 of the bank 0 and registers R0 to R7 of the bank 1 are part of a single instruction/multiple data (SIMD) processor. Further, the arithmetic units A-0 to A-7 are an example of the arithmetic operators 131 for vector operation exemplified in FIGS. 34 and 35.

The statistical information acquisition unit 102C includes arithmetic units B-0 to B-7, adders AB0 to AB39, and digit # registers AR0 to AR39. Here, # is a numeral that corresponds to each digit (0 to 39) of data during arithmetic operation.

As described hereinabove, the statistical information acquisition unit 102C in the embodiment 1 assumes a SIMD processor. The SIMD processor includes a number of registers equal to the SIMD parallel width (registers bank0 and registers bank1). The plurality of arithmetic units A-0 to A-7 acquire data at a same timing from the registers bank0 and bank1. The arithmetic units A-0 to A-7 execute arithmetic operation in parallel in accordance with an instruction decoded by the decoder 112. In the embodiment 1, it is supposed that the plurality of arithmetic units A-0 to A-7 execute a product sum instruction. The product sum instruction adds a cumulative sum accumulated from the accumulators AC0 to AC7 to the product of values of the registers bank0 and values of the registers bank1. Then, the plurality of arithmetic units A-0 to A-7 store results of the arithmetic operation into the accumulators AC0 to AC7. According to the product sum instruction, product sum is executed normally by a plural number of times, and arithmetic operation results in the last cycle are returned to the register bank0 or bank1. At this time, the accumulators AC0 to AC7 send out the results also to the arithmetic units B-0 to B-7.

The arithmetic units B-0 to B-7 perform a process for setting a flag bit "1" to bit positions corresponding to the range from a non-sign highest-order bit to the LSB. The non-sign highest-order bit is a bit at a position nearest to the sign bit (most significant bit (MSB)) from among bits having a bit value different from the value of the sign bit. By the process of the arithmetic units B-0 to B-7, an example of a bit pattern is generated which is obtained by setting a flag bit to bit positions corresponding to the range from the least significant bit position (least significant bit (LSB)) to a highest-order bit position from among bit positions having a bit value different from that of the sign bit.

It is to be noted that the arithmetic units B-0 to B-7 may perform a process for setting the flag bit "1" to bit positions corresponding to the range from a non-sign lowest-order bit to the MSB. The non-sign lowest-order bit is a bit at a position farthest from the sign bit (position nearest to the LSB) from among bits having a bit value different from that of the sign bit. By the process of the arithmetic units B-0 to b-7, an example of a bit pattern is generated which is obtained by setting a flag bit to individual bit positions corresponding to the range from the position of the sign bit (MSB) to a lowest-order bit position from among bit positions having a bit value different from that of the sign bit.

Further, the statistical information acquisition unit 102C includes 40 adders AB0 to AB39. The adders AB0 to AB39 have a bit width same as the bit width of the accumulators AC0 to AC7 and perform addition for each digit of results of the arithmetic units B-0 to B-7. The adders AB0 to AB39 add addition results for each digit of arithmetic operation results of the arithmetic units B-0 to B-7 and values of each digit saved in the digit # registers AR0 to AR39 to update the digit # registers AR0 to AR39. The digit # registers AR0 to AR39 are called statistical information storage unit for each digit. By the processes of the adders AB0 to AB39 and the digit # registers AR0 to AR39, an example of first statistic operation in which a bit pattern obtained by setting flag bits is accumulated for each bit position is generated. By the configuration described above, in the arithmetic units A-0 to A-7, statistical information relating to a plurality of fixed point number data that are arithmetic operation results is collected by the statistical information acquisition unit 102C. Therefore, it may be considered that the arithmetic units A-0 to A-7 are an example of arithmetic units. Further, the digit # registers AR0 to AR39 are an example of holding units.

Further, in the case where the arithmetic units B-0 to B-7 perform a process for setting the flag bit "1" to bit positions corresponding to the range from the non-sign lowest-order bit to the MSB, second statistical information is generated by processes of the adders AB0 to AB39 and the digit # registers AR0 to AR39. Accordingly, the statistical information acquisition unit 102C or the adders AB0 to AB39 and digit # registers AR0 to AR39 may be considered an example of a statistical information acquisition unit that acquires at least one of first statistical information and second statistical information.

Figure 38:
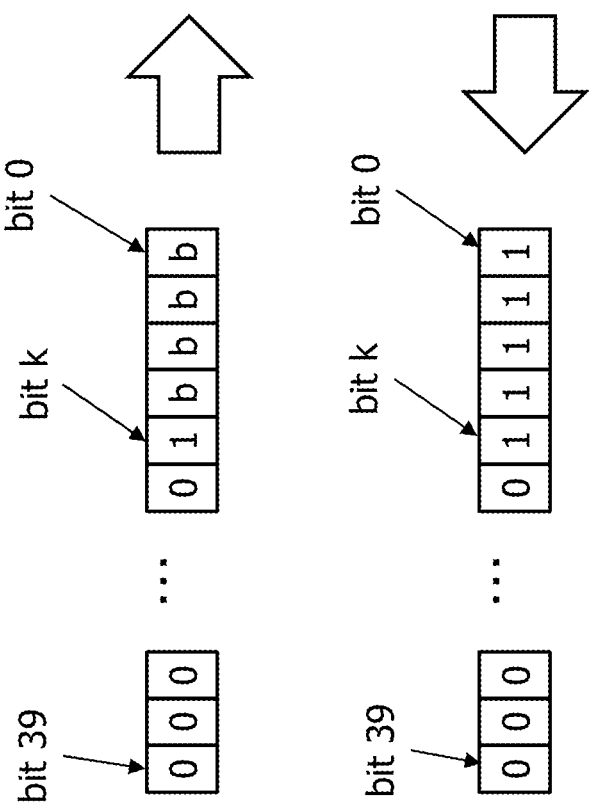
FIG. 38 exemplifies processing of an arithmetic unit by a pseudo code of register transfer level (RTL)

FIG. 38 exemplifies processing of the arithmetic units B-0 to B-7 by pseudo codes of the C language. When one of the arithmetic units B-0 to B-7 is referred to as a representative, it is referred to merely as arithmetic unit B. Now, it is assumed that, for example, data of 000 . . . 01bbbb (here, b may be any of 0 and 1) is inputted. In this data, the most significant bit (bit 39) is 0 and bits from the bit 39 to the bit k+1 are 0 while the bit k is 1. Each arithmetic unit B outputs the flag bit 1 to bit positions corresponding to the range from a bit position of 1 (bit k) at which the value is different from that of the sign bit "0" to the least significant bit (bit 0, LSB), and outputs 0 to bit positions corresponding to the range from the sign bit (bit 39) to the bit position (bit k+1) next to the bit position of 1 that is a value different from the value 0 of the sign bit. By the processes described, a process for setting the flag bit "1" to bit positions corresponding to the range from the non-sign highest-order bit to the LSB is executed.

It is to be noted that, in FIG. 38, the process for searching from the bit 38 to the bit 0 (for(i=38;i>=0;i--)) may be changed to a process for searching from the bit 0 to the bit 38 (for(i=0;i<=38;i++)). By this change, a process for setting the flag bit "1" to bit positions corresponding to the range from the non-sign lowest-order bit to the MSB is executed.

Figure 39:
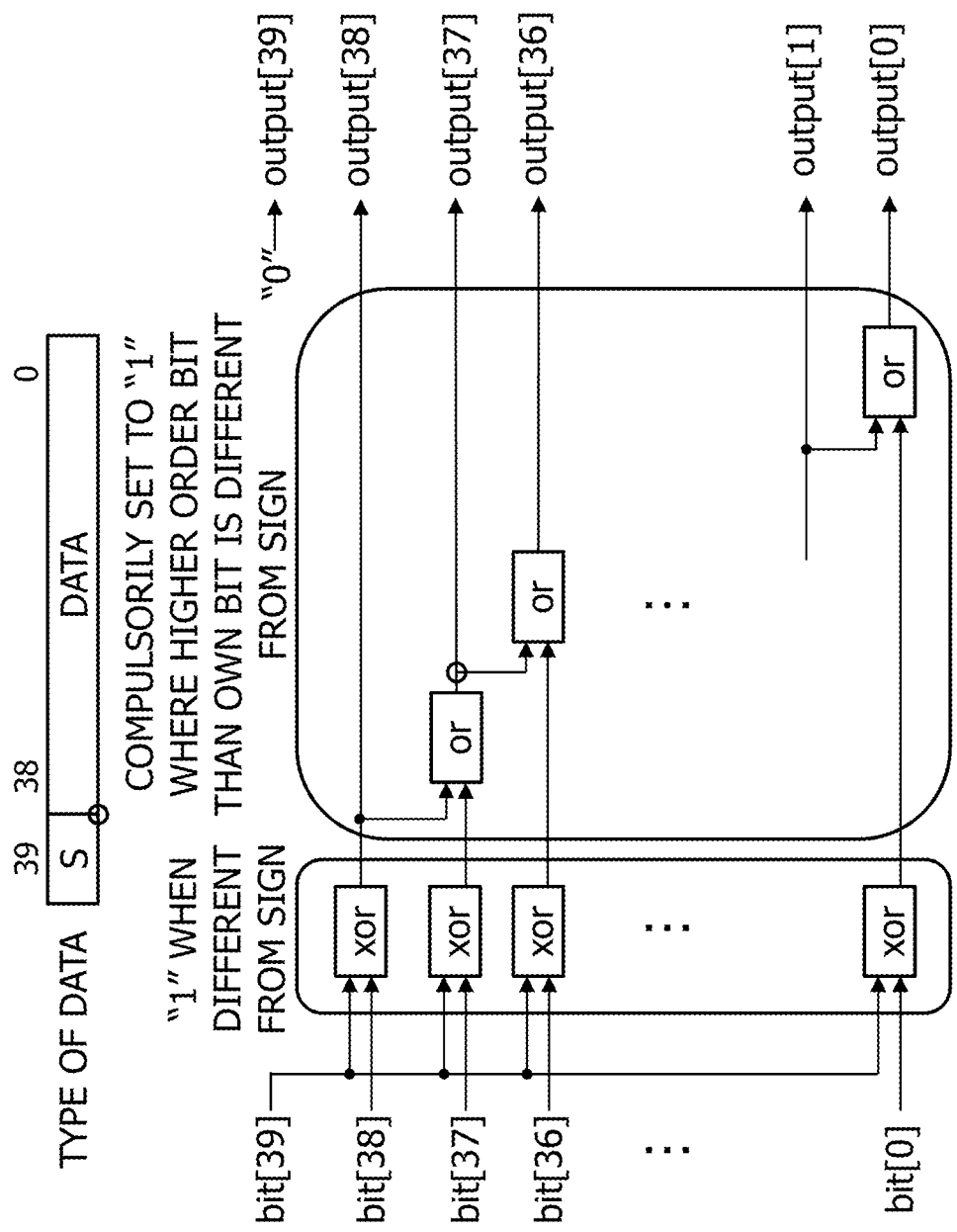
FIG. 39 exemplifies a hardware circuit of an arithmetic unit.

FIG. 39 exemplifies a hardware circuit of the arithmetic unit B. As depicted in FIG. 39, the arithmetic unit B includes exclusive OR circuits (XOR) for 39 digits for executing exclusive ORing between the sign bit (bit[39]) and the bits from the bit 38 (bit[38]) to the bit 0 (bit[0]), and OR circuits (or) for 38 digits for executing ORing each of the bit 37 (bit[37]) and succeeding bits and a higher-order bit. By the circuit of FIG. 39, for data in which the bits from the bit 39 to the bit k+1 are 0 and the bit k is 1, the bit k+1 and higher-order bits (output[38] to output[k+1]) from among the output bits (output[38] to output[0]) are set to 0 and the bit k and lower bits (output[k] to output[0]) are set to 1. Further, in the circuit of FIG. 39, the output bit corresponding to the most significant bit is fixed to 0. By the configuration described above, a process for setting the flag bit "1" to the bit positions corresponding to the range from the non-sign highest-order bit to the LSB is executed by hardware.

It is to be noted that, in FIG. 39, the OR circuits (or) may be coupled such that arithmetic operation is successively performed for bits in a higher order direction beginning with bit[0] and bit[1] in place of arithmetically operating successively in a lower order direction beginning with bit[38] and bit[37]. By this configuration, a process for setting the flag bit "1" to bit positions corresponding to the range from the non-sign lowest-order bit to the MSB is executed by hardware.

Figure 40:
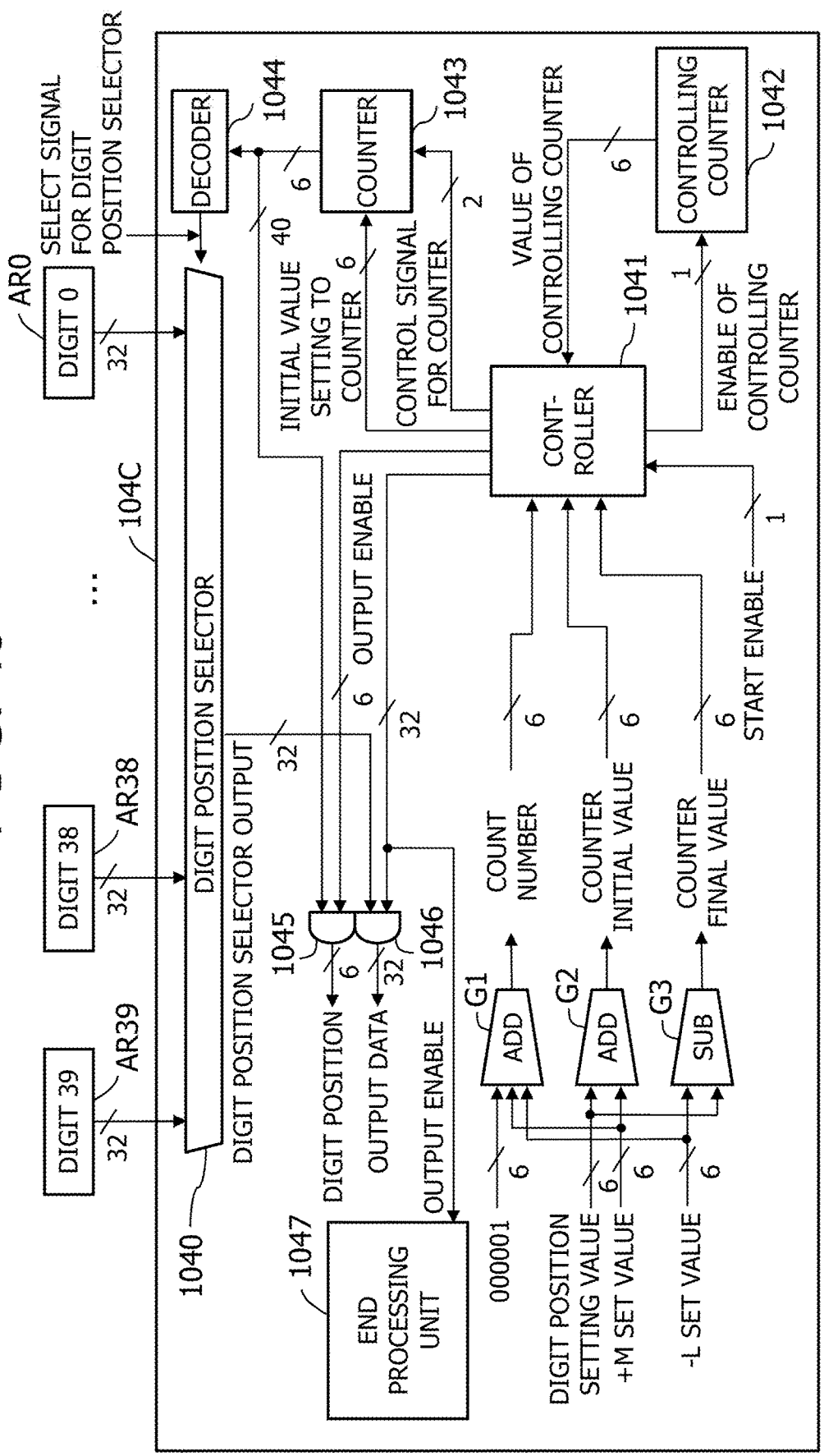
FIG. 40 exemplifies a configuration of a statistical information aggregation unit according to the embodiment 1.
Figure 41:
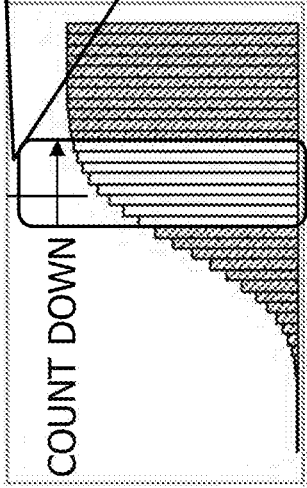
FIG. 41 depicts a pseudo code of RTL exemplifying operation of a counter.
Figure 42:
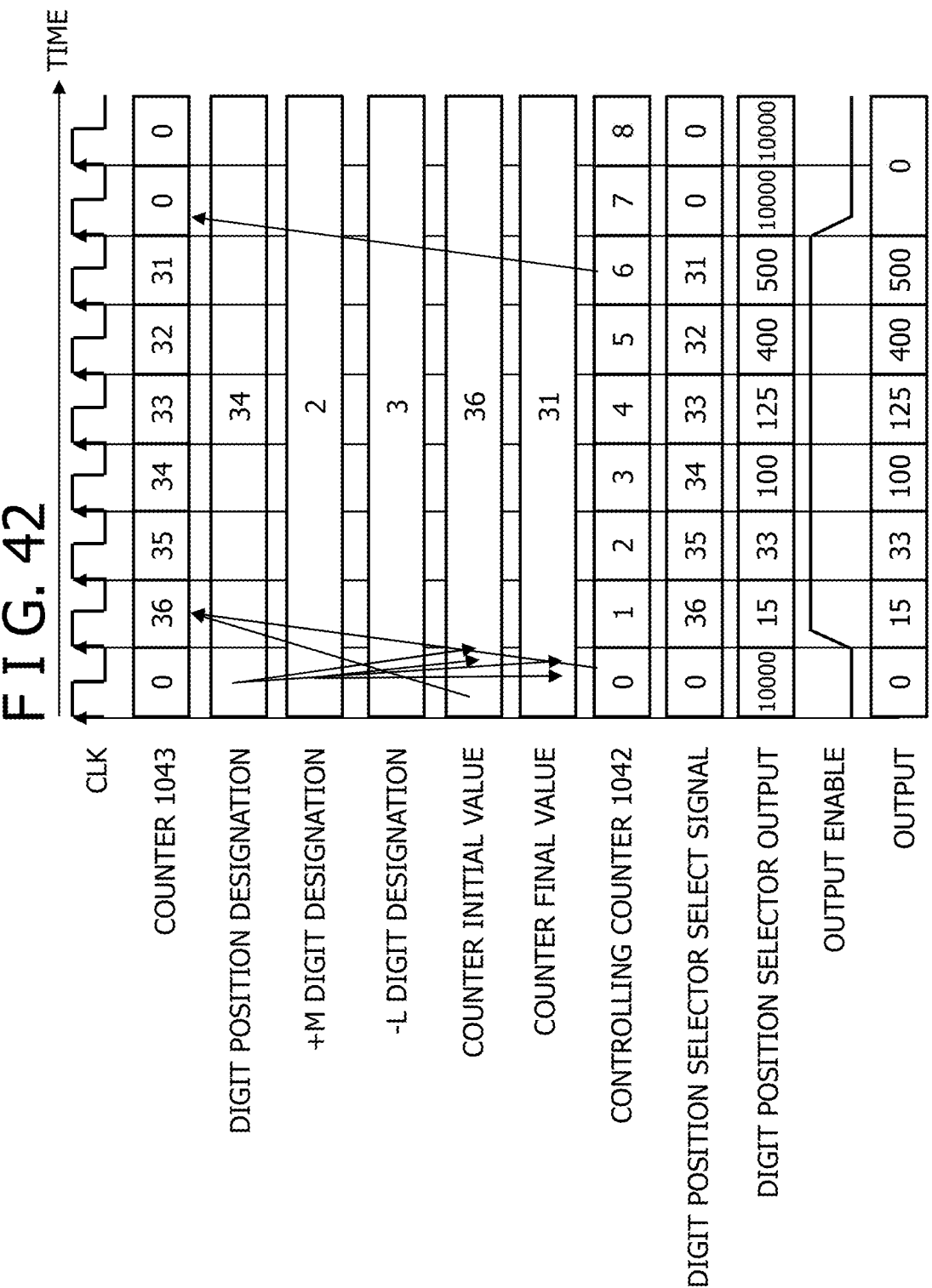
FIG. 42 exemplifies, in time chart, operation of components of a statistical information aggregation unit.
Figure 43:
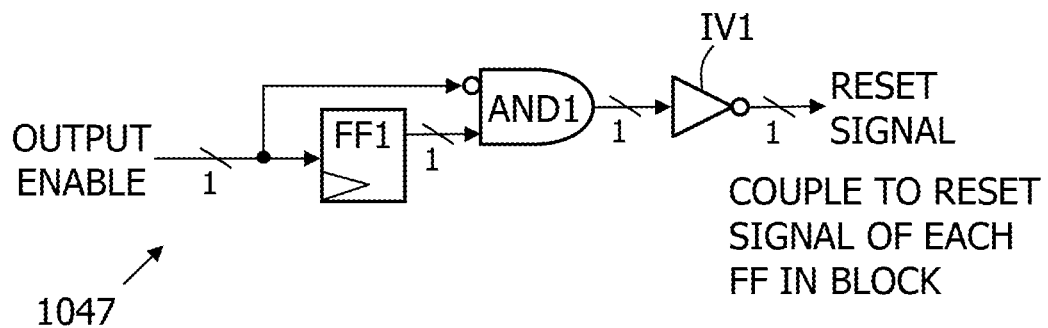
FIG. 43 exemplifies a configuration and operation of an end processing unit.
Figure 44:
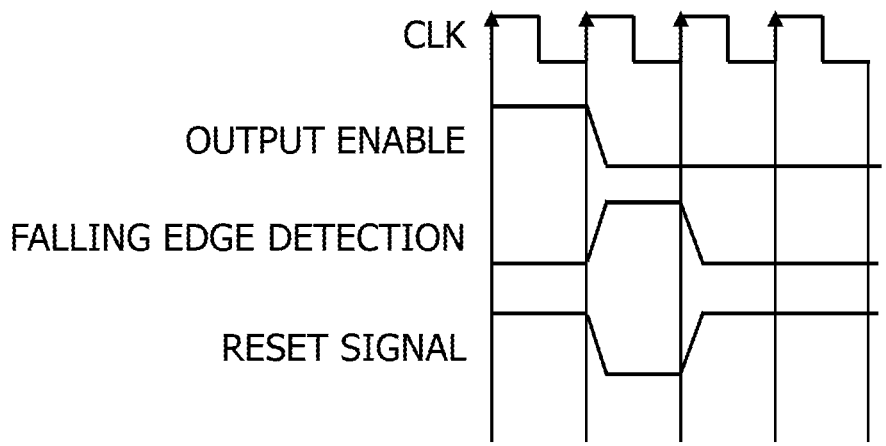
FIG. 44 exemplifies, in timing chart, operation of components of an end processing unit.

FIG. 40 exemplifies a configuration of the statistical information aggregation unit 104C. FIG. 41 depicts a pseudo code of RTL that exemplify operation of a counter 1043 exemplified in FIG. 40. Further, FIG. 42 is a time chart exemplifying operation of components of the statistical information aggregation unit 104C. FIG. 43 is a view exemplifying a configuration and operation of an end processing unit 1047. FIG. 44 is a timing chart exemplifying operation of components of the end processing unit 1047.

FIG. 40 depicts also digit # registers AR0 to AR39, which are statistical information storage units for individual digits, together with the statistical information aggregation unit 104C. The statistical information aggregation unit 104C successively selects and outputs a value within a range from a digit position of +M to another digit position of −L with reference to a reference position (position of the origin) given by a "digit position setting value" from the digit # registers AR0 to AR39. It is to be noted that, though not depicted in FIG. 40, components of the statistical information aggregation unit 104C operate in synchronism with a clock signal. The digit # registers AR0 to AR39 that are statistical information storage units for individual digits are an example of holding units that hold information accumulated at individual digits of statistical information.

Here, the digit position setting value is a value passed to the CPU 31 through a digit position setting instruction or the like, for example, by an application program executed by the CPU 31. The CPU 31 may incorporate, for example, an instruction for accepting a digit position setting value and setting a threshold value for a register of the arithmetic processing apparatus 30, arithmetic core 300 or control core 38. The digit position of +M and the digit position of −L are passed, for example, from the OS to the CPU 31 through a system parameter designated by the user. The server 3 may hold the digit position of +M and the digit position of −L as hyper parameters, for example, preset values. However, the server 3 may receive a designation from the application program executed by the CPU 31 and set the digit position of +M and the digit position of −L to the arithmetic core 300 through a digit position setting instruction or the like. For example, the +M digit designation value and the −L digit designation value may be loaded from the memory 32 into the arithmetic processing apparatus 30 or a register of the control core 38 through an instruction from the CPU 31 to the arithmetic processing apparatus 30.

As exemplified in FIG. 40, the statistical information aggregation unit 104C includes a digit position selector 1040, a controller 1041, a controlling counter 1042, a counter 1043, a decoder 1044, an AND gate 1045 for digit position outputting, an AND gate 1046 for statistical information outputting of a designation range, an end processing unit 1047, an adder (ADD) G1 for count number outputting, an adder G2 for digit upper limit position outputting, and a subtractor (SUB) G3 for digit lower limit position outputting (SUB).

The adder (ADD) G1 for count number outputting generates a count number by addition of the +M set value and the −L set value. The adder G2 for digit upper limit position outputting calculates an upper limit position of a digit that is a counter initial value by adding the digit position setting value and the +M set value. Meanwhile, the subtractor (SUB) G3 for digit lower limit position outputting calculates a lower limit position of a digit that is a counter final value by subtracting the set value of −L from the digit position setting value.

The digit position selector 1040 is a selector that selects a value (hereinafter referred to as value of the digit) held in one of the digit # registers AR0 to AR39 corresponding to the position of a number designated by the decoder 1044. The value of the digit (for example, 32 bits) selected by the digit position selector 1040 is outputted through the AND gate 1046. Also it is possible to consider the value of the digit as a sample number of each digit of statistical information.

The controller 1041 controls the components of the statistical information aggregation unit 104C. The controller 1041 is a hardware circuit in which a state machine is incorporated. However, the controller 1041 may include a built-in processor that operates by firmware stored in a ROM. To the controller 1041, a start enable, a count number, a counter initial value and a counter final value are inputted.

The controller 1041 starts its operation in response to the start enable to turn the enable of the controlling counter 1042 ON (true, 1) and operates in accordance with the controlling counter 1042. For example, the controller 1041 controls the components of the statistical information aggregation unit 104C within a range within which the value of the controlling counter 1042 counts from 0 to the count number. The controller 1041 sets a count initial value (upper limit position of a digit) to the counter 1043 and then turns the enable of the counter ON by a control signal for the counter to cause the counter to start its operation and turns the output enable to the AND gate 1046 ON.

The counter 1043 counts a digit position from which statistical information is outputted. The counter 1043 continues counting from the counter initial value until the enable thereto is turned OFF by a control signal for the counter from the controller 1041. The count value of the counter 1043 is outputted to the decoder 1044 and the AND gate 1045 for digit position outputting. It is to be noted that, in the case where a sample value of a non-sign highest-order bit is accumulated in the digit # registers AR0 to AR39, the counter 1043 may count from a higher-order digit (digit position setting value +M) to a lower-order digit (digit position setting value −L). Further, in the case where a sample value of a non-sign lowest-order bit is accumulated in the digit # registers AR0 to AR39, the counter 1043 may count from a lower-order digit (digit position setting value −L) toward a higher-order digit (digit position setting value+ M).

The decoder 1044 is a decoder that, for example, converts a 6-bit binary number into one-hot-vector of 40 bits (bit pattern in which only one bit is 1 and the other bits are 0). The one-hot-vector of 40 bits by the decoder 1044 is inputted to the digit position selector 1040.

The digit position selector 1040 outputs 32 bits of a value (one of the digit # registers AR0 to AR39) of a digit corresponding to a bit of "1" in the decoded digit position selector select signal of 40 bits. The one-hot-vector outputted from the decoder 1044 is an example of a control signal that designates a specific digit within statistical information held by a holding unit.

The AND gate 1045 outputs a digit position signal from the counter 1043 when the output enable from the controller 1041 is ON. The AND gate 1046 outputs, when the output enable from the controller 1041 is ON, a value of a digit selected by the digit position selector 1040 from among the digit # registers AR0 to AR39, for example, a sample value at the digit of the statistical information. Accordingly, the digit position selector 1040, controller 1041, counter 1043, decoder 1044, AND gate 1045 and AND gate 1046 are an example of a first selection unit. The end processing unit 1047 generates, when the output enable from the controller 1041 is turned OFF, a signal for resetting the components of the statistical information aggregation unit 104C.

FIG. 41 depicts pseudo codes of RTL exemplifying operation of the counter 1043. In the pseudo codes of FIG. 41, input wire indicates an input data signal, and output reg indicates an output data signal and a signal to be held. As depicted in FIG. 41, to the counter, input signals ck, rst, set, en and data are inputted. The input data signal data is a signal of 6 bits. The input signal rst is a reset signal, and if 1 is inputted to the input signal rst, the counter 1043 clears its count value q (for example, of 6 bits) to 0. The input signal set is an initial set signal of a count value, and when the input signal rst is 0 and 1 is inputted to the input signal set, the counter 1043 sets the input signal data (for example, of 6 bits) to the count value q.

The signal en is an enable signal, and if both the input signal rst and the input signal set are 0 and 1 is inputted to the input signal en, the counter 1043 starts its operation. The counter 1043 decrements the count value q in a given clock cycle until the count value q becomes 0.

FIG. 42 is a time chart exemplifying operation of the components of the statistical information aggregation unit 104C. FIG. 42 is a time chart in the case where cumulative values of non-sign highest-order bits are aggregated. Accordingly, the counting direction of the controlling counter 1042 is a direction in which it is decremented from a higher-order digit to a lower-order digit. It is to be noted that, in a time chart in the case where cumulative values of non-sign lowest-order bits are aggregated, the counting direction of the controlling counter 1042 may be a direction in which it is incremented from a lower-order digit to a higher-order digit. In the following, operation of the statistical information aggregation unit 104C is described with reference to the time chart of FIG. 42. As depicted in FIG. 42, the components of the statistical information aggregation unit 104C operate in synchronism with a clock signal CLK.

As described above, the controller 1041 starts its operation when the start enable becomes "1." The controller 1041 turns the enable of the controlling counter 1042 ON (true, 1) upon starting of its operation to activate the controlling counter 1042. The controlling counter 1042 starts count up from 0.

The controller 1041 reads the value of the controlling counter 1042, and when the value of the controlling counter 1042 is "0," the controller 1041 reads a counter initial value inputted thereto and sets the initial value (in FIG. 42, the value 36) to the counter 1043. The counter 1043 has an initial value setting function. The controller 1041 sets a counter initial value using an initial value setting signal line of the counter 1043 by setting a set signal to "1." Further, the controller 1041 turns an enable signal en for the counter 1043 ON in a next cycle. The controller 1041 turns the enable signal en for the counter 1043 ON, and further sets an output enable to "ALL1." Here, the output enable is a signal of totaling 33 bits of one (1 bit) of inputs to the AND gate 1045 that outputs a digit position and one (32 bits) of inputs to an AND gate 1046 (for example, for 32 bits) that outputs a sample value of statistical information corresponding to the digit position.

The decoder 1044 converts a 6-bit binary number, which is the count value of the counter 1043, into one-hot-vector of 40 bits. The digit position selector 1040 outputs a digit 32 bit at which the decoded digit position selector select signal of 40 bits is "1." The controller 1041 sets the count enable and the output enable to "1" and continues to keep them until the value of the controlling counter 1042 reaches the count number. If the value of the controlling counter 1042 reaches the count number, the controller 1041 sets the counter enable and the output enable to "0" to stop the outputting from the counter 1043 and the AND gates 1045 and 1046.

Accordingly, while 1 continues to be inputted to the output enable, sample values 15, 33, 100, 125, 400 and 500 of each digit of the statistical information within the range from the digit 36 to the digit 31 are outputted from the AND gate 1046 in accordance with the count value of the counter 1043. The sample values of the statistical information outputted from the AND gate 1046 are aggregated by the statistical information aggregation unit 104C and outputted, for example, to a register in the register file 12. The outputted sample values of the statistical information are passed to the application program executed by the CPU 31.

The end processing unit 1047 initializes logic circuits having a state such as internal flip-flops in the counter 1043 and so forth in order to prepare for statistic data acquisition in the next cycle. The end processing unit 1047 detects that a series of statistical data acquisition processes come to an end by detecting that the output enable falls from "1" to "0." The end processing unit 1047 executes initialization by coupling the inverted logic of the falling edge detection signal to a reset signal for flip-flops and so forth of the statistical information aggregation unit 104C.

As depicted in FIG. 43, the end processing unit 1047 includes a flip-flop (FF1), an AND gate (AND1) and an inverter IV1. The flip-flop (FF1) holds an output enable inputted thereto by a clock in the preceding cycle. On the other hand, the AND gate (AND1) executes ANDing of the signal of the flip-flop (FF1) and the inverted signal of the output enable at present. Accordingly, in the case where the output enable is 1 (true) in the preceding cycle and is 0 (false) in the present cycle as depicted in FIG. 44, the end processing unit 1047 outputs 1 (true) by the flip-flop (FF1) and the AND gate (AND1).

Further, since, at the next clock, the flip-flop (FF1) receives the value 0 (false) in the present cycle of the output enable and outputs 0 (false), the output of the AND gate (AND1) generates a pulse signal that indicates 1 (true) till the next clock after the output enable becomes 0 (false). Then, since the signal is inverted by the inverter IV1, the end processing unit 1047 generates a pulse signal that changes from 1 (true) to 0 (false) when the output enable changes from 1 (true) to 0 (false).

Figure 45:
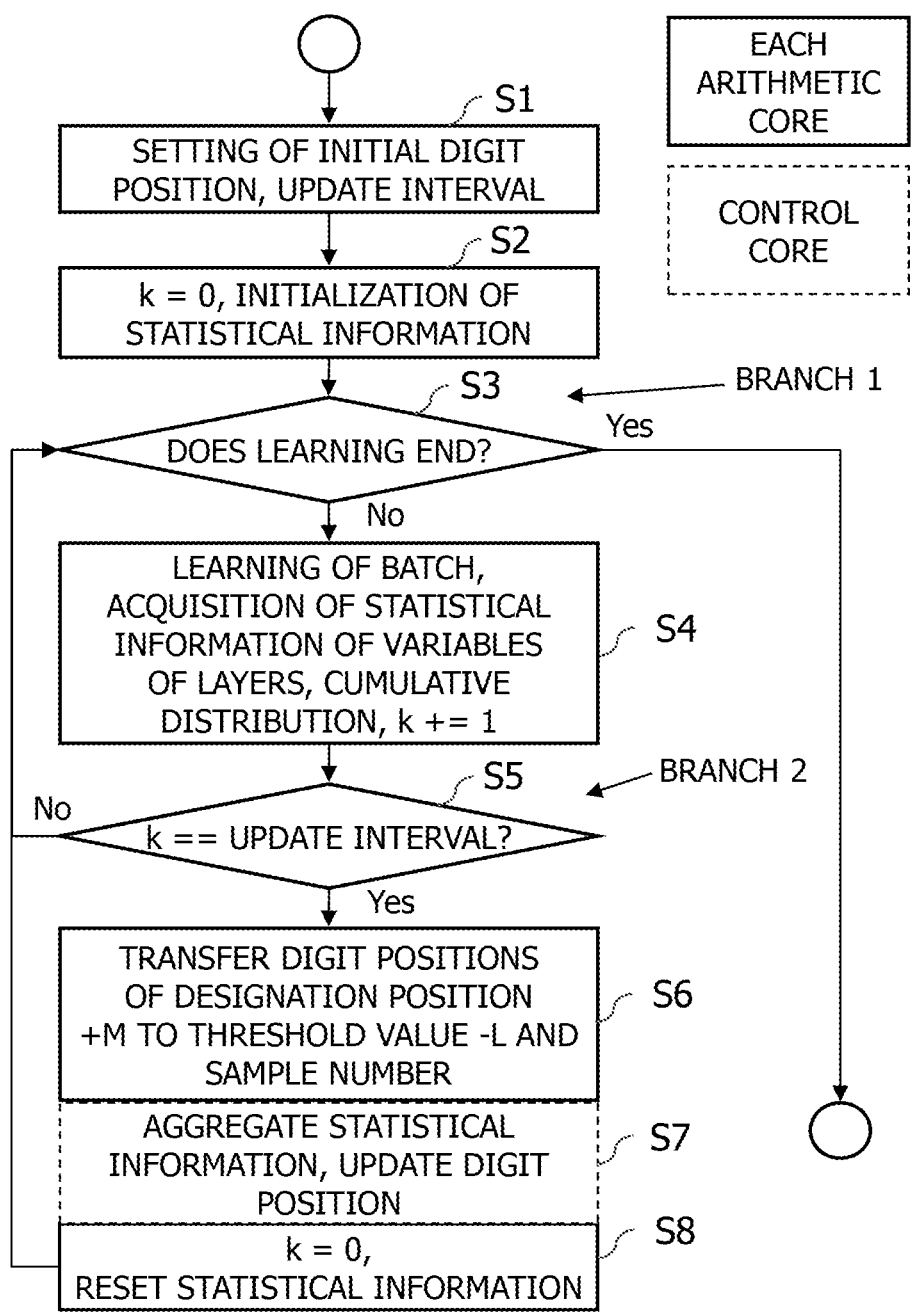
FIG. 45 exemplifies, in flow chart, processing of an arithmetic core.

FIG. 45 is a flow chart exemplifying processing of each arithmetic core 300. FIG. 45 also depicts processing of the control core 38. Before the processing is started, an application program executed by the CPU 31 determines a digit position to be made an initial value, for example, in accordance with a user operation. The initial value is a value of a digit number of fixed point data. The CPU 31 and the arithmetic processing apparatus 30 start processing of deep learning after the initial value setting.

After the processing of deep learning is started, each arithmetic core 300 sets the determined digit position to be made an initial value to a given register. Further, the arithmetic core 300 sets a parameter called "update interval" based on parameters from the user (or the application program executed by the CPU 31) (S1). The "update interval" is a value to be used for a decision regarding after what number of times the learning process is to be performed every time the digit position is to be updated, and may be set to a desired value, for example, by the user of the server 3. The arithmetic core 300 further performs, before learning, initialization of the variable k of the learning time number and the statistical information. Here, the initialization of the statistical information is a process for clearing the value of the statistical information storage unit for each digit described hereinabove to "0" (S2).

After the initialization, each arithmetic core 300 executes deep learning while successively updating the statistical information storage units for the individual digits (digit # registers AR0 to AR39) (S3 and S4). It is to be noted that, in the example of FIG. 45, the arithmetic core 300 first decides a learning end at a branch 1 (S3). The learning end is, for example, a case where errors in regard to input data and output data in pair of the learning target are included in a range for an allowable value. Also in the case where the learning ends the last mini batch, each arithmetic core 300 ends the learning.

In the case where the decision at S3 is No, statistical information is accumulated until the variable k becomes equal to the update interval time number together with the progress of the learning (S4). Then, each arithmetic core 300 first decides whether or not the variable k reaches the number of times of the update interval at a branch 2 (S5). In the case where the variable k reaches the number of times of the update interval at the branch 2, the CPU 31 transfers the statistical information accumulated (data at the digit positions within the range from the designated digit position +M to the digit position −L) to the control core 38 (S6) and instructs the control core 38 to totalize the transferred statistical information.

The control core 38 waits for completion of transfer of the sample numbers at the digit positions of the threshold value+M to the threshold value −L of each arithmetic core 300. After completion of the transfer, the control core 38 integrates the statistical information transferred from the arithmetic core 300 and totalizes the statistical information of the entire arithmetic processing apparatus 30. Then, the control core 38 outputs the totalized statistical information to a given register or a given address of the memory 32.

Furthermore, the control core 38 initializes the variable k for counting the update interval and the accumulated statistical information and advances the processing to the learning end decision (S3) at the branch 1. The arithmetic core 300 ends the learning in the case where the learning is for the last mini batch or errors decrease to the allowable range (branch 1). It is to be noted that, at S6 of FIG. 45, statistical information is transferred to the control core 38 and the control core 38 executes the process at S7. However, in the case of the configuration of FIG. 34 that does not include the control core 38, each arithmetic core 300 may transfer the statistical information to the CPU 31 at S6 such that the CPU 31 executes the process at S7.

Figure 46:
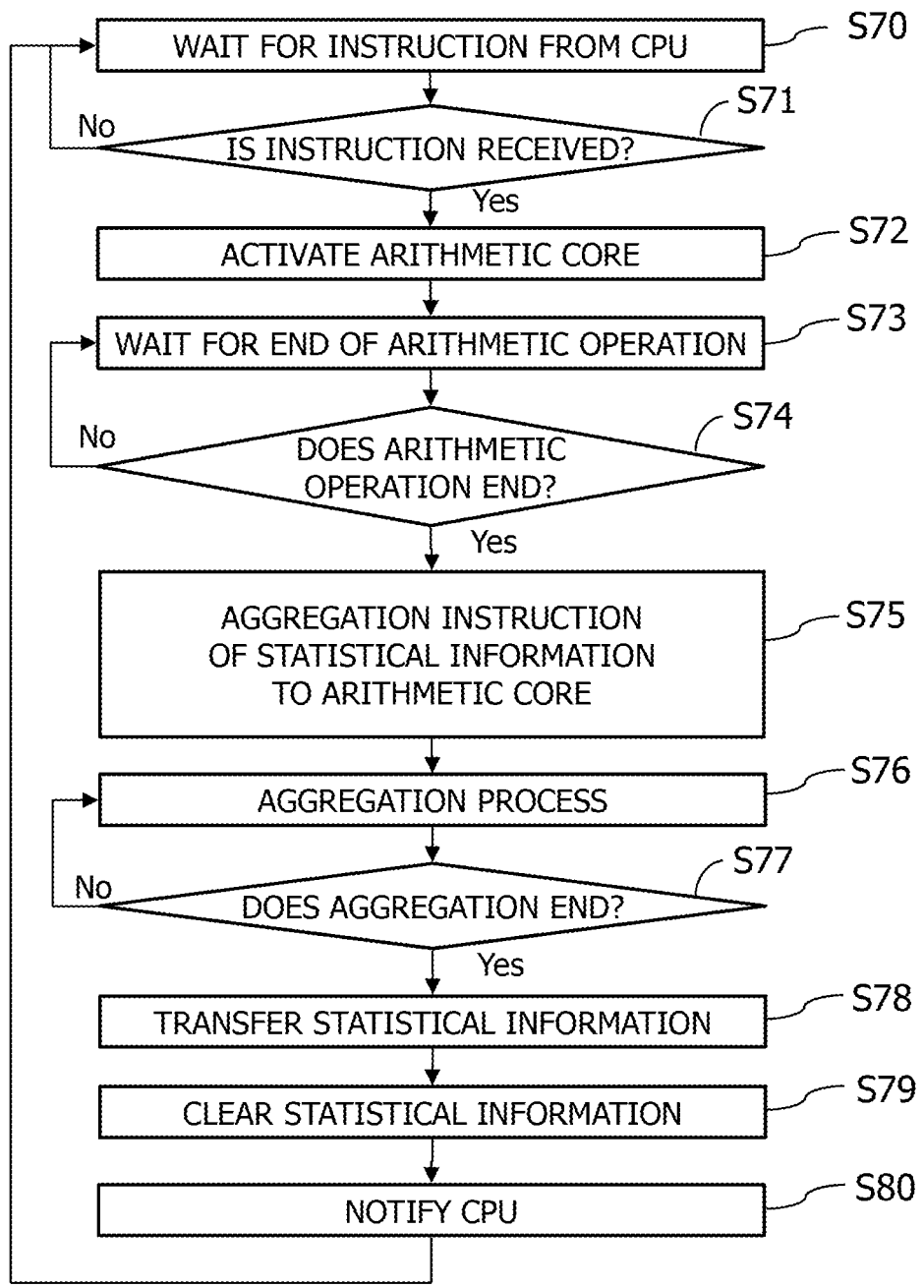
FIG. 46 exemplifies, in flow chart, operation of a control core.

FIG. 46 is a flow chart exemplifying operation of the control core 38. However, the process of FIG. 46 may be executed by the CPU 31 in place of the control core 38. The control core 38 waits for an instruction of the CPU 31 (S70 and S71) and operates in response to the received instruction. For example, the control core 38 itself does not hold the update interval of FIG. 45, information for deciding an end of learning and so forth. Therefore, the control core 38 receives the update interval, the information for deciding an end of learning and so forth from the CPU 31.

The control core 38 receives the instruction from the CPU 31 (YES at S71) and activates each arithmetic core 300 to perform processing (S72). The control core 38 waits for an end of arithmetic operation by each arithmetic core 300 (S73). The end of arithmetic operation may be an end of a single time arithmetic operation by the arithmetic core 300 or may be an end of arithmetic operation for one update interval of FIG. 45, for example. After arithmetic operation of each arithmetic core 300 ends (YES at S74), the control core 38 instructs the arithmetic core 300, which ends arithmetic operation, to aggregate the statistical information (S75). In accordance with the instruction, the arithmetic core 300 that ends arithmetic operation outputs the statistical information to the control core 38 by the circuit exemplified in FIG. 40.

Then, when the control core 38 acquires the statistical information aggregated by each arithmetic core 300, it totalizes the acquired statistical information (S76). After the control core 38 totalizes the statistical information aggregated by all arithmetic cores 300 (YES at S77), it transfers the totalized statistical information to the memory 32 (S78).

It is to be noted that, to the control core 38, the number of arithmetic cores 300 coupled to the data bus 35 and arithmetic operators to be used in the arithmetic operation (parallel coupling number of the arithmetic units A of FIG. 37) are known. Accordingly, if the control core 38 totalizes the statistical information aggregated by all of the arithmetic cores 300, the ratio of the totalized sample number of digits to the total sample number may be calculated. At S78, the control core 38 may transfer the ratio of the sample numbers at the digits at the digit and higher-order digits to the total sample number of the totalized digits. Then, the control core 38 clears the statistical information (S79) and notifies the CPU 31 of completion of the processing (S80). It is to be noted that, in the server 3A (refer to FIG. 27) in which the control core 38 includes the arithmetic processing apparatus 30A, the CPU 31 may execute the processes at steps S72 to S80 of FIG. 46.

<Advantageous Effect of Embodiment 1>

As described above, in the embodiment 1, the statistical information aggregation unit 104C of each arithmetic core 300 acquires statistical information in the form of a cumulative distribution exemplified in FIGS. 32 and 33 and may aggregate and acquire the statistical information within the range from the +Mth digit to the −Lth digit (range of at least one digit) with reference to a bit position designated by a digit position setting value. The CPU 31 or the control core 38 may collect a given number of digits (+M to −L) of the statistical information aggregated by each arithmetic core 300 through a transmission path including the data bus 35 and the memory interface 37 or including the data bus 35, bus interface 36 and bus 34. As described already, if statistical information of at least one digit is available, the CPU 31 that executes an application program or the control core 38 controlled by the CPU 31 may collect the ratio of the sample number at the digit and higher-order digits to the total sample number from each arithmetic core 300. This ratio may be regarded as an overflow rate or an underflow rate in arithmetic operation of a totalization target. Accordingly, the CPU 31 or the control core 38 may decide an overflow rate or an underflow rate by arithmetic operation of a totalization target.

Accordingly, different from the comparative example, the arithmetic processing apparatus 30 of the embodiment 1 may not perform collection, aggregation and storage of statistical information of all bits (for example, 40 bits) in an arithmetic circuit during arithmetic operation. For example, the arithmetic processing apparatus 30 and the arithmetic core 300 in the embodiment 1 may reduce components for collecting, aggregating and storing statistical information and the bandwidth of a transmission path for transferring statistical information between the components. Accordingly, according to the embodiment 1, in addition to reduction of the circuit scale and the power consumption, the number of samples of designated digits of statistical information may be passed to an application program. Accordingly, the server 3 that executes an application program for deep learning or the like may achieve, in addition to reduction of the circuit scale and the power consumption, acquisition of statistical information with reduced overhead and may determine the decimal point position of fixed point data at an early stage. For example, the server 3 may effectively determine a range of an effective digit number of a variable in the application program to an appropriate range.

Embodiment 2

An arithmetic core 300 of an arithmetic processing apparatus 30 according to an embodiment 2 is described with reference to FIGS. 47 to 51. In the embodiment 1 described above, the arithmetic core 300 acquires a cumulative distribution of statistical information by the statistical information acquisition unit 102C and extracts and outputs a sample number of statistical information within a range from the +Mth digit to the −Lth digit with reference to a digit position designated by the statistical information aggregation unit 104C. Also in the embodiment 2, the arithmetic core 300 acquires a cumulative distribution of statistical information by the statistical information acquisition unit 102C similarly as in the embodiment 1. However, in the embodiment 2, the arithmetic core 300 receives a designation of a threshold value corresponding to an overflow rate (or an overflow time number, an underflow rate, an underflow time number of the like) in place of receiving a designation of a digit position to be made a reference for statistical information acquisition. Then, in the embodiment 2, a statistical information aggregation unit 104D determines a digit position corresponding to the designated threshold value in place of the statistical information aggregation unit 104C.

Then, the arithmetic core 300 in the embodiment 2 extracts and outputs a sample number of statistical information within the range from the +Mth digit to the −Lth digit with reference to a digit position determined by the statistical information aggregation unit 104D. In the embodiment 2, the configuration and operation other than such configuration and operation of the arithmetic core 300 relating to the statistical information aggregation unit 104D as described above are similar to those in the embodiment 1. Therefore, from among the components of the embodiment 1, the components same as those in the embodiment 1 are denoted by the same reference characters and description of them is omitted.

For example, also in the embodiment 2, the configuration of the server 3A of FIG. 27 or the server 3B of FIG. 28 may be exemplified as the server 3 similarly as in the embodiment 1. Further, as the control core 38 of the server 3B, the configuration of FIG. 36 is exemplified. Furthermore, as the arithmetic core 300, the configuration in which the statistical information aggregation unit 104C is replaced with the statistical information aggregation unit 104D in FIGS. 34 and 35 is exemplified.

Accordingly, also in the embodiment 2, similarly to the embodiment 1, each arithmetic core 300 stores acquired data as a cumulative distribution. On the other hand, the control core 38 (or the CPU 31) sets a threshold value in advance to each arithmetic core 300. As the threshold value, for example, the user may designate a desired value. The server 3 may hold the threshold value as a hyper parameter, for example, a preset value. The threshold value is loaded into a register of the arithmetic processing apparatus 30 from the memory 32, for example, in accordance with an instruction to the arithmetic processing apparatus 30.

Then, each arithmetic core 300 extracts sample number information within a section of −Lth to +Mth digits before and after a digit position at which the threshold value is exceeded first. For example, each arithmetic core 300 calculates digit positions that satisfy the {threshold value< (sample number of digit positions of cumulative distribution/total sample number)}. Each arithmetic core 300 may transfer the extracted sample number and the information of the digit positions at which the sample number/total sample number exceeds the threshold value to the control core 38.

Here, in the case where the cumulative distribution is first information, the sample number at each digit position of the cumulative distribution indicates a number of samples regarding highest-order bit positions having a non-sign bit value and a sample number at and higher-order digit positions. Accordingly, in the case where a certain digit is the highest-order digit of effective digits of a fixed point number, the sample number/total sample number at the digit position of the cumulative distribution is a value corresponding to an overflow rate. Further, the sample number at the digit position of the cumulative distribution indicates an overflow time number. The total sample number is, for example, in one time vector operation by one arithmetic core 300, the number of arithmetic operators used in parallel (dimension number of vectors executed in parallel) and is known.

Further, for example, in the case where results of arithmetic operation by a plural number of times are to be accumulated, the total sample number corresponds to a value obtained by adding the arithmetic operation time number to the total sample number of the one arithmetic core 300 described above. For example, in the case where N vector arithmetic operators operate by K1 times and M scalar arithmetic operators operate by K2 times, the integrated value of arithmetic operation time numbers is N×K1+M×K2. If a parameter (variable vector) and a weight vector for each layer of deep learning are determined, the integrated value of the arithmetic operation time numbers in each layers becomes known. Further, the CPU 31 or the control core 38 may accumulate the number of times of arithmetic operation for a plurality of layers. Further, the CPU 31 or the control core 38 may accumulate the number of times of arithmetic operation of a deep learning process (recognition (forward direction) and learning (backward direction)) for all layers. Furthermore, the CPU 31 or the control core 38 may accumulate the number of times of arithmetic operation within an update interval (FIG. 26) at a decimal point position upon learning to determine a total sample number.

Accordingly, in the case where the user designates a threshold value, the user may designate an overflow rate or an overflow time number. The overflow time number may be specified by taking it as a condition that it is an overflow time number per a certain processing unit, for example, per one time arithmetic operation by one set of vector arithmetic operators that execute arithmetic operation in parallel or per one time arithmetic operation by the total number of arithmetic core 300 in one arithmetic processing apparatus 30. Further, the overflow time number may be specified by taking it as a condition that it is an overflow time number per recognition and learning for one set of input data in one layer, per recognition and learning for one set of input data in all layers or per one update interval of the decimal point position. Therefore, in the following description, it is assumed that the threshold value may be any of an overflow rate and an overflow time number.

The threshold value may be settable, for example, as a runtime parameter upon execution of an application program for deep learning or the like or as a system parameter of the OS or the like. For example, it is assumed that an overflow rate is designated as the threshold value. The CPU 31 may acquire, upon execution of an application program, a runtime parameter or a system parameter from the memory 32 or the like and convert the parameter into a threshold value for comparison with a cumulative value of statistical information based on the number of vector arithmetic operators used in parallel in the arithmetic core 300. Then, the CPU 31 may pass the calculated threshold value to the control core 38, the statistical information aggregation unit 104D of the arithmetic core 300 or the like. The CPU 31 may receive a designation of a threshold value in the form of an overflow rate, convert the threshold value into an overflow time number per one time arithmetic operation in the arithmetic core 300 and pass the resulting overflow time number to the control core 38, the statistical information aggregation unit 104D of the arithmetic core 300 or the like.

The foregoing description is given taking an overflow time number and an overflow rate as examples. However, the situation is similar also where the threshold value is designated in the form of an underflow rate. For example, in the case where the cumulative distribution is second information, the sample number at each digit position of the cumulative distribution indicates a sample number regarding the lowest-order bit position having a non-sign bit value and a sample number at each digit position and succeeding digit positions. Accordingly, in the case where a certain digit is the lowest-order digit among effective digits of a fixed point number, the cumulative distribution/total sample number at the digit position of the cumulative distribution indicates a value corresponding to an underflow rate. Further, the sample number at the digit position of the cumulative distribution indicates an underflow time number. The CPU 31 may convert, in the case where it receives a designation of an underflow rate, the designated underflow rate into a threshold value for comparison with a cumulative value of statistical information based on the number of vector arithmetic operators used for execution in parallel in the arithmetic core 300.

Figure 47:
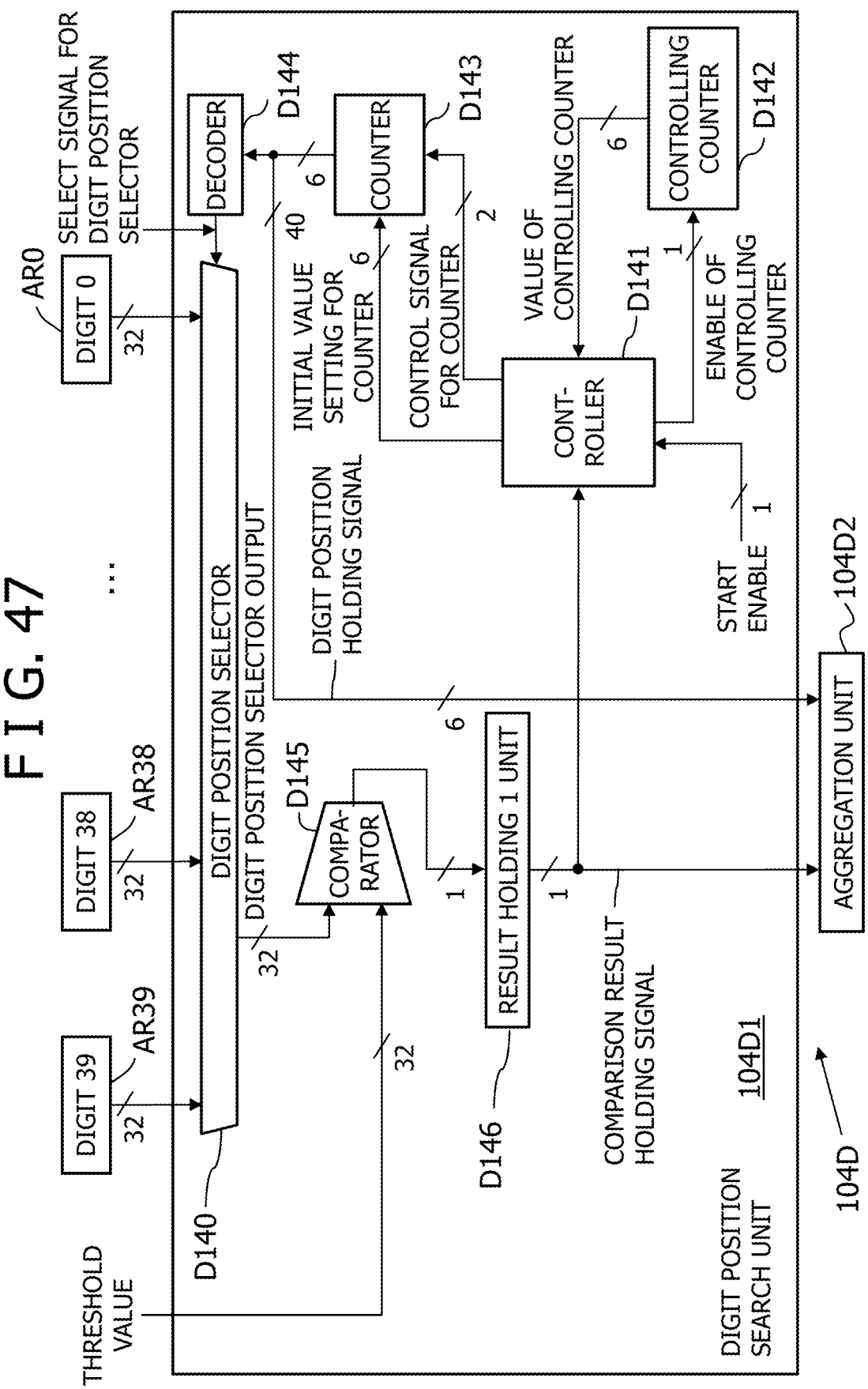
FIG. 47 exemplifies a detailed configuration of a digit position search unit according to an embodiment 2.

In the embodiment 2, the statistical information aggregation unit 104D is divided into a digit position search unit 104D1 and an aggregation unit 104D2. FIG. 47 exemplifies a detailed configuration of the digit position search unit 104D1. It is to be noted that also the aggregation unit 104D2 is exemplified in FIG. 47. The digit position search unit 104D1 includes a digit position selector D140, a controller D141, a controlling counter D142, a counter D143 and a decoder D144 similarly as in the statistical information aggregation unit 104C of the embodiment 1. In the following description, the controller D141 of the digit position search unit 104D1 is also referred to as digit position controlling unit. Further, the digit position search unit 104D1 includes a comparator D145 that compares a sample number of statistical information at each digit from the digit position selector D140 with a threshold value, and a result holding 1 unit D146 that holds a comparison result by the comparator D145. Operation of the digit position selector D140, controller D141, controlling counter D142, counter D143 and decoder D144 from among the components described is similar to operation of the digit position selector 1040, controller 1041, controlling counter 1042, counter 1043 and decoder 1044 in the embodiment 1, respectively. For example, the digit position selector D140 selects a sample number held in one of the digit # registers AR0 to AR39 corresponding to the position of a number designated by the decoder D144.

The controller D141 controls the components of the digit position search unit 104D1. The controller D141 is a hardware circuit that incorporates a state machine. However, the controller D141 may include a built-n processor that operates by firmware stored in a ROM. To the controller D141, a start enable, a count number, and a comparison result holding signal held generated by the comparator D145 and held in the result holding 1 unit D146 are inputted.

The controller D141 starts operation in response to a start enable and turns the enable of the controlling counter D142 ON such that it operates in accordance with the controlling counter D142. After the controller D141 sets a highest-order digit (for example, 39) as a counter initial value to the counter D143, it turns the enable of the counter D143 ON by a control signal for the counter to start operation of the counter D143.

The counter D143 counts a digit position from which statistical information is outputted. The counter D143 continues counting from the counter initial value (highest-order digit) until the enable is turned OFF by a control signal from the controller D141 to the counter D143. The count value of the counter D143 is outputted to the decoder D144 and is outputted as a digit position holding signal to the aggregation unit 104D2.

The decoder D144 is a decoder, similar to the decoder 1044 in the embodiment 1, that converts, for example, a 6-bit binary number into one-hot-vector of 40 bits. The one-hot-vector of 40 bits by the decoder D144 is outputted to the digit position selector D140. The digit position selector D140 outputs a value (sample number of one of the digit # registers AR0 to AR39) of 32 bits corresponding to a bit at which the decoded digit position selector select signal of 40 bits is "1."

The comparator D145 compares a threshold value held in a register not depicted and the sample number at each digit from the digit position selector D140. When the sample number at each digit from the digit position selector D140 is equal to or lower than the threshold value, the comparator D145 outputs 0 (false), but outputs 1 (true) when the sample number exceeds the threshold value. The comparator D145 is an example of a comparison unit that compares information accumulated at each bit position of statistical information and a threshold value with each other.

The result holding 1 unit D146 holds 0 (false) as an initial value as a comparison result holding signal, and if 1 (true) is inputted once, the result holding 1 unit D146 holds 1 (true) as the comparison result holding signal until a reset signal not depicted is inputted thereafter. The result holding 1 unit D146 supplies the comparison result holding signal to the controller D141 and the aggregation unit 104D2.

If the result holding signal changes to 1 (true), the controller D141 sets the enable for the counter D143 to false (0) to stop the counter D143. It is to be noted that, in the embodiment 2, even if the result holding signal becomes 1 (true), the controlling counter D142 continues its operation to continue supply of a count value to the controller D141. The controller D141, controlling counter D142, counter D143 and decoder D144 are an example of a controller that designates a bit position to be selected from among bit positions of statistical information. The digit position selector D140 is an example of a second selection unit that selects information accumulated at a designated bit position.

FIG. 48 exemplifies operation of the result holding 1 unit D146 in the form of a pseudo code of RTL. The result holding 1 unit D146 clears the value q when the reset signal rst is 1 (true). Further, when the reset signal rst is 0 (false) and besides a signal (d) of input data is a positive pulse (1), the result holding 1 unit D146 sets the output data signal q to 1. On the other hand, when the signal (d) of the input data is any other than a positive pulse (1), the result holding 1 unit D146 maintains the output data signal q as it is.

Figure 49:
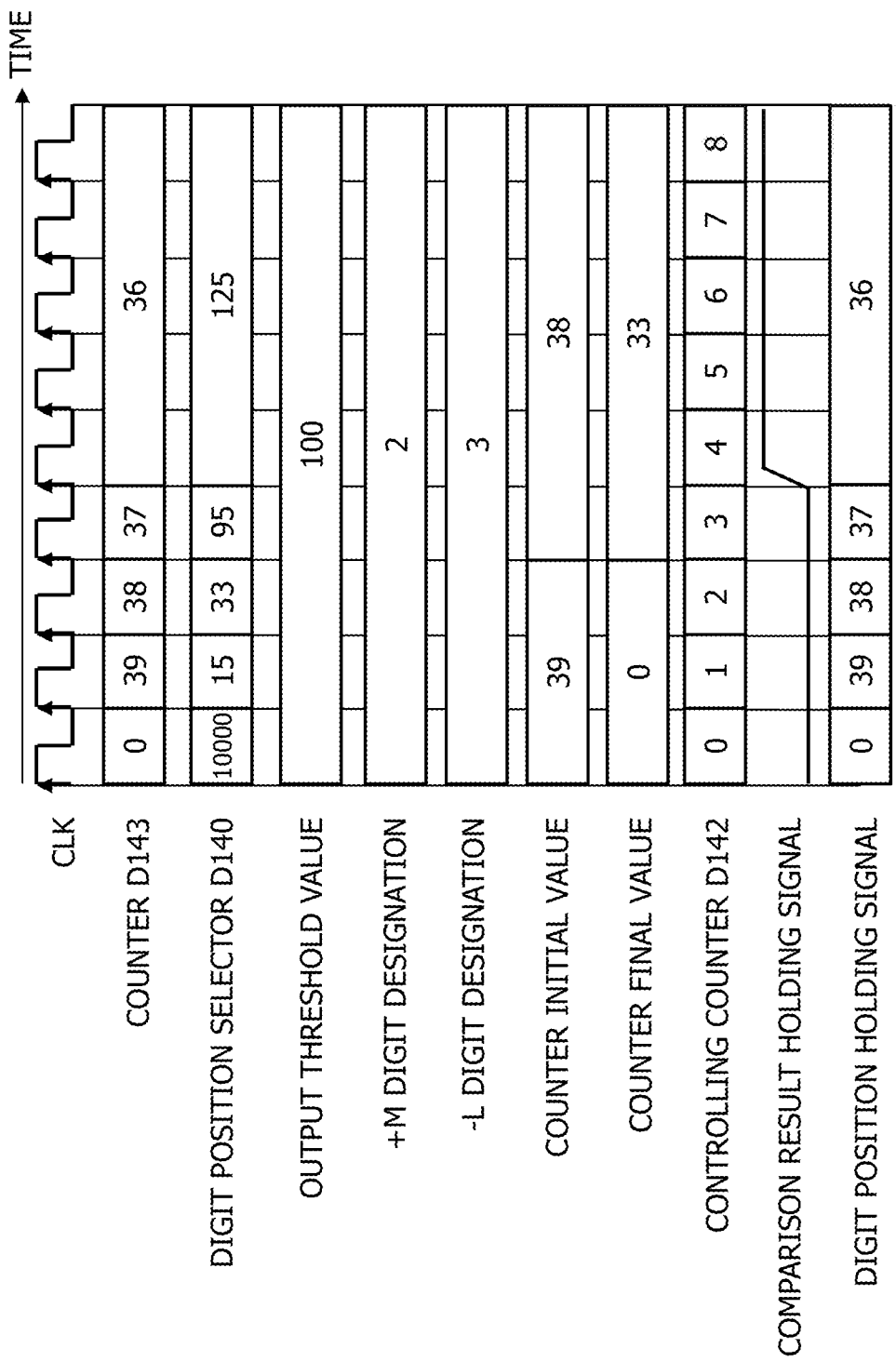
FIG. 49 exemplifies, in time chart, operation of components of a digit position search unit.

FIG. 49 is a time chart exemplifying operation of components of the digit position search unit 104D1. In the following, operation of the digit position search unit 104D1 of FIG. 47 is described with reference also to the time chart of FIG. 49. Similarly as in the embodiment 1, the controller D141 starts its operation first when the start enable becomes 1 (true). Then the controlling counter D142 starts its operation when the controller D141 changes the enable signal for the controlling counter D142 to "1." When counting of the controlling counter D142 becomes 1 (true), the controller D141 sets an initial value "39" to the counter D143 and turns the enable to 1 "true" to activate the counter D143.

Operation of the decoder D144 and the digit position selector D140 is similar to that in the embodiment 1. As described hereinabove, a threshold value is a set value, for example, set by the user. The comparator D145 compares sample numbers of digits successively outputted through the digit position selector D140 with the threshold value and outputs 1 (true) if the sample number exceeds the threshold value. On the other hand, when the sample number is equal to or lower than the threshold value, the comparator D145 outputs 0 (false).

If the output of the comparator D145 changes once to 1 (true) as depicted in FIG. 48, the result holding 1 unit D146 holds this result. If the output of the result holding 1 unit D146 becomes 1 (true), the controller D141 sets the enable for the counter D143 to 0 (false) to stop the counter D143. As a result of the foregoing, the digit position holding signal continues to hold a counter value (digit position information) when it is decided by the comparator D145 that the sample number is higher than the threshold value. It is to be noted that, in FIG. 49, the +M digit designation value and the −L digit designation value are loaded into a register of the arithmetic processing apparatus 30 from the memory 32, for example, in accordance with an instruction from the CPU 31 to the arithmetic processing apparatus 30.

Figure 50:
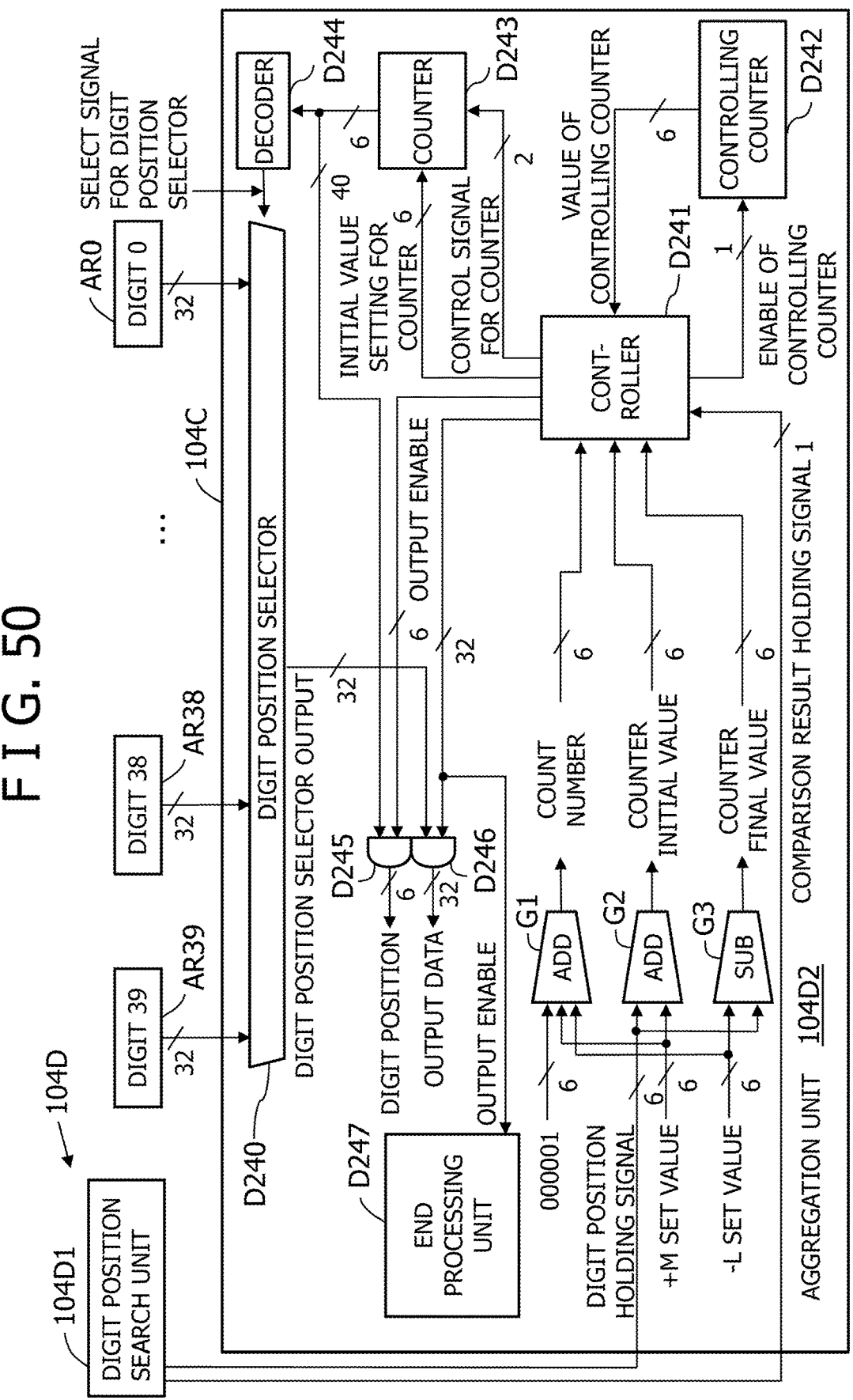
FIG. 50 exemplifies a configuration of an aggregation unit of a statistical information aggregation unit according to the embodiment 2.

FIG. 50 is a view exemplifying a configuration of the aggregation unit 104D2 of the statistical information aggregation unit 104D according to the embodiment 2. It is to be noted that also the digit position search unit 104D1 is exemplified in FIG. 50. As described hereinabove, in the embodiment 2, the digit position search unit 104D1 generates a digit position holding signal corresponding to a digit position designation value in the embodiment 1. Further, the digit position search unit 104D1 inputs a comparison result holding signal as a start enable signal to a controller D241. It is to be noted that the controller D241 of the aggregation unit 104D2 is referred to also as output controlling unit.

Here, operation of the aggregation unit 104D2 in the embodiment 2 is substantially similar to that of the statistical information aggregation unit 104C in the embodiment 1. For example, the digit position search unit 104D1 generates a digit position holding signal corresponding to a digit position designation value and generates a comparison result holding signal that becomes a start enable signal. For example, an adder G2 for outputting an upper limit position of a digit adds a digit position holding signal of a digit position setting value and a +M set value to calculate an upper limit value of a digit that is a counter initial value. Further, a subtractor (SUB) G3 for outputting a lower limit position for a digit subtracts a −L set value from the digit position holding signal that is a digit position setting value to calculate a lower limit position for a digit that is a counter final value. The configuration of the other part of the arithmetic core 300 in the embodiment 2 than that described above is similar to that of the arithmetic core 300 in the embodiment 1. For example, the controller D241 starts its operation in response to a comparison result holding signal as an enable signal therefor and controls the counter D243 with a count number, a counter initial value and a counter end value. As a result, a sample number of statistical information is extracted from a digit position selector D240 within the range from the +Mth digit to the −Lth digit with reference to the digit position holding signal indicative of the digit position setting value.

Therefore, it is assumed that, to the components other than the components relating to the digit position search unit 104D1 from among the components of the arithmetic core 300 in the embodiment 2, the configuration in the embodiment 1 is applied as it is, and therefore, description of the same is omitted. Further, description of an end processing unit D247 is omitted since it is similar to the end processing unit 1047 in the embodiment 1.

Figure 51:
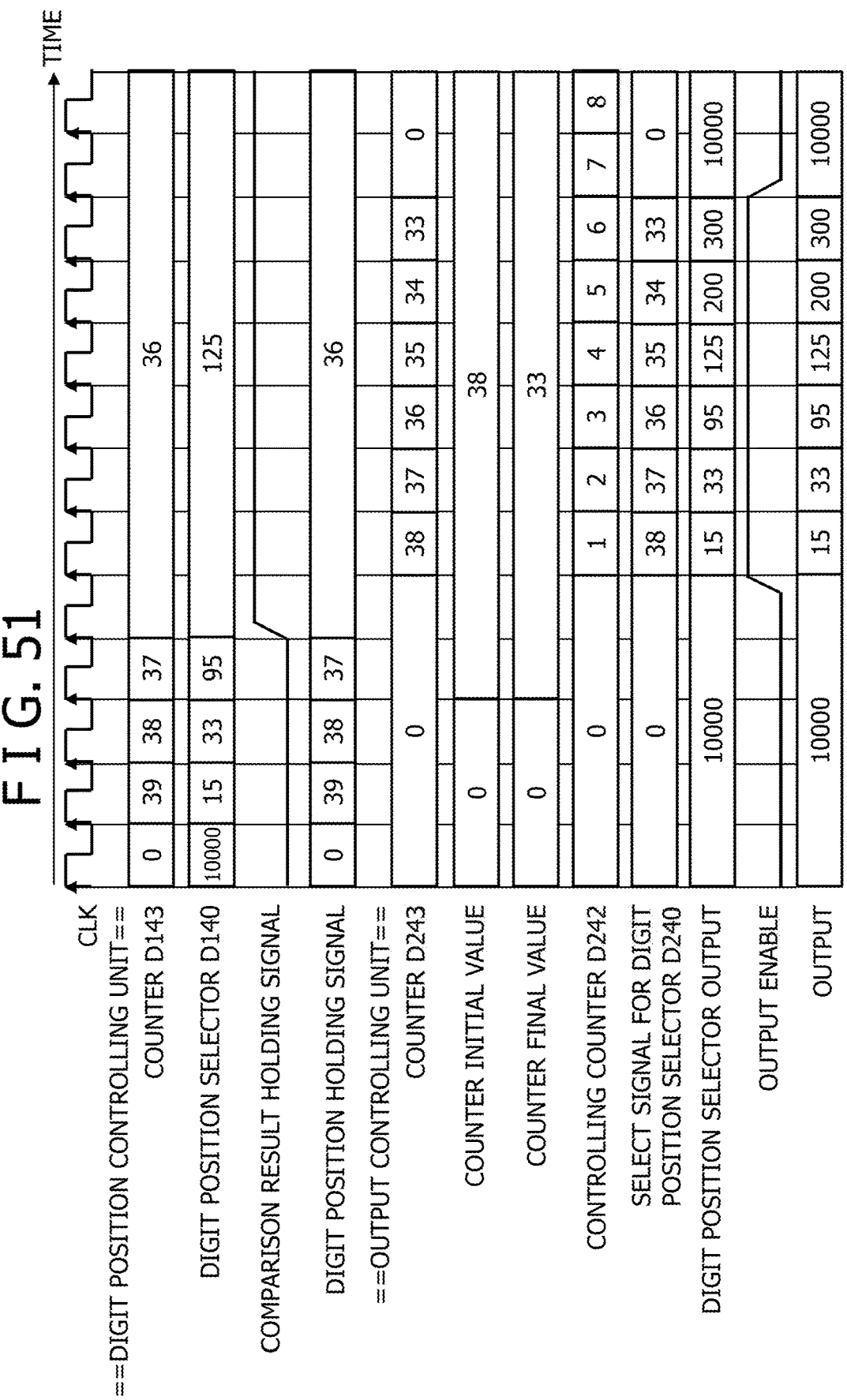
FIG. 51 exemplifies, in time chart, operation of components of the statistical information aggregation unit according to the embodiment 2.

FIG. 51 is a time chart exemplifying operation of components of the statistical information aggregation unit 104D in the embodiment 2. For example, FIG. 51 includes operation of the digit position search unit 104D1 and the aggregation unit 104D2. It is to be noted that, since operation of the aggregation unit 104D2 in the embodiment 2 is substantially similar to that of the statistical information aggregation unit 104C in the embodiment 1, a difference between them is described. For example, the digit position holding signal outputted from the digit position search unit 104D1 corresponds to the digit position setting value in the embodiment 1, and when the comparison result holding signal changes to 1 (true), the controller D241 (digit position controlling unit) starts its operation. In the time chart including operation of the digit position search unit 104D1, variations of signals after an end of the digit position search when the comparison result holding signal becomes 1 (true) are similar to those in the embodiment 1. It is to be noted that, in FIG. 51, digit position controlling unit indicates operation of the controller D141 of the digit position search unit 104D1 of FIG. 47, and output controlling unit indicates operation of the controller D241 of the aggregation unit 104D2 of FIG. 50.

As depicted in FIG. 51, when the comparison result holding signal becomes 1 (true), the digit position holding signal is fixed (in FIG. 51, to the value 36). The digit position selector D240 selects a range from a +M set value (M is 2 in FIG. 49) to a −L set value (value of L is 3 in FIG. 49) in accordance with the digit position (36) of the digit position holding signal. For example, the controller D241 controls the counter D243 to count within the range from the digit position 38 to the digit position 33, and the digit position selector D240 outputs an output signal corresponding to the count value (sample number).

It is to be noted that, in FIGS. 49 and 51, an overflow rate and an overflow time number are assumed for the threshold value and the statistical information. Therefore, the counter D143, counter D243 and so forth count from the high-order digit 39 toward a lower-order digit. However, in the case where an underflow rate and an underflow time number are assumed for the threshold value and the statistical information, the counter D143, counter D243 and so forth may acquire statistical information at a non-sign lowest-order bit position from the low-order digit 0 toward a higher-order digit.

<Advantageous Effect of Embodiment 2>

The statistical information aggregation unit 104D in the embodiment 2 compares, for example, a threshold value designated by the user and digits of a cumulative distribution (sample number/total sample number) of statistical information are successively compared with each other from the high-order digit to identify a digit at which the sample number/total sample number exceeds the threshold value. Then, the statistical information aggregation unit 104D holds the number of digit position at which the sample number/total sample number exceeds the threshold value as a digit position holding signal and uses the digit position holding signal in place of the digit position setting value in the embodiment 1. As a result, in the server 3 in the embodiment 2, the user may designate a threshold value such as an overflow rate in place of designating a digit position from which a sample number of statistical information is to be collected.

Also in the embodiment 2, similarly to the embodiment 1, for example, in the case where one time vector operation in one arithmetic core is determined as a target, the total sample number may be specified by an arithmetic operator number by which parallel arithmetic operation of vector arithmetic operators is executed. Accordingly, the sample number at each digit corresponds to an overflow time number in the case where the digit is a highest-order effective digit of fixed point data. Further, the ratio of a sample number at each digit to the total sample number indicates an overflow rate in the case where the digit is a highest-order effective digit of the fixed point data.

Accordingly, by determining a threshold value based on an overflow rate designated by the user, the CPU 31 or the control core 38 may acquire a sample number of statistical information at a portion at which the overflow rate is proximate to a desired range of the user. For example, the user who executes an application program for deep learning or the like on the server 3 may acquire a cumulative distribution of statistical information in the proximity of digit positions effective for decision for placing the overflow rate into a desired range.

Although the foregoing description is given taking an overflow rate as an example, it similarly applies also where the user designates an underflow rate. In the case where an underflow rate and an underflow time number are assumed for a threshold value and statistical information, the counter D143, counter D243 or the like may acquire statistical information at the non-sign lowest-order bit position from the low-order digit 0 toward a higher-order digit. Accordingly, in an embodiment 2, for example, the user or an application program may perform setting of a decimal point position for placing the overflow rate or the underflow rate into a desirable range more precisely than in the embodiment 1.

Embodiment 3

An arithmetic core 300 of an arithmetic processing apparatus 30 of an embodiment 3 is described with reference to FIGS. 52 to 56. In the embodiment 2 described above, in the case where statistical information at a non-sign highest-order bit position is to be acquired, the digit position search unit 104D1 of the statistical information aggregation unit 104D acquires the number of samples at each digit in a cumulative distribution of statistical information in order from a higher-order digit and compares the sample number/total sample number with a threshold value capable of being designated by the user or the like. Then, a digit is specified at which the sample number/total sample number exceeds the threshold value. It is to be noted that, in the embodiment 2, in the case where statistical information of a non-sign lowest-order bit position is to be acquired, the digit position search unit 104D1 may acquire the number of samples at each digit in the cumulative distribution of the statistical information in order from a lower-order digit. Then, the digit position search unit 104D1 may specify a digit at which the sample number exceeds the threshold value.

In the present embodiment, in the case where the statistical information at the non-sign highest-order bit position is to be acquired, a digit position search unit 104E1 acquires the number of samples at each digit in the cumulative distribution of the statistical information in order from the lower-order digit and compares the acquired sample number with a threshold value capable of being designated by the user or the like. Then, the digit position search unit 104E1 specifies a digit at which the sample number is equal to or lower than the threshold value. It is to be noted that, in the case where statistical information at a non-sign lowest-order bit position is to be acquired, the digit position search unit 104E1 may compare the sample number at each digit in the cumulative distribution of the statistical information with the threshold value in order from the higher-order digit. Then, a digit position search unit 104E1 may specify a digit at which the sample number is equal to or lower than the threshold value. For example, different from the embodiment 2, in the embodiment 3, the digit position search unit 104E1 specifies a digit at which the sample number is equal to or lower than the threshold value.

The configuration and operation of the other part of the embodiment 3 are similar to those of the embodiment 2. Therefore, components same as those of the embodiments 1 and 2 from among the components of the embodiment 3 are denoted by like reference characters to those of the embodiments 1 and 2, and description of them is omitted.

For example, also in the embodiment 3, the configuration of the server 3A of FIG. 27 or the server 3B of FIG. 28 may be exemplified as the server 3 similarly as in the embodiments 1 and 2. Further, as the control core 38 of the server 3B, that of the configuration in FIG. 36 is exemplified. Further, as the arithmetic core 300, that of the configuration is exemplified in which the statistical information aggregation unit 104C is replaced with a statistical information aggregation unit 104E in FIGS. 34 and 35.

Accordingly, also in the embodiment 3, each arithmetic core 300 stores acquired data as a cumulative distribution similarly as in the embodiments 1 and 2. On the other hand, the control core 38 (or CPU 31) sets a threshold value in advance in each arithmetic core 300. For the threshold value, for example, the user may designate a desired value. The server 3 may hold the threshold value as a hyper parameter.

Then, each arithmetic core 300 acquires each sample number of the cumulative distribution in order from a lower-order digit and compares the acquired sample number with the threshold value. Then, each arithmetic core 300 extracts sample number information within a section of −L to +M digits before and after the last-order digit position at which the sample number is equal to or lower than the threshold value. For example, each arithmetic core 300 calculates a position at which the {threshold value>= (sample number at digit position of cumulative distribution/ total sample number)} is satisfied. Each arithmetic core 300 may transfer the extracted sample number and the position information at which the sample number is equal to or lower than the threshold value to the control core 38. Since the threshold value is similar to the threshold value in the embodiment 2, description of the same is omitted.

Also in the embodiment 3, the statistical information aggregation unit 104E is divided into a digit position search unit 104E1 and an aggregation unit 104E2. A detailed configuration of the digit position search unit 104E1 is exemplified in FIG. 52. It is to be noted that, in FIG. 52, also the aggregation unit 104E2 is exemplified. The digit position search unit 104E1 includes a digit position selector E140, a controller E141, a controlling counter E142, a counter E143 and a decoder E144 similarly to the statistical information aggregation unit 104C in the embodiment 1 and the digit position search unit 104D1 in the embodiment 2. The digit position search unit 104E1 further includes a comparator E145 for comparing the sample number from the digit position selector E140 and a threshold value and a result holding 1 unit E146 for holding a result of the comparison by the comparator E145. Operation of the digit position selector E140, controller E141, controlling counter E142, counter E143 and decoder E144 is similar to that of the digit position selector D140, controller D141, controlling counter D142, counter D143 and decoder D144 in the embodiment 2, respectively. The comparator E145 is an example of a comparison unit configured to compare information accumulated at each bit position of statistical information and a threshold value. The controller E141, controlling counter E142, counter E143 and decoder E144 are an example of a controller for designating a bit position to be selected from among bit positions of statistical information. The digit position selector E140 is an example of a second selection unit configured to select information accumulated at a designated bit position.

However, as described hereinabove, the counter E143 in the embodiment 3 is successively incremented from an initial value (digit 0) toward a final value (digit 38). Accordingly, the comparator E145 acquires the sample number at each digit from a low-order digit corresponding to the counter initial value of the digit position selector E140 toward a high-order digit corresponding to the counter final value and compares the acquired sample numbers with the threshold value. Since the configuration and operation of the other part of the digit position search unit 104E1 are similar to those of the digit position search unit 104D1 of the embodiment 2, description of the same is omitted.

FIG. 53 depicts a pseudo code of RTL exemplifying operation of the counter E143 exemplified in FIG. 52 (and a counter E243 exemplified in FIG. 53). While the counter 1043 decrements the count value q in FIG. 41 of the embodiment 1, in FIG. 53 of the embodiment 3, the counter E143 increments the count value q until the count value q reaches 39 as clearly indicated by a rectangular frame.

Figure 54:
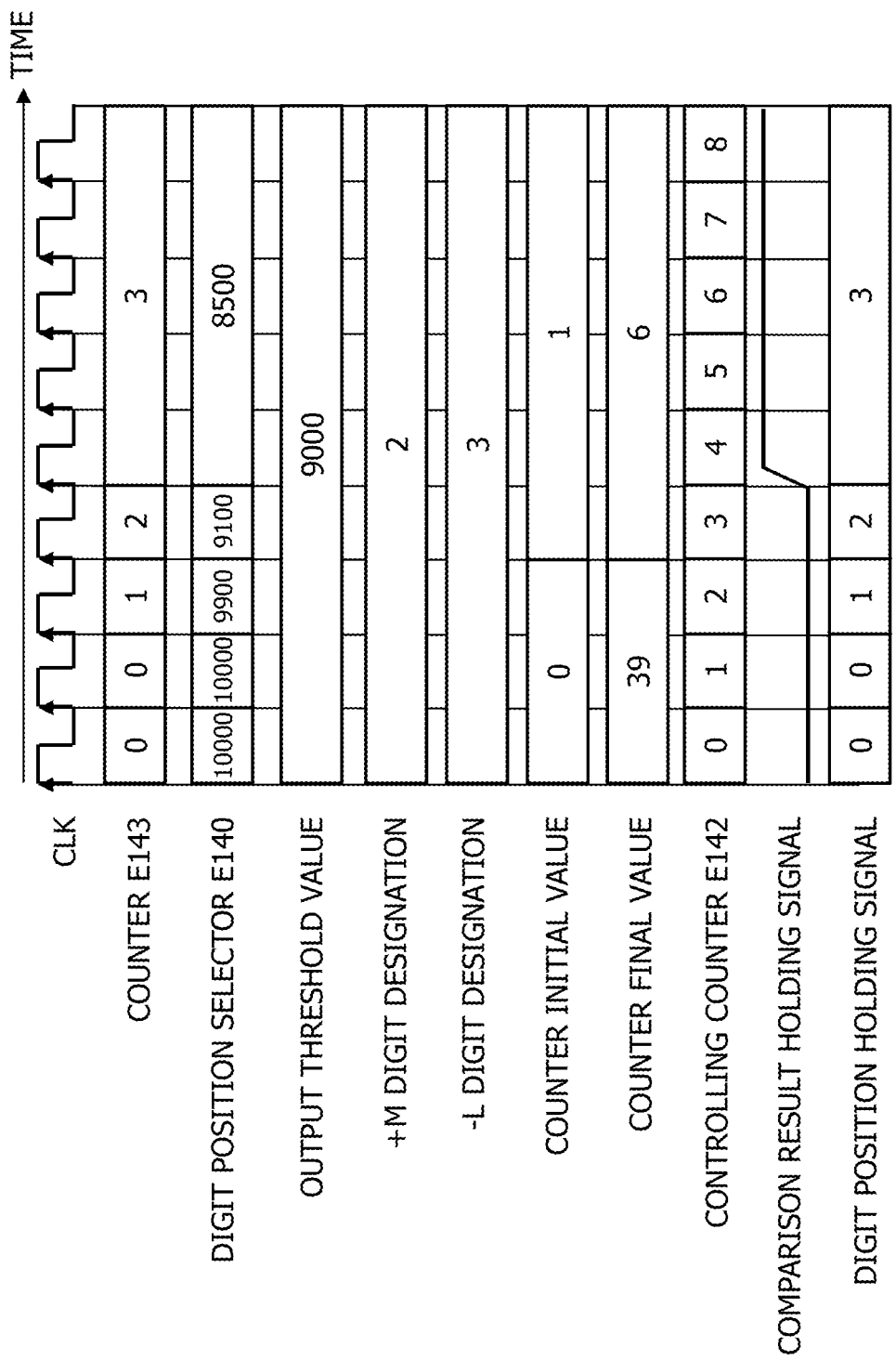
FIG. 54 exemplifies, in timing chart, operation of components of the digit position search unit of the embodiment 3.

FIG. 54 is a timing chart exemplifying operation of components of the digit position search unit 104E1 in the embodiment 3. Operation of the digit position search unit 104E1 in the embodiment 3 is similar to operation of the digit position search unit 104D1 in the embodiment 2 except that the counter E143 is incremented from a low-order digit toward a high-order digit.

Figure 55:
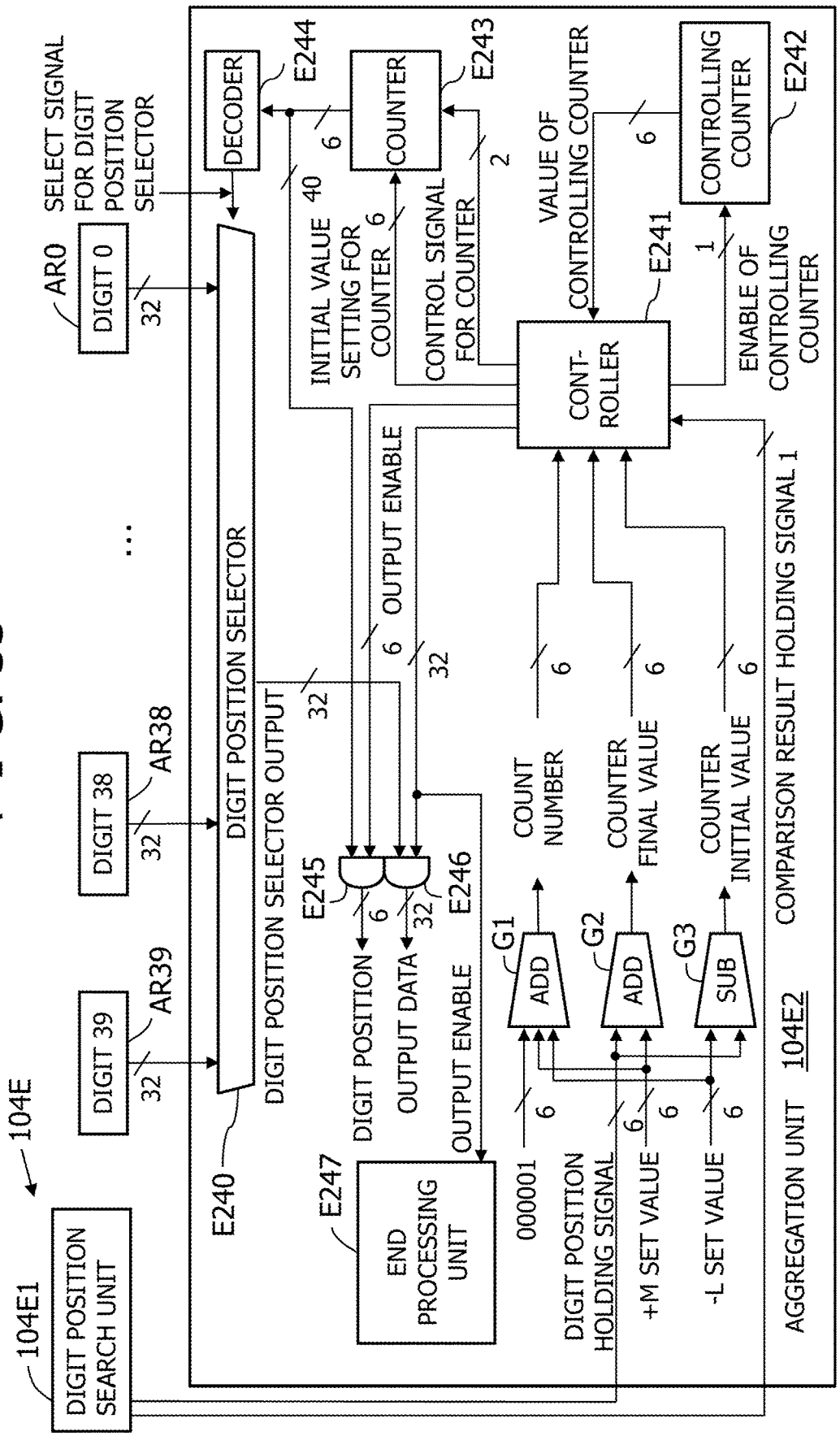
FIG. 55 exemplifies a configuration of an aggregation unit of a statistical information aggregation unit according to the embodiment 3.

FIG. 55 is a view exemplifying a configuration of the aggregation unit 104E2 of the statistical information aggregation unit 104E according to the embodiment 3. In the aggregation unit 104E2, the counter D243 in the embodiment 2 is changed to the counter E243 in comparison with the aggregation unit 104D2 of the embodiment 2. The counter 1043 in the embodiment 1 and the counter D143 of the embodiment 2 decrement the count value from a value corresponding to a high-order digit (position of the digit position holding signal +M) toward a low-order digit (position of the digit position holding signal −L). On the other hand, in the embodiment 3, the counter E143 increments the count value from a low-order digit (position of the digit position holding signal −L) toward a value corresponding to a high-order digit (position of the digit position holding signal +M).

Accordingly, the counter initial value is set to the value of the digit position holding signal −L by the subtractor (SUB) G3. Further, the counter final value is set to the value of the digit position holding signal +M by the adder (ADD) G2. Since the configuration and operation of the other part of the statistical information aggregation unit 104E are similar to those of the statistical information aggregation unit 104D in the embodiment 2, description of the same is omitted.

Figure 56:
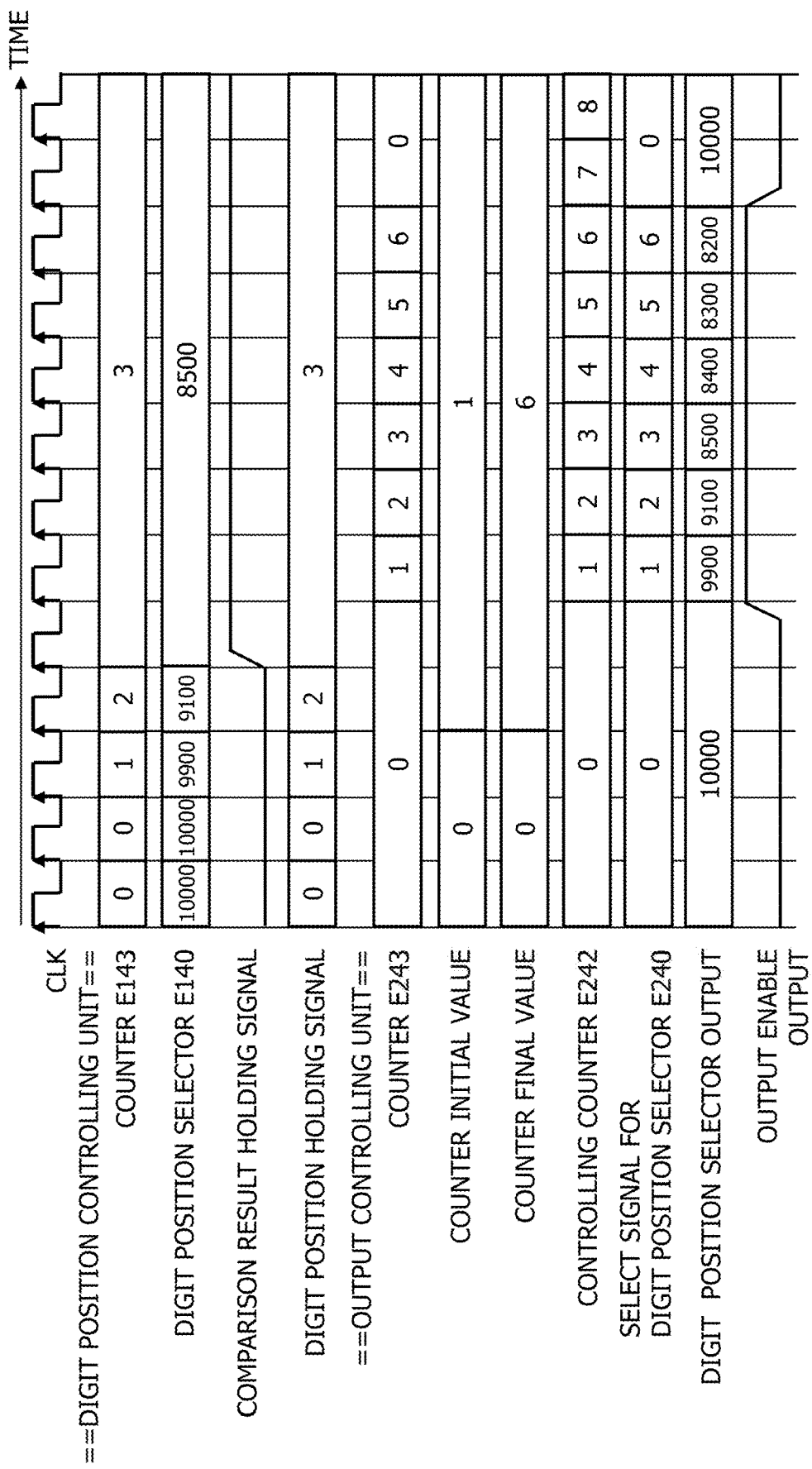
FIG. 56 exemplifies, in time chart, operation of components of the digit position search unit and the aggregation unit of the embodiment 3.

Further, FIG. 56 is a time chart exemplifying operation of components of the digit position search unit 104E1 and aggregation unit 104E2 in the embodiment 3. Operation of the aggregation unit 104E2 in the embodiment 3 is similar to operation of the aggregation unit 104D2 in the embodiment 2 except that the counters E143 and E243 are incremented from a low-order digit toward a high-order digit.

<Advantageous Effect of Embodiment 3>

In the embodiment 3, the counter E143 of the digit position search unit 104E1 and the counter E243 of the aggregation unit 104E2 are incremented from a low-order digit toward a high-order digit. Then, the digit position search unit 104E1 may set the counter initial value to the position of the digit position holding signal −L and set the counter final value to the position of the digit position holding signal +M to determine a digit at which the sample number/total sample number (for example, overflow rate) of statistical information becomes equal to or lower than the threshold value designated by the user.

It is to be noted that, conversely where the digit position search unit 104E1 is to determine a digit at which an underflow rate becomes equal to or lower than a threshold value designated by the user, the digit position search unit 104E1 may acquire statistical information of the non-sign lowest-order bit position. In this case, the counter E143 of the digit position search unit 104E1 and the counter E243 of the aggregation unit 104E2 decrement from a high-order digit toward a low-order digit. Then, the digit position search unit 104E1 may determine the counter initial value to the position of the digit position holding signal −M and determine the counter final value to the position of the digit position holding signal −L to determine a digit at which the underflow rate becomes equal to or lower than a threshold value designated by the user.

Embodiment 4

In the embodiment 2 described above, the digit position search unit 104D1 compares a threshold value and a sample number from a high-order digit of statistical information toward a low-order digit and determines a digit at which the sample number at a highest-order bit position having a non-sign bit value exceeds a threshold value designated by the user. Meanwhile, in the embodiment 3, the digit position search unit 104E1 compares a threshold value and a sample number from a low-order digit of statistical information toward a high-order digit and determines a digit at which the sample number at the highest-order bit position having a non-sign bit value is equal to or lower than a threshold value designated by the user.

In an embodiment 4, each arithmetic core 300 of an arithmetic processing apparatus 30 extracts a sample number within a specific range utilizing both the embodiment 2 and the embodiment 3. The configuration and operation of the other part of the embodiment 4 are similar to those of the embodiments 1 to 3. Therefore, the same components to those in the embodiments 1 to 3 are denoted by the same reference characters and description of the same is omitted.

For example, also in the embodiment 4, the configuration of the server 3A of FIG. 27 or the server 3B of FIG. 28 may be exemplified as that of a server 3 similarly as in the embodiments 1 to 3. Further, as the control core 38 of the server 3B, the configuration of FIG. 36 is exemplified. Further, as the arithmetic core 300, the configuration of FIGS. 34 and 35 in the embodiment 1 may be exemplified.

Accordingly, also in the embodiment 4, each arithmetic core 300 stores acquired data as a cumulative distribution similarly as in the embodiment 1. On the other hand, the control core 38 (or CPU 31) sets two threshold values (for example, threshold value 1>threshold value 2) in advance to each arithmetic core 300. For the threshold values, for example, the user may designate desired values. The server 3 may hold the threshold values as hyper parameters, for example, preset values.

Then, each arithmetic core 300 extracts sample number information corresponding to a range higher than the threshold value 2 and equal to or lower than the threshold value 1. For example, each arithmetic core 300 calculates a range for a digit position of statistical information within which the {threshold value 2<(sample number at digit position of cumulative distribution/total sample number)=<threshold value 1} is satisfied. Each arithmetic core 300 may extract and transfer a sample number and position information within the calculated range for the digit position to the control core 38.

Figure 57:
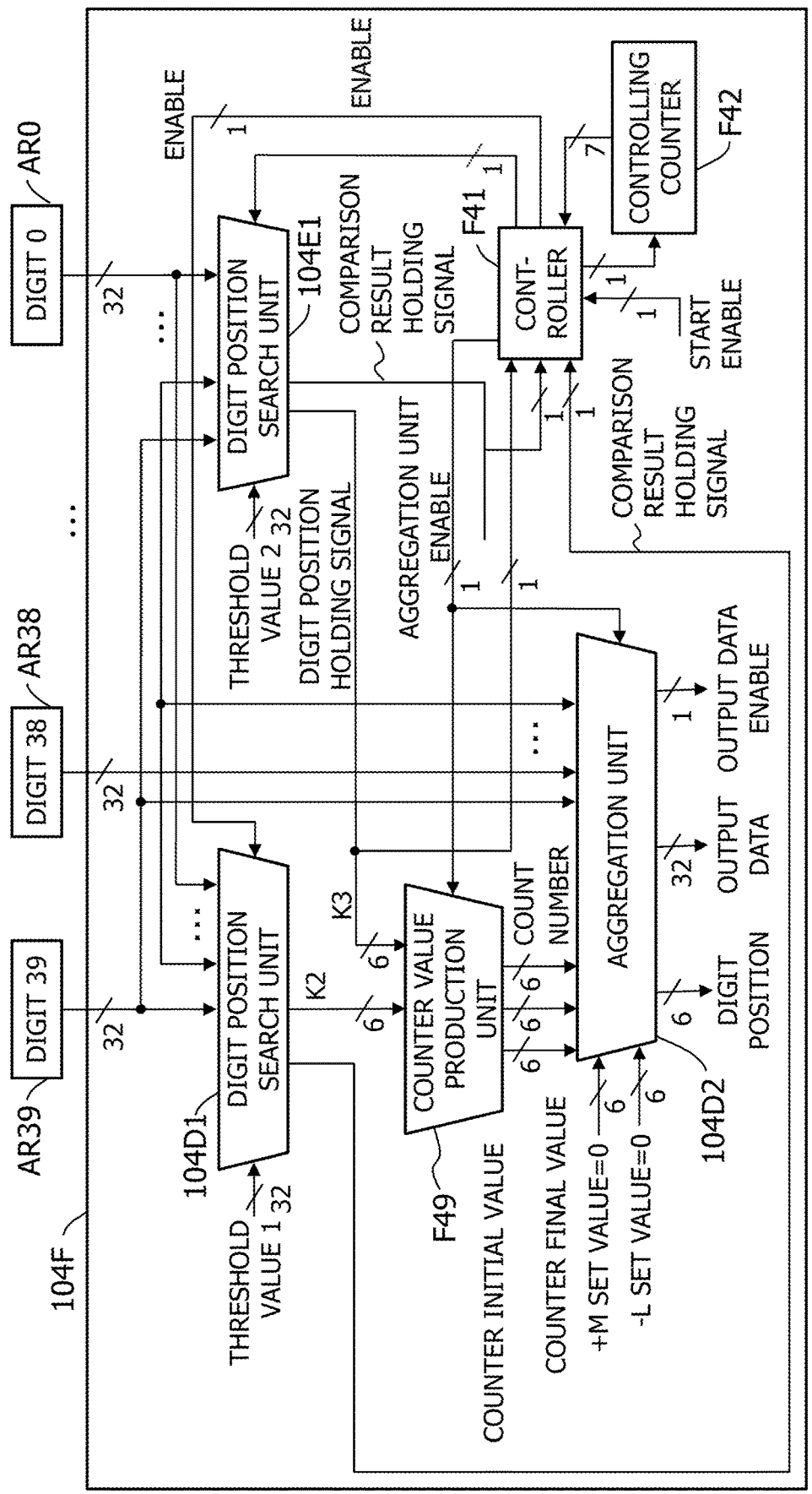
FIG. 57 exemplifies a configuration of a statistical information aggregation unit according to an embodiment 4.

FIG. 57 exemplifies a configuration of a statistical information aggregation unit 104F according to the embodiment 4. In FIG. 57, also digit # registers AR0 to AR39 that individually are statistical information storage units for individual digits are depicted together with the statistical information aggregation unit 104F. Further, in FIG. 57, two digit position search units 104D1 and 104E1 are depicted so as to be included in the statistical information aggregation unit 104F. For example, the statistical information aggregation unit 104F includes the digit position search unit 104D1 and aggregation unit 104D2 described in connection with the embodiment 2, the digit position search unit 104E1 described in connection with the embodiment 3, a counter value production unit F49, a controller F41 and a controlling counter F42. For example, the statistical information aggregation unit 104F in the embodiment 4 extracts the sample number within the specific range from the digit # registers AR0 to AR39 utilizing both the characteristic of the embodiment 2 and the characteristic of the embodiment 3 as depicted in FIG. 57. It is to be noted that the digit position search unit 104D1, aggregation unit 104D2 and digit position search unit 104E1 in the statistical information aggregation unit 104F include a configuration similar to that of the controller F41, controlling counter F42 and so forth (refer to FIGS. 47, 50 and 52).

Similarly as in the embodiments 1 to 3, the controller F41 starts processing in accordance with a start enable signal to activate the controlling counter F42 and operates in accordance with a count value of the controlling counter F42. The controller F41 sets the digit position search unit 104D1 to enable when the following three conditions are satisfied.

(Condition D1) Start enable to the controller F41 is ON.

(Condition D2) The controlling counter F42 starts counting operation (the count value is equal to or higher than 1).

(Condition D3) A comparison result holding signal of the digit position search unit 104D1 is not 1 (true). For example, in the digit position search unit 104D1, the sample number at a digit at present does not satisfy its threshold value condition.

The controller F41 sets the digit position search unit 104E1 to enable when the following three conditions are satisfied.

(Condition E1) Start enable to the controller F41 is ON.

(Condition E2) The controlling counter F42 starts counting operation (the count value is equal to or higher than 1).

(Condition E3) A comparison result holding signal of the digit position search unit 104E1 is not 1 (true). For example, in the digit position search unit 104E1, the sample number at a digit at present does not satisfy its threshold value condition.

The configuration and operation of the digit position search unit 104D1 are similar to those in the embodiment 2. Since the configuration of the digit position search unit 104D1 is described already in connection with the embodiment 2, details of the same are omitted. The digit position search unit 104D1 reads out the sample number of the digit registers AR0 to AR39, which are statistical information storage units of the individual digits, in order from a high-order digit and compares the read out sample number with the threshold value 2. Then, if the sample number/total sample number exceeds the threshold value 2, the digit position search unit 104D1 outputs a digit position holding signal of the digit position K2 to the counter value production unit F49 and sets the comparison result holding signal to 1 (true) and then inputs the comparison result holding signal to the controller F41.

The process by which the digit position search unit 104D1 reads out the sample number from the digit # registers AR0 to AR39, which are statistical information storage units of individual digits, in order from a high-order digit and compares the read out sample number with the threshold value 2 is an example in which information accumulated successively at individual digits is compared with the first threshold value from a highest-order digit toward a lowest-order digit of the statistical information held by the holding unit. The digit position K2 when the sample number/total sample number exceeds the threshold value 2 is an example of a first digit designated based on a result of the comparison. Accordingly, the digit position search unit 104D1 is an example of a first search unit.

Further, the configuration and operation of the digit position search unit 104E1 are similar to those in the embodiment 3. Since the configuration of the digit position search unit 104E1 is described already in connection with the embodiment 2, details of the same are omitted. The digit position search unit 104E1 reads out the sample number of the digit # registers AR0 to AR39, which are statistical information storage units for individual digits, in order from a low-order digit and compares the read out sample number with the threshold value 1. Then, if the sample number/total sample number becomes equal to or lower than the threshold value 1, the digit position search unit 104E1 outputs a digit position holding signal at the digit position K3 to the counter value production unit F49 and sets a comparison result holding signal to 1 (true) and then inputs the comparison result holding signal to the controller F41.

The process by which the digit position search unit 104E1 reads out the sample number from the digit # registers AR0 to AR39, which are statistical information storage units for individual digits, in order from a low-order digit and compares the read out sample number with the threshold value 1 is an example in which information accumulated successively in the individual digits is compared with a second threshold value from a lowest-order digit toward a highest-order digit of the statistical information held by the holding unit. The digit position K3 when the sample number/total sample number becomes equal to or lower than the threshold value 1 is an example of a second digit designated based on a result of the comparison. Accordingly, the digit position search unit 104E1 is an example of a second search unit.

If the comparison result holding signal from the digit position search unit 104D1 becomes 1 (true), the controller F41 turns the enable of the digit position search unit 104D1 OFF. Further, if the comparison result holding signal from the digit position search unit 104E1 becomes 1 (true), the controller F41 turns the enable of the digit position search unit 104E1 OFF. Further, if both the comparison result holding signal from the digit position search unit 104D1 and the comparison result holding signal from the digit position search unit 104E1 become 1 (true), the controller F41 may set an aggregation unit enable signal to 1 (true) to render the counter value production unit F49 and the aggregation unit 104D2 operable.

The counter value production unit F49 generates a counter initial value and a counter final value in accordance with the following logics: counter initial value=MAX(K2, K3); (expression 1), counter final value=MIN(K2, K3); (expression 2). Here, K2 is a value of the digit position holding signal from the digit position search unit 104D1. Further, K3 is a value of the digit position holding signal from the digit position search unit 104E1.

Then, the counter value production unit F49 calculates a digit position setting value and a count number that are parameters to be outputted to the aggregation unit 104D2 in accordance with the following logics: digit position setting value=counter initial value=MAX(K2, K3); (expression 3), count number=counter initial value −counter final value=MAX(K2, K3)−MIN(K2, K3); (expression 4).

Since the configuration and operation of the aggregation unit 104D2 are similar to those of the aggregation unit 104D2 of the embodiment 2, description of the configuration of the same is omitted. Similarly to the aggregation unit 104D2 in the embodiment 2, the aggregation unit 104D2 outputs a sample number of the digit # registers AR0 to AR39 corresponding to digit positions from the counter initial value to the counter final value. The counter value production unit F49 and the aggregation unit 104D2 are an example of a third selection unit that selects information accumulated at each digit within a range designated by the first digit and the second digit.

Figure 58:
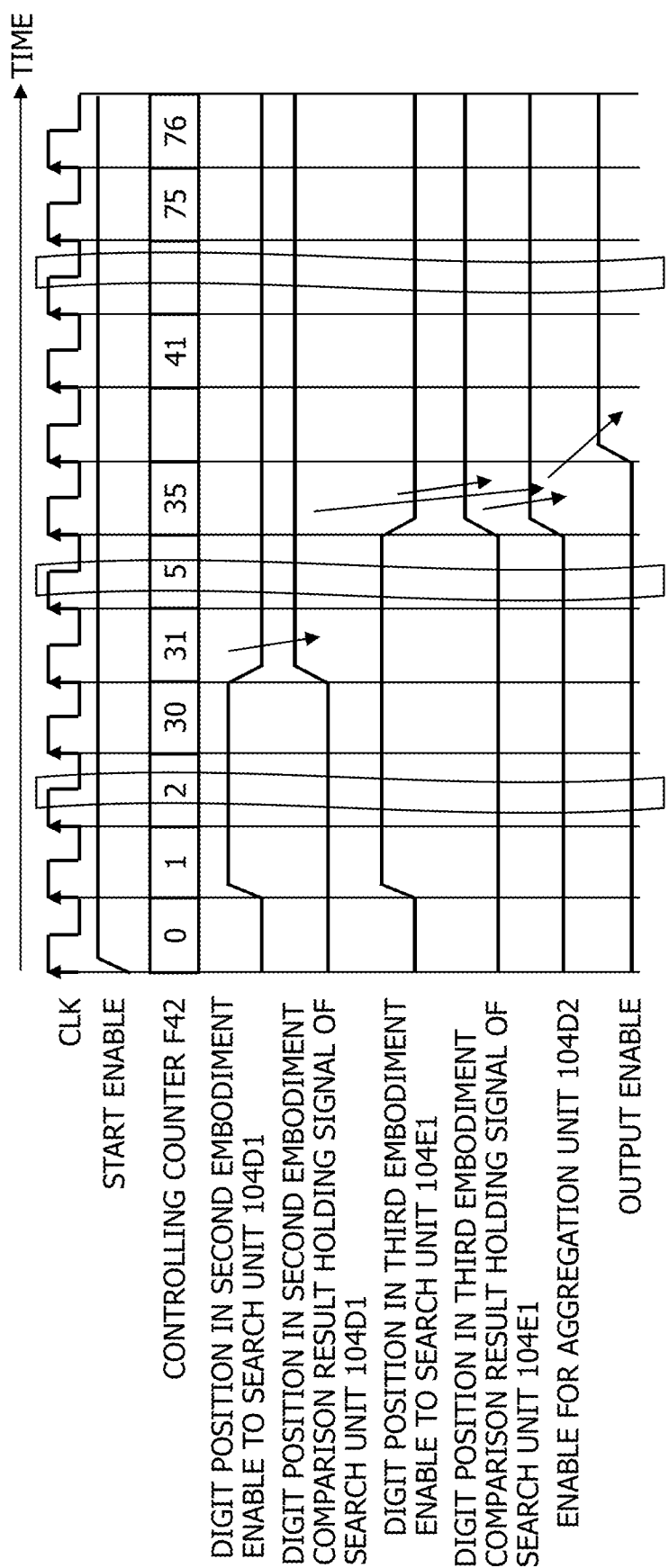
FIG. 58 exemplifies, in time chart, operation of a controller of the statistical information aggregation unit according to the embodiment 4.
Figure 59:
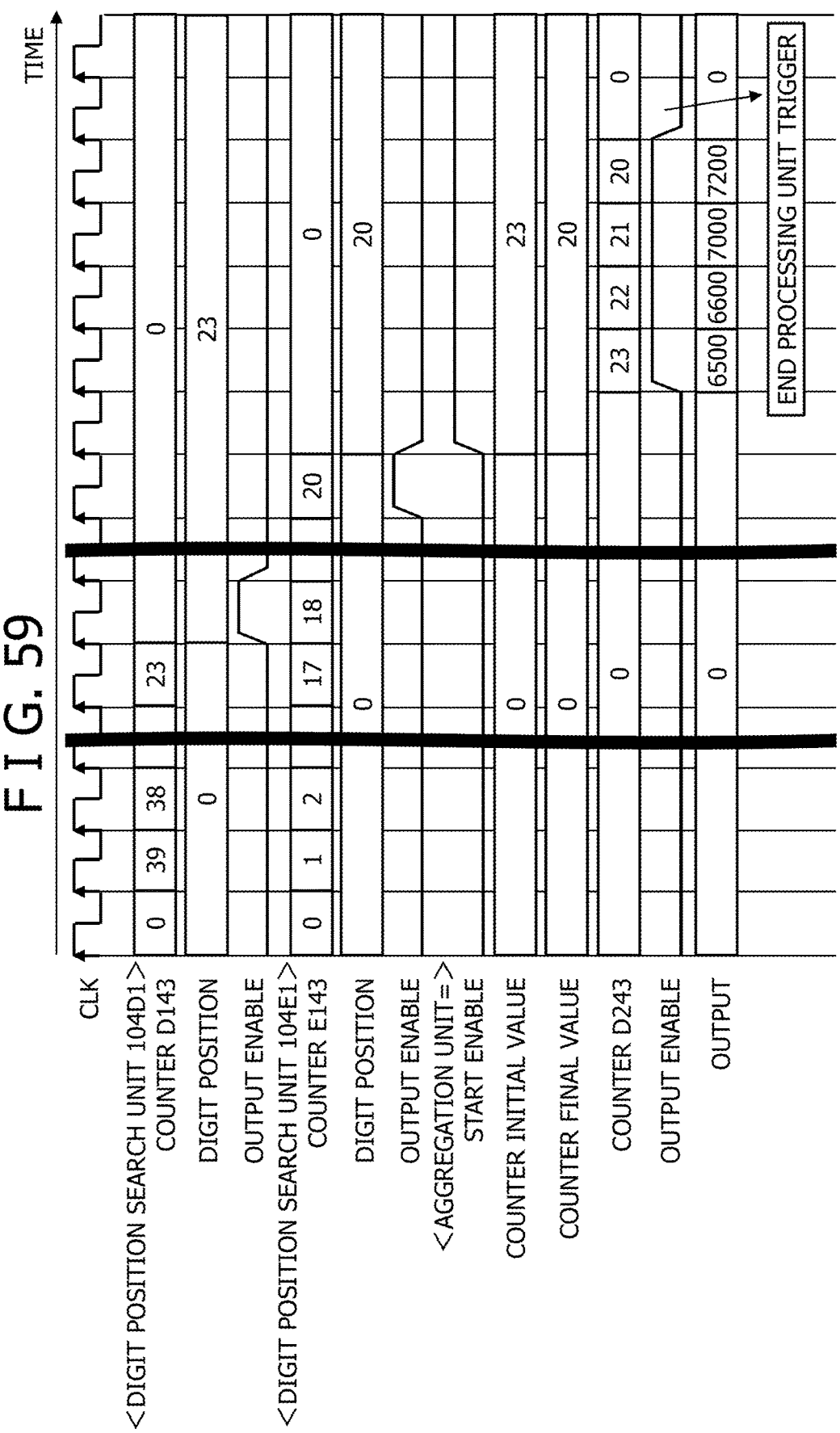
FIG. 59 exemplifies, in time chart, operation of components of the statistical information aggregation unit according to the embodiment 4.

FIG. 58 is a time chart exemplifying operation of the controller F41. FIG. 59 is a time chart exemplifying operation of components of the statistical information aggregation unit 104F. Operation of the controller F41 starts in accordance with start enable similarly to the controller 1041 in the embodiment 1 or the like. If the start enable is "1," the controller F41 activates the controlling counter F42. Then, if the conditions D1 to D3 described above are satisfied, the controller F41 sets enable of the digit position search unit 104D1 to 1 (true). Further, if the conditions E1 to E3 are satisfied, the controller 1041 sets enable of the digit position search unit 104E1 to 1 (true).

As described already in connection with the embodiment 2, the digit position search unit 104D1 compares the value (sample number) in the digit # registers AR0 to AR39, which are statistical information storage units for the digits, /total sample number, for example, compares the value (sample number)/total sample number, with the threshold value 2 in order from the highest-order digit. Then, the digit position search unit 104D1 holds the digit position K2 at which the value (sample number) of the digit # register AR0 to AR39/total sample number exceeds the threshold value 2 as the digit position holding signal and sets the comparison result holding signal to 1 (true).

Further, as described in connection with the embodiment 3, the digit position search unit 104E1 similarly compares the value (sample number) in the digit # registers AR0 to AR39, which are statistical information storage units for the digits, /total sample number with the threshold value 1 in order from the lowest-order digit. Then, the digit position search unit 104E1 holds the digit position K3 at which the value (sample number) of the digit # registers AR0 to AR39/total sample number is equal to or lower than the threshold value 1 as a digit position holding signal and sets the comparison result holding signal to 1 (true).

The controller F41 sets an enable signal to the digit position search unit 104D1 to "0" taking it as a trigger that the comparison result holding signal from the digit position search unit 104D1 changes to "1." Further, the controller F41 sets an enable signal to the digit position search unit 104E1 to "0" taking it as a trigger that the comparison result holding signal from the digit position search unit 104E1 changes to "1." Furthermore, the controller F41 sets an enable signal to the counter value production unit F49 and the aggregation unit 104D2 in the embodiment 2 to "1" taking it as a trigger that both of the comparison result holding signals change to "1."

The counter value production unit F49 generates a counter initial value and a counter final value from the digit positions K2 and K3 of the digit position holding signals of the digit position search unit 104D1 and the digit position search unit 104E1 in accordance with the counter value production unit logics ((expression 1), (expression 2) and (expression 4) given hereinabove), and transmits the generated values to the aggregation unit 104D2 together with the count number. The aggregation unit 104D2 outputs the output data, digit position information of the output data and output enable described above. After the statistical information of the digit positions from the counter initial value to the counter final value is outputted, the aggregation unit 104D2 sets the output enable signal to "0." Similarly as in the embodiment 1, the end processing unit 1047 (refer to FIG. 43) starts operation to perform an initialization process taking a falling edge of the output enable signal as a trigger.

<Advantageous Effect of Embodiment 4>

In the embodiment 4, the statistical information aggregation unit 104F receives a designation of threshold values 1 and 2 and acquires statistical information within a range within which the sample number/total sample number exceeds the threshold value 2 and is equal to or lower than the threshold value 1. Accordingly, for example, the user or the application program may acquire statistical information for restricting the overflow rate within a desirable range easily and exactly and may set a decimal point position appropriately rather than the embodiment 1.

It is to be noted that the embodiment 4 described above is directed to a case in which each digit of statistical information is a sample number at a highest-order bit position having a non-sign bit value. However, also in the case where each digit of statistical information is a sample number at a lowest-order bit position having a non-sign bit value, the process by the statistical information aggregation unit 104F exemplified in FIG. 57 may be performed.

Each arithmetic core 300 executes decision in accordance with the threshold values 1 and 2 similarly as in the case in which each digit of statistical information is a sample number at a highest-order bit position having a non-sign bit value. For example, each arithmetic core 300 calculates a position at which the {threshold value 2<(sample number at digit position of cumulative distribution/total sample number)=<threshold value 1} is satisfied. Each arithmetic core 300 may transfer the extracted sample number and position information to the control core 38.

In this case, the digit position search unit 104E1 may compare each digit of statistical information and the threshold value 1 with each other from a high-order digit toward a low-order digit to calculate the digit position K3 of the statistical information at which the sample number/total sample number is equal to or lower than the threshold value 1. Further, the digit position search unit 104D1 may compare each digit of statistical information and the threshold value 2 with each other from a low-order digit toward a high-order digit to calculate the digit position K2 of the statistical information at which the sample number/total sample number exceeds the threshold value 2. The processes of the counter value production unit F49 of the aggregation unit 104D2 for the digit positions K2 and K3 are similar to those in the embodiment 4 described above.

Embodiment 5

In the embodiments 1 to 4, the server 3 is described which includes the arithmetic processing apparatus 30 in which, for example, accumulation information of statistical information is collected from a result of arithmetic operation by the arithmetic operator 131 for vector operation (refer to FIGS. 34 and 35) and is outputted to a register in the arithmetic processing apparatus 30, memory 32 or the like. Based on such statistical information as described above, the user or the application program executed by the CPU 31 may set a decimal point position (range of effective digits) of fixed point data upon execution of a next processing step of an application program, for example, of a learning process in deep learning.

However, hardware such as an arithmetic processing apparatus 30 may designated a fixed point position based on acquired statistical information in place of the application program that executes the process for designating a fixed point position. For example, a circuit that determines a decimal point position of fixed point data based on acquired statistical information may be provided in the inside of the arithmetic processing apparatus 30 or in the inside of the server 3.

Therefore, in the embodiment 5, a control core 38 including a decimal point position determination circuit 384 is described. The configuration and operation of the arithmetic processing apparatus 30 in the embodiment 4 are similar to those of the embodiments 1 to 4 except that the control core 38 includes the decimal point position determination circuit 384 and that the control core 38 sets a decimal point position determined by the decimal point position determination circuit 384 to each arithmetic core 300. Therefore, the same components as those in the embodiments 1 to 4 from among the components of the embodiment 4 are denoted by the same reference characters, and description of the same is omitted.

For example, also in the embodiment 5, the configuration of the server 3A of FIG. 27 or the server 3B of FIG. 28 may be exemplified as that of the server 3 similarly as in the embodiments 1 to 4. Further, the configuration of FIG. 36 is exemplified as that of the control core 38 of the server 3B. Further, as the arithmetic core 300, that of FIGS. 34 and 35 of the embodiment 1 may be exemplified.

Figure 60:
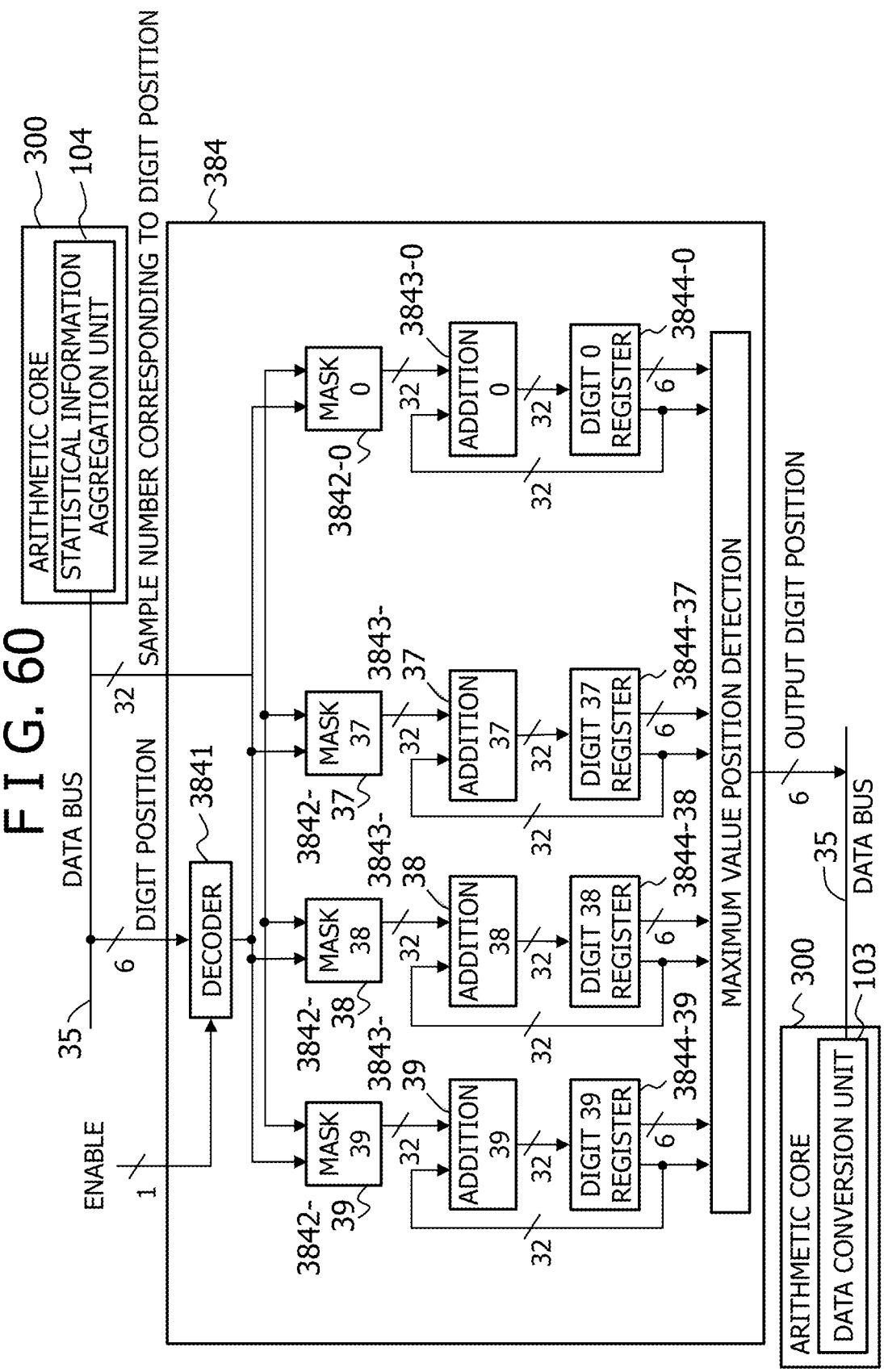
FIG. 60 exemplifies a configuration of a decimal point position determination circuit provided in a control core according to an embodiment 5.

FIG. 60 exemplifies a configuration of the decimal point position determination circuit 384 provided in the control core 38. The configuration of the control core 38 is similar to that depicted in FIG. 28 or 35, and the control core 38 is an example of a control processor. In the embodiment 5, it is assumed that statistical information is acquired through a data bus 35 from a statistical information aggregation unit 104 similar to the statistical information aggregation units 104D, 104E or 104F of the embodiment 2, 3 or 4. It is to be noted that, in the embodiment 5, the statistical information aggregation units 104D, 104E and 104F are collectively referred to simply as statistical information aggregation unit 104. As exemplified in FIG. 60, the statistical information aggregation unit 104 is provided in each arithmetic core 300. For example, it is assumed that each arithmetic core 300 includes a statistical information aggregation unit 104D similar to that in the embodiment 2. Further, in the embodiment 5, the decimal point position determination circuit 384 sets a determined decimal point position to the data conversion unit 103 provided in each arithmetic core 300 such that the determined decimal point position is utilized as a decimal point position of a fixed point number in next arithmetic operation.

The user would set a desirable overflow rate R as a value corresponding to a threshold value in execution of the application program in the server 3. Each arithmetic core 300 in the embodiment 5 determines the designated overflow rate R as a threshold value S0 and compares the threshold value with a sample number/total sample number of statistical information. Then, each arithmetic core 300 collects a digit position of a digit at which a sample number/total sample number exceeding the threshold value S0 is accumulated and a sample number exceeding the threshold value.

Here, the threshold value S0 is S0=R, and the digit position at which the sample number/total sample number exceeds the threshold value S0 is determined. Further, the total sample number is, for example, an arithmetic operation number by which parallel arithmetic operation by vector arithmetic operators in one arithmetic core 300 may be executed.

The decimal point position determination circuit 384 acquires statistical information (determined digit positions and sample numbers at the digits) of each arithmetic core 300 through the data bus 35 (FIG. 27, 29, 34 or 35) and performs cumulative addition of the sample numbers for each digit position. Accordingly, the decimal point position determination circuit 384 collects the sample number of the statistical information of the plurality of arithmetic cores 300 and performs cumulative addition for each digit position and then determines a digit position at which the number of times by which threshold value exceeding is detected is in the maximum as a decimal point position for next arithmetic operation. For example, a next decimal point position is determined by decision by majority of the arithmetic cores 300.

Here, since the decimal point position determination circuit 384 in the embodiment 5 performs cumulative addition of the sample number for each digit position, the time number, obtained from each of the arithmetic cores 300, at the digit position at which exceeding of the threshold value has been detected is determined not by decision by majority of the arithmetic cores 300 but rather by decision by majority weighted with the sample number for each digit position. However, the decimal point position determination circuit 384 may simply perform cumulative addition with the weight 1 for each arithmetic core 300 in regard to a digit position at which threshold value exceeding is detected in place of performing weighting with the sample number. In the case of cumulative addition with the weight 1, the time number, obtained from each of the arithmetic cores 300, at the digit position at which exceeding of the threshold value has been detected, indicates simple decision by majority of each arithmetic core 300. The determined decimal point position is set to the data conversion unit 103 of each arithmetic core 300 through the data bus 35. As a result, it may be expected that the overflow rate becomes lower than the threshold value in arithmetic operation in the next and succeeding operation cycles.

The arithmetic cores 300 may be considered an example of a plurality of arithmetic processors. Accordingly, it may be considered that, in regard to digits selected by the plurality of arithmetic processors, the decimal point position determination circuit 384 counts values corresponding to the plurality of arithmetic processors by which the individual digits are selected and executes a process for decision by majority of the arithmetic processors. Here, each of the values corresponding to the plurality of arithmetic processors is a value weighted with the sample number or a value of the weight 1. The decimal point position determination circuit 384 may be considered an example of a decimal point position designation unit that designates a decimal point position of fixed point number data that becomes a result of arithmetic operation of an arithmetic operation instruction to be executed next by the plurality of arithmetic units.

As depicted in FIG. 60, the decimal point position determination circuit 384 receives a digit position, statistical information corresponding to the digit position and an enable signal inputted thereto and selects and outputs an output digit position by the decision by majority. It is to be noted that, in FIG. 60, to the decimal point position determination circuit 384, a digit position acquired by each arithmetic core and statistical information corresponding to the digit position are inputted successively from the plurality of arithmetic cores 300 coupled to the control core 38.

The decimal point position determination circuit 384 includes a decoder 3841, mask circuits 3842-0 to 3842-39, adders 3843-0 to 3843-39, digit # registers 3844-0 to 3844-39 and a maximum value position detection circuit 3845.

A decoder 3841 turns ON one of the mask circuits 3842-0 to 3842-39 in response to an input signal, which designates a digit position (for example, a 6-bit signal, a value from 0 to 38) when enable is 1 (true). The sample number of statistical information corresponding to a digit position is inputted to the mask circuits 3842-0 to 3842-39.

Further, in the case where decision by majority weighted with the sample number at each digit is executed, the statistical information corresponding to the inputted digit position corresponds, for example, to one digit (in the case of +M=−L=0) of statistical information (for example, of 32 bits) of each digit position outputted from the statistical information aggregation unit 104D in the embodiment 2. However, the statistical information corresponding to the inputted digit position may correspond to one digit (in the case of +M=−L=0) of the statistical information at each digit position outputted from the statistical information aggregation unit 104E in the embodiment 3. However, in the case where decision by majority is executed with the weight 1, a plurality of digits (within a range from +M to −L) may be inputted from each arithmetic core 300. Further, in the case where decision by majority is executed with the weight 1, the statistical information corresponding to the inputted digit position may be statistical information at each digit position outputted from the statistical information aggregation unit 104F in the embodiment 4. The maximum value position detection circuit 3845 detects a digit position at which a maximum value is held from among the digit # registers 3844-0 to 3844-39 and outputs the detected digit position as an output digit position (for example, of 6 bits, a value from 0 to 39).

The adders 3843-0 to 3843-39 integrate the output of one circuit that is ON by the decoder 3841 from among the mask circuits 3842-0 to 3842-39 to the digit # registers 3844-0 to 3844-39. The integrated value may be considered a value obtained by totalizing, for each digit at which the threshold value is exceeded, the number of arithmetic cores 300 in which the threshold value is exceeded, and may be considered a circuit for deciding decision by majority. However, since values at the digit of the statistical information are integrated in the circuit of FIG. 60, the circuit of FIG. 60 may be considered a circuit for determining decision by majority taking the sample value of the statistical information as a weight. However, as described above, 1 bit (weight 1) may be inputted per 1 digit in place of statistical information of 32 bits per 1 digit. In the case where 1 bit (weight 1) is inputted per 1 digit, the decimal point position determination circuit 384 selects and outputs an output digit position by simple decision by majority of the plurality of arithmetic cores 300.

FIG. 61 exemplifies a truth table of the decoder 3841. As depicted in FIG. 61, when enable is ON, a bit position corresponding to a 6-bit value of input information for designating a digit position is outputted and the other bits are outputted as 0.

Figure 62:
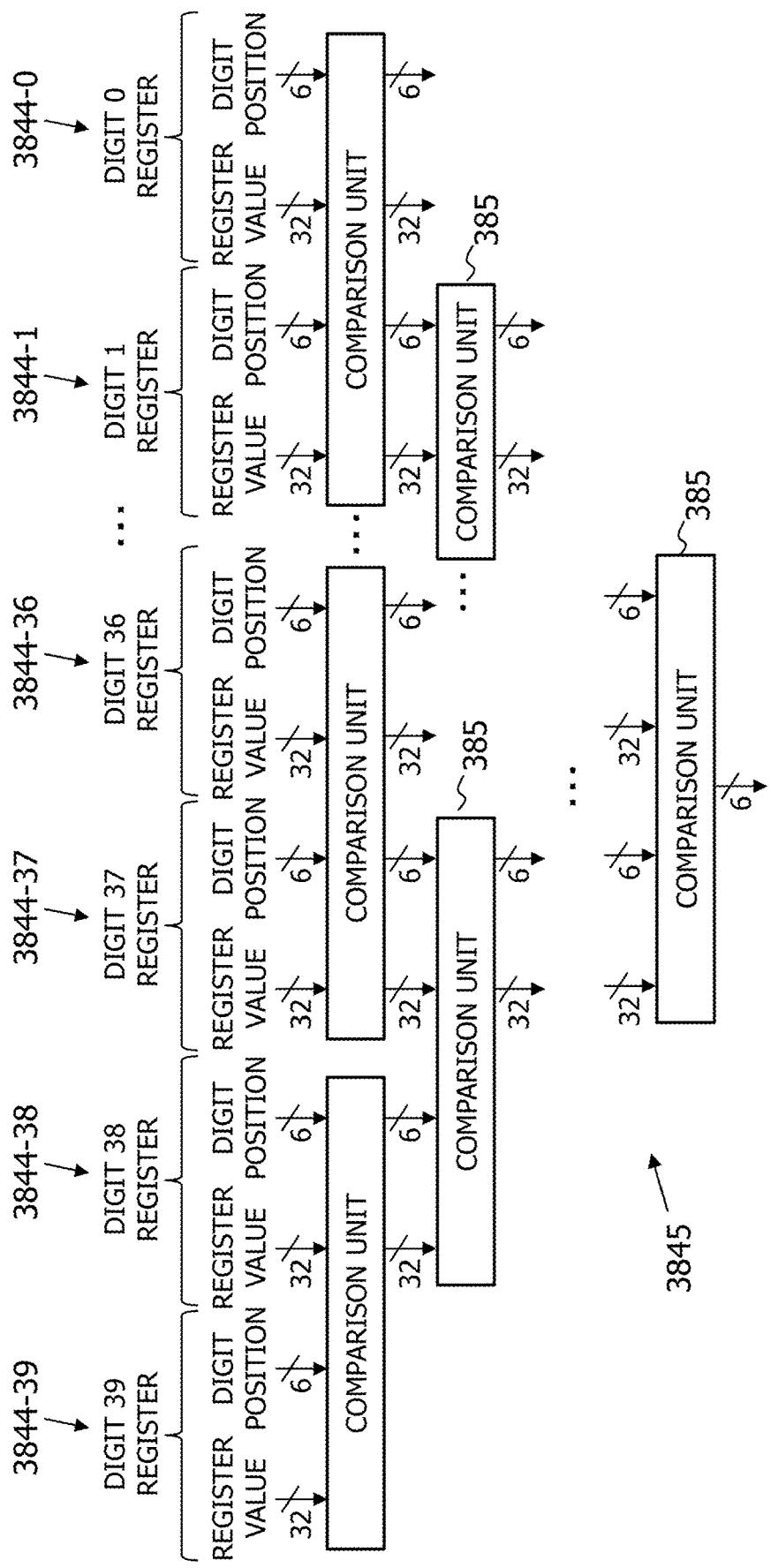
FIG. 62 exemplifies a detailed configuration of a maximum value position detection circuit according to the embodiment 5.

FIG. 62 is a view exemplifying a detailed configuration of the maximum value position detection circuit 3845. As depicted in FIG. 62, the maximum value position detection circuit 3845 is configured such that comparison units 385 are coupled in a binary tree form. Each comparison unit 385 decides a relation in magnitude between register values in two sets each including a digit position and a register value at the digit position and outputs the digit position at which the register value is higher and the register value. For example, in the first layer of the binary tree, the digit # registers 3844-0 to 3844-39 are grouped into pairs, and a relation in magnitude is decided for each pair and a digit position at which the register value is higher and the register value are outputted. In this manner, from a digit # register that indicates a higher register value from between the digit # registers 3844-0 and 3844-1, a digit position at which the register value is higher and the register value are outputted. This similarly applies to the digit # registers 3844-1 and 3844-2. Further, this similarly applies also to the digit # registers 3844-2$k$ and the digit # registers 3844-2$k$+1 ($k$= 2, . . . , 19) and so forth. In this manner, digit positions and register values for 20 digits may be selected from among digit positions and register values for 40 digits inputted to the comparison units 385 in the first layer. However, in the embodiment 5, digit positions and register values for 32 digits from among 40 digits may be selected first by a tournament system.

Since the maximum value position detection circuit 3845 is configured such that the comparison units 385 are coupled in a binary tree form, in the second layer, digit positions and register values for 16 digits may be selected similarly from among the digit positions and register values for 32 digits. Further, in the third layer of the binary tree, the maximum value position detection circuit 3845 may select digit positions and register values for 8 digits from among the digit positions and register values for 16 digits. Such a process as just described is repetitively performed, and the maximum value position detection circuit 3845 determines and outputs a digit position at which the register value is highest.

Figure 63:
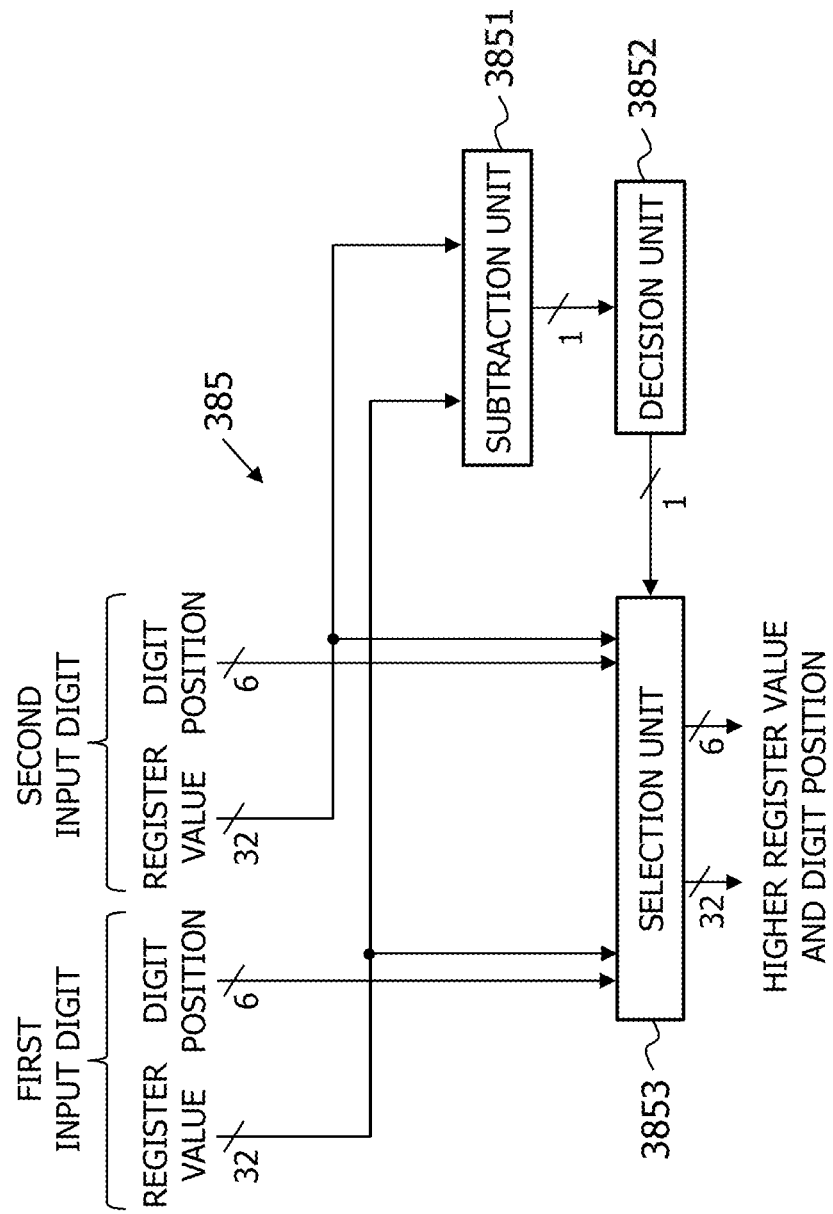
FIG. 63 exemplifies a particular configuration of a comparison unit according to the embodiment 5.

FIG. 63 exemplifies a particular configuration of the comparison unit 385. As depicted in FIG. 63, the comparison unit 385 includes a subtraction unit 3851, a decision unit 3852 and a selection unit 3853. A register value at a first input digit and a register value at a second input digit are inputted to the subtraction unit 3851, and subtraction (register value at first input digit−register value at second input digit) is executed. The decision unit 3852 decides whether or not a result of the subtraction is in the positive, and outputs, in the case where the result of the decision is in the positive, a selection signal for outputting the digit position at the first input digit to the selection unit 3853. The selection unit 3853 outputs the digit position at the first input digit or the digit position at the second input digit in accordance with the result of the decision.

<Advantageous Effect of Embodiment 5>

In the arithmetic processing apparatus 30 of the embodiment 5, the control core 38 may determine a digit position of statistical information corresponding to a threshold value designated by the user by decision by majority of the plurality of arithmetic cores 300. Accordingly, the arithmetic processing apparatus 30 sets the digit position determined by the decision by majority, for example, to the data conversion unit 103 exemplified in FIGS. 34 and 35 and determines the digit position as a fixed point position in next arithmetic operation. By such a process as just described, a greatest number of arithmetic cores 300 from among the plurality of arithmetic cores 300 determine a decimal point position to a digit position at which there is the high possibility that the threshold value may be satisfied, and the determined decimal point position may be utilized for next arithmetic operation. Accordingly, the server 3 including the arithmetic processing apparatus 30 of the embodiment 5 may set a decimal point position that satisfies the overflow rate, underflow rate and so forth corresponding to the threshold value designated by the user using a hardware circuit of the arithmetic processing apparatus 30.

In the embodiment described above, when decision by majority is determined, the control core 38 integrates statistical information (32 bits) at digits at which exceeding of the threshold value is detected as depicted in FIG. 60. Accordingly, in FIG. 60, when a digit at which exceeding of the threshold value is detected is determined by decision by majority of the arithmetic cores 300, it is considered that decision by majority weighted with statistical information (32 bits) at the digit at which exceeding of the threshold value is detected is executed. If weighting is performed with a value at a digit of the statistical information, the weight acts effectively in the case where a cumulative value of the statistical information varies discontinuously across the threshold value. For example, in the case where the cumulative value of the statistical information varies discontinuously across the threshold value, a digit at which the cumulative value of the statistical information increases suddenly is determined preferentially and a decimal point position may be determined appropriately so as to suppress the overflow time number or the underflow time number to a range of the threshold value.

It is to be noted that, as in FIG. 60, in place of integrating "statistical information corresponding to a digit position," the "value 1 of 1 bit corresponding to a digit position" may be integrated. This makes it possible to determine a digit at which exceeding of a threshold value is detected with the weight set so as to have a uniform value 1.

[Other Modifications]

Further, in the embodiments 1 to 5 described above, as an example of a total sample number, the number of fixed point data that are processed in parallel by single time vector operation is used taking the arithmetic units A-0 to A-7 of FIG. 37 that are vector arithmetic operators as an example. However, the process of the arithmetic processing apparatus 30 of the present embodiments is not restricted to such a process as described above. For example, in addition to a vector arithmetic operator, a scalar arithmetic operator may be used such that a fixed point data number used in given arithmetic operation is used as the total sample number. For example, in the case where the arithmetic core 300 is activated in accordance with an instruction from the control core 38, where N vector data and M scalar data are processed by single time activation and where the parallel number of vector arithmetic operation is 8, the total sample number may be calculated by 8*N+M.

In the foregoing description of the embodiments 1 to 5, the description is given assuming that statistical information acquired by the arithmetic cores is transferred to the control core 38, CPU 31 or the like and then passed to an application program or the like. Therefore, such a subject arising from transfer of statistical information as described with reference to FIGS. 29 and 30 has been presented. However, the processes of the arithmetic processing apparatus 30, arithmetic core 300 and so forth in the embodiments 1 to 5 are not limited to those by which statistical information is transferred to the control core 38, CPU 31 or the like. For example, also in execution of an application program by which such data for one digit (or for digit position setting values +M to −L) of a cumulative distribution of statistical information as exemplified in FIG. 32 or 33 is processed in the arithmetic core 300, the configurations of the embodiments 1 to 5 may be applied. For example, acquisition and aggregation of statistical data may be performed by individual arithmetic cores 300 such that the individual arithmetic cores 300 determine a fixed point position by next arithmetic operation from the acquired digit position of the statistical information and the sample number at the digit position.

The embodiments discussed herein may provide an arithmetic processing apparatus and so forth that may increase the accuracy of a fixed point number and may reduce the physical amount and the power consumption of circuitry to make it possible to efficiently increase the accuracy in fixed point number arithmetic operation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus coupled to a main storage apparatus, comprising:
    a plurality of arithmetic processors each including:
    a plurality of arithmetic circuits that individually execute an arithmetic operation instruction for fixed point number data, and
    a statistical information acquisition circuit that acquires at least one of first statistical information and second statistical information, with regard to a plurality of fixed point number data that are results of arithmetic operations executed by the plurality of arithmetic circuits, the first statistical information is obtained by accumulating first bit patterns, each of the first bit patterns is obtained by setting a flag bit to each of bit positions corresponding to a range from a least significant bit position of the fixed point number data to a highest-order bit position from among bit positions having a bit value different from a sign bit, for each of the digits corresponding to the bit positions, and the second statistical information is obtained by accumulating second bit patterns, each of the second bit patterns is obtained by setting a flag bit to each of bit positions corresponding to a range from the position of the sign bit to a lowest-order bit position from among bit positions having a bit value different from the sign bit, for each of the digits corresponding to the bit positions.

2. The arithmetic processing apparatus according to claim 1, wherein
    the statistical information acquisition circuit includes
    a holding circuit that holds the information accumulated at respective digits of the acquired statistical information, and
    a first selector that selects information of a specific digit of the statistical information held by the holding circuit in accordance with a control signal that designates the specific digit.

3. The arithmetic processing apparatus according to claim 2, further comprising:
    a comparator that compares the information accumulated at each digit of the statistical information held by the holding circuit with a threshold value; and
    a controller that designates a digit to be selected from among the digits of the statistical information based on a result of the comparison by the comparator.

4. The arithmetic processing apparatus according to claim 3, further comprising:
    a second selector that selects the information accumulated at the digit designated by the controller.

5. The arithmetic processing apparatus according to claim 4, further comprising:
    a control processor further including
    a decimal point position designator that counts, in regard to the information accumulated at the digits selected in the respective arithmetic processors, values corresponding to the plurality of arithmetic processors by which the individual digits are selected, and designates, based on a digit at which the counted value is highest, a decimal point position of fixed point number data that become a result of arithmetic operation of an arithmetic operation instruction to be executed subsequently by the plurality of arithmetic units.

6. The arithmetic processing apparatus according to claim 2, further comprising:
    a first search circuit that successively compares the information accumulated at each digit from the most significant digit toward the least significant digit of the statistical information held by the holding circuit with a first threshold value and designates a first digit based on a result of the comparison;
    a second search circuit that successively compares the information accumulated at each digit from the least significant digit toward the most significant digit of the statistical information held by the holding circuit with a second threshold value and designates a second digit based on a result of the comparison; and
    a third selector that selects the information accumulated at the individual digits within a range designated by the first digit and the second digit.

7. An arithmetic processor comprising:
    a plurality of arithmetic circuits that individually execute an arithmetic operation instruction for fixed point number data; and
    a statistical information acquisition circuit that acquires at least one of first statistical information and second statistical information, with regard to a plurality of fixed point number data that are results of arithmetic operation executed by the plurality of arithmetic circuits, the first statistical information is obtained by accumulating first bit patterns, each of the first bit patterns is obtained by setting a flag bit to each of bit positions corresponding to a range from a least significant bit position of the fixed point number data to a highest-order bit position from among bit positions having a bit value different from a sign bit, for each of the digits corresponding to the bit positions, and the second statistical information is obtained by accumulating second bit patterns, each of the second bit patterns is obtained by setting a flag bit to each of bit positions corresponding to a range from the position of the sign bit to a lowest-order bit position from among bit positions having a bit value different from the sign bit, for each of the digits corresponding to the bit positions.

8. An information processing apparatus comprising:

a main memory, a processor coupled to the main memory, and an arithmetic processing apparatus coupled to the main memory and to the processor, and including a plurality of arithmetic processors, each of the plurality of arithmetic processors includes:

a plurality of arithmetic circuit individually executes an arithmetic operation instruction for fixed point number data, and a statistical information acquisition circuit that acquires at least one of first statistical information and second statistical information, with regard to a plurality of fixed point number data that are results of arithmetic operations executed by the plurality of arithmetic circuits, the first statistical information is obtained by accumulating first bit patterns, each of the first bit patterns is obtained by setting a flag bit to each of bit positions corresponding to a range from a least significant bit position of the fixed point number data to a highest-order bit position from among bit positions having a bit value different from a sign bit, for each of the digits corresponding to the bit positions, and the second statistical information is obtained by accumulating second bit patterns, each of the second bit patterns is obtained by setting a flag bit to each of bit positions corresponding to a range from the position of the sign bit to a lowest-order bit position from among bit positions having a bit value different from the sign bit, for each of the digits corresponding to the bit positions.

9. A control method for an arithmetic processing apparatus coupled to a main storage apparatus and comprising a plurality of arithmetic processors, the method including:

executing an arithmetic operation instruction for fixed point number data individually by a plurality of arithmetic circuits included in each of the plurality of arithmetic processors, and acquiring at least one of first statistical information and second statistical information, with regard to a plurality of fixed point number data that are results of arithmetic operations executed by the plurality of arithmetic circuits, the first statistical information is obtained by accumulating first bit patterns, each of the first bit patterns is obtained by setting a flag bit to each of bit positions corresponding to a range from a least significant bit position of the fixed point number data to a highest-order bit position from among bit positions having a bit value different from a sign bit, for each of the digits corresponding to the bit positions, and the second statistical information is obtained by accumulating second bit patterns, each of the second bit patterns is obtained by setting a flag bit to each of bit positions corresponding to a range from the position of the sign bit to a lowest-order bit position from among bit positions having a bit value different from the sign bit, for each of the digits corresponding to the bit positions.

* * * * *